(12) United States Patent
Luo et al.

(10) Patent No.: US 11,516,833 B2
(45) Date of Patent: Nov. 29, 2022

(54) CANCELLATION AND INTERRUPTION INDICATIONS IN INTEGRATED ACCESS AND BACKHAUL NETWORKS

(71) Applicant: QUALCOMM Incorporated, San Diego, CA (US)

(72) Inventors: Jianghong Luo, Skillman, NJ (US); Navid Abedini, Somerset, NJ (US); Luca Blessent, Whitehouse Station, NJ (US); Naeem Akl, Somerville, NJ (US); Tao Luo, San Diego, CA (US); Karl Georg Hampel, Hoboken, NJ (US); Junyi Li, Franklin Park, NJ (US)

(73) Assignee: QUALCOMM Incorporated, San Diego, CA (US)

( * ) Notice: Subject to any disclaimer, the term of this patent is extended or adjusted under 35 U.S.C. 154(b) by 61 days.

(21) Appl. No.: 17/100,669

(22) Filed: Nov. 20, 2020

(65) Prior Publication Data

US 2021/0235476 A1 Jul. 29, 2021

Related U.S. Application Data

(60) Provisional application No. 62/965,687, filed on Jan. 24, 2020.

(51) Int. Cl.
*H04W 72/12* (2009.01)
*H04J 3/02* (2006.01)
*H04W 72/04* (2009.01)
*H04W 40/22* (2009.01)

(52) U.S. Cl.
CPC .......... *H04W 72/1278* (2013.01); *H04J 3/02* (2013.01); *H04W 40/22* (2013.01); *H04W 72/04* (2013.01)

(58) Field of Classification Search
CPC . H04W 72/1278; H04W 40/22; H04W 72/04; H04W 72/0406; H04J 3/02; H04B 7/15542
See application file for complete search history.

(56) References Cited

U.S. PATENT DOCUMENTS

2019/0306846 A1* 10/2019 Luo ................ H04W 72/042
2021/0250884 A1* 8/2021 Iyer ................ H04W 56/0045

* cited by examiner

*Primary Examiner* — Jae Y Lee
(74) *Attorney, Agent, or Firm* — Holland & Hart LLP

(57) ABSTRACT

Methods, systems, and devices for wireless communications are described. Generally, the described techniques provide for communicating, by a relay node, in a time division multiplexing (TDM) mode, with a parent node via a parent link configured between the relay node and the parent node and with a child node via a child link configured between the relay node and the child node, identifying a TDM alignment conflict between a first transmission scheduled for the parent link and a second transmission scheduled for the child link, and transmitting a conflict indication (e.g., a cancellation message or an interruption message) to the parent node or the child node.

30 Claims, 24 Drawing Sheets

Key
- Access Link 210
- Wireless Backhaul Link 215

CANCELLATION AND INTERRUPTION INDICATIONS IN INTEGRATED ACCESS AND BACKHAUL NETWORKS

CROSS REFERENCE

The present application for patent claims the benefit of U.S. Provisional patent Application No. 62/965,687 by LUO et al., entitled "CANCELLATION AND INTERRUPTION INDICATIONS IN INTEGRATED ACCESS AND BACKHAUL NETWORKS," filed Jan. 24, 2020, assigned to the assignee hereof, and expressly incorporated by reference herein.

FIELD OF TECHNOLOGY

The following relates generally to wireless communications and more specifically to cancellation and interruption indications in integrated access and backhaul (IAB) networks.

BACKGROUND

The following relates generally to wireless communications, and more specifically to dynamic resource management.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform spread orthogonal frequency division multiplexing (DFT-S-OFDM). A wireless multiple-access communications system may include one or more base stations or one or more network access nodes, each simultaneously supporting communication for multiple communication devices, which may be otherwise known as user equipment (UE).

Wireless communications systems may include access nodes to facilitate wireless communication between user equipment and a network. For example, an LTE or NR base station may provide a mobile device access to the internet via the wireless network. Access nodes typically have a high-capacity, wired, backhaul connection (e.g., fiber) to the network. In some deployments, however, it may be desirable to deploy a larger number of access nodes in a small area to provide acceptable coverage to users. In such deployments, it may be impractical to connect each access node to the network via a wired connection, and certain networks or portions thereof may be configured as integrated access and backhaul (IAB) networks where one or more access nodes have wireless backhaul connections to the network. Efficient deployment and operation of such access nodes with wireless backhaul connections may be desirable to enable efficient backhaul connections and enhance end user coverage.

SUMMARY

The described techniques relate to improved methods, systems, devices, and apparatuses that support cancellation and interruption indications in integrated access and backhaul (IAB) networks. Generally, an IAB node (e.g., a relay node) may identify such a time division multiplexing (TDM) alignment conflict between a first transmission scheduled on a parent link, and a second transmission scheduled on a child link, and may transmit a conflict indication to the parent node or the child node. The first transmission (e.g., an uplink signal or a downlink signal) may be scheduled on hard resources, and the second transmissions (e.g., an uplink signal or a downlink signal) may also be scheduled on hard resources. In such examples, the relay node may determine a link priority (e.g., a priority of the parent link relative to the child link). If there is enough time prior to the identified TDM alignment conflict, the relay node may transmit a cancellation message (e.g., a mobile termination (MT) cancellation message to the parent node via the parent link, or a distributed unit (DU) cancellation message to the child node via the child link). The cancellation message may indicate, to the parent node, a cancellation of at least a portion of the first transmission, or may indicate, to the child node, a cancellation of at least a portion of the second transmission. If there is not enough time prior to the identified TDM alignment conflict, the relay node may transmit an interruption message (e.g., an MT interruption message to the parent node via the parent link, or a DU interruption message to the child node via the child link). The interruption message may indicate, to the parent node, an interruption of at least a portion of the first transmission, or may indicate, to the child node, an interruption of at least a portion of the second transmission. A parent node or child node that receives a conflict indication may take appropriate action to cancel a pending transmission, ignore some or all of a transmission, reassign available resources, reschedule failed or canceled transmissions, adjust one or more communication procedures, or the like.

A method of wireless communications by a relay node is described. The method may include communicating, by the relay node operating in a time division multiplexing (TDM) mode, with a parent node via a parent link configured between the relay node and the parent node and with a child node via a child link configured between the relay node and the child node, identifying, based on the relay node operating in the TDM mode, a TDM alignment conflict between a first transmission scheduled for the parent link and a second transmission scheduled for the child link, and transmitting, to at least one of the parent node or the child node, a conflict indication based on the identifying.

An apparatus for wireless communications by a relay node is described. The apparatus may include a processor, memory coupled with the processor, and instructions stored in the memory. The instructions may be executable by the processor to cause the apparatus to communicate, by the relay node operating in a time division multiplexing (TDM) mode, with a parent node via a parent link configured between the relay node and the parent node and with a child node via a child link configured between the relay node and the child node, identify, based on the relay node operating in the TDM mode, a TDM alignment conflict between a first transmission scheduled for the parent link and a second transmission scheduled for the child link, and transmit, to at least one of the parent node or the child node, a conflict indication based on the identifying.

Another apparatus for wireless communications by a relay node is described. The apparatus may include means for communicating, by the relay node operating in a time division multiplexing (TDM) mode, with a parent node via a parent link configured between the relay node and the parent node and with a child node via a child link configured between the relay node and the child node, identifying, based on the relay node operating in the TDM mode, a TDM alignment conflict between a first transmission scheduled for the parent link and a second transmission scheduled for the child link, and transmitting, to at least one of the parent node or the child node, a conflict indication based on the identifying.

A non-transitory computer-readable medium storing code for wireless communications by a relay node is described. The code may include instructions executable by a processor to communicate, by the relay node operating in a time division multiplexing (TDM) mode, with a parent node via a parent link configured between the relay node and the parent node and with a child node via a child link configured between the relay node and the child node, identify, based on the relay node operating in the TDM mode, a TDM alignment conflict between a first transmission scheduled for the parent link and a second transmission scheduled for the child link, and transmit, to at least one of the parent node or the child node, a conflict indication based on the identifying.

In some examples of the method, apparatuses, and non-transitory computer-readable medium described herein, transmitting the conflict indication may include operations, features, means, or instructions for transmitting the conflict indication including a cancellation message indicating cancellation of at least a portion of the first transmission, the second transmission, or both, for at least a portion of an allocated resource.

In some examples of the method, apparatuses, and non-transitory computer-readable medium described herein, transmitting the conflict indication may include operations, features, means, or instructions for transmitting the conflict indication including the cancellation message prior to the allocated resource.

In some examples of the method, apparatuses, and non-transitory computer-readable medium described herein, transmitting the conflict indication may include operations, features, means, or instructions for transmitting the conflict indication including the cancellation message indicating cancellation of at least the portion of the first transmission that may be an uplink transmission or a downlink transmission via the parent link, of the second transmission that may be an uplink transmission or a downlink transmission via the child link, or both.

In some examples of the method, apparatuses, and non-transitory computer-readable medium described herein, transmitting the conflict indication may include operations, features, means, or instructions for transmitting the conflict indication including an interruption message indicating interruption of at least a portion of the first transmission, the second transmission, or both, for at least a portion of an allocated resource.

In some examples of the method, apparatuses, and non-transitory computer-readable medium described herein, transmitting the conflict indication may include operations, features, means, or instructions for transmitting the conflict indication including the interruption message after the allocated resource.

In some examples of the method, apparatuses, and non-transitory computer-readable medium described herein, transmitting the conflict indication may include operations, features, means, or instructions for transmitting the conflict indication including the interruption message indicating interruption of at least the portion of the first transmission that may be an uplink transmission or a downlink transmission via the parent link, of the second transmission that may be an uplink transmission or a downlink transmission via the child link, or both.

Some examples of the method, apparatuses, and non-transitory computer-readable medium described herein may further include operations, features, means, or instructions for receiving control signaling scheduling the first transmission between the relay node and the parent node via the parent link.

Some examples of the method, apparatuses, and non-transitory computer-readable medium described herein may further include operations, features, means, or instructions for transmitting control signaling scheduling the second transmission between the relay node and the child node via the child link.

In some examples of the method, apparatuses, and non-transitory computer-readable medium described herein, transmitting the conflict indication may include operations, features, means, or instructions for transmitting the conflict indication that includes a bitmap indicating a cancelled or interrupted resource over one or more transmission time intervals.

Some examples of the method, apparatuses, and non-transitory computer-readable medium described herein may further include operations, features, means, or instructions for receiving a list configuration indicating a list of one or more resources over one or more transmission time intervals, and transmitting the conflict indication that includes an index indicating a first resource from the list may be a cancelled resource or an interrupted resource.

In some examples of the method, apparatuses, and non-transitory computer-readable medium described herein, identifying the TDM alignment conflict may include operations, features, means, or instructions for identifying the TDM alignment conflict based on the first transmission scheduled for the parent link at least partially overlapping in time with the second transmission scheduled for the child link.

In some examples of the method, apparatuses, and non-transitory computer-readable medium described herein, identifying the TDM alignment conflict may include operations, features, means, or instructions for identifying the TDM alignment conflict based on the first transmission scheduled for the parent link being adjacent in time with the second transmission scheduled for the child link.

In some examples of the method, apparatuses, and non-transitory computer-readable medium described herein, identifying the TDM alignment conflict may include operations, features, means, or instructions for communicating first scheduling control signaling indicating a first semi-persistent resource or a first dynamic resource in which the first transmission may be scheduled and second scheduling control signaling indicating a second semi-persistent resource or a second dynamic resource in which the second transmission may be scheduled that may be adjacent in time or at least partially overlap in time.

In some examples of the method, apparatuses, and non-transitory computer-readable medium described herein, transmitting the conflict indication may include operations, features, means, or instructions for transmitting the conflict indication indicating cancellation of one of the first transmission or the second transmission based on a priority of the parent link relative to the child link.

In some examples of the method, apparatuses, and non-transitory computer-readable medium described herein, transmitting the conflict indication may include operations, features, means, or instructions for transmitting the conflict indication via a control channel, a medium access control (MAC) control element, or both.

Some examples of the method, apparatuses, and non-transitory computer-readable medium described herein may further include operations, features, means, or instructions for communicating control signaling rescheduling at least a portion of the first transmission, the second transmission, or both, based on the conflict indication, and communicating the at least a portion of the first transmission, the second transmission, or both, based on the control signaling.

A method of wireless communications at a parent node is described. The method may include communicating with a relay node operating in a time division multiplexing (TDM) mode via a parent link between the relay node and the parent node, transmitting control signaling scheduling a first transmission between the relay node and the parent node via the parent link, and receiving, based on the control signaling, a conflict indication indicating a TDM alignment conflict between the first transmission and a second transmission scheduled for a child link between the relay node and a child node.

An apparatus for wireless communications at a parent node is described. The apparatus may include a processor, memory coupled with the processor, and instructions stored in the memory. The instructions may be executable by the processor to cause the apparatus to communicate with a relay node operating in a time division multiplexing (TDM) mode via a parent link between the relay node and the parent node, transmit control signaling scheduling a first transmission between the relay node and the parent node via the parent link, and receive, based on the control signaling, a conflict indication indicating a TDM alignment conflict between the first transmission and a second transmission scheduled for a child link between the relay node and a child node.

Another apparatus for wireless communications at a parent node is described. The apparatus may include means for communicating with a relay node operating in a time division multiplexing (TDM) mode via a parent link between the relay node and the parent node, transmitting control signaling scheduling a first transmission between the relay node and the parent node via the parent link, and receiving, based on the control signaling, a conflict indication indicating a TDM alignment conflict between the first transmission and a second transmission scheduled for a child link between the relay node and a child node.

A non-transitory computer-readable medium storing code for wireless communications at a parent node is described. The code may include instructions executable by a processor to communicate with a relay node operating in a time division multiplexing (TDM) mode via a parent link between the relay node and the parent node, transmit control signaling scheduling a first transmission between the relay node and the parent node via the parent link, and receive, based on the control signaling, a conflict indication indicating a TDM alignment conflict between the first transmission and a second transmission scheduled for a child link between the relay node and a child node.

In some examples of the method, apparatuses, and non-transitory computer-readable medium described herein, receiving the conflict indication may include operations, features, means, or instructions for receiving the conflict indication including a cancellation message indicating cancellation of at least a portion of the first transmission for at least a portion of an allocated resource.

In some examples of the method, apparatuses, and non-transitory computer-readable medium described herein, receiving the conflict indication may include operations, features, means, or instructions for receiving the conflict indication including the cancellation message prior to the allocated resource.

In some examples of the method, apparatuses, and non-transitory computer-readable medium described herein, receiving the conflict indication may include operations, features, means, or instructions for receiving the conflict indication including the cancellation message indicating cancellation of at least the portion of the first transmission that may be an uplink transmission or a downlink transmission scheduled via the parent link.

Some examples of the method, apparatuses, and non-transitory computer-readable medium described herein may further include operations, features, means, or instructions for transmitting second control signaling reallocating the at least the portion of the allocated resource based on the cancellation message.

Some examples of the method, apparatuses, and non-transitory computer-readable medium described herein may further include operations, features, means, or instructions for refraining from monitoring for feedback information from the relay node based on the cancellation message, where the first transmission includes a downlink transmission from the parent node to the relay node, and initiating retransmission of the first transmission based on the refraining.

In some examples of the method, apparatuses, and non-transitory computer-readable medium described herein, receiving the conflict indication may include operations, features, means, or instructions for receiving the conflict indication including an interruption message indicating interruption of at least a portion of the first transmission for at least a portion of an allocated resource.

In some examples of the method, apparatuses, and non-transitory computer-readable medium described herein, receiving the conflict indication may include operations, features, means, or instructions for receiving the conflict indication including the interruption message after the allocated resource.

In some examples of the method, apparatuses, and non-transitory computer-readable medium described herein, receiving the conflict indication may include operations, features, means, or instructions for receiving the conflict indication including the interruption message indicating interruption of at least the portion of the first transmission that may be an uplink transmission or a downlink transmission scheduled via the parent link.

Some examples of the method, apparatuses, and non-transitory computer-readable medium described herein may further include operations, features, means, or instructions for discarding one or more measurements performed on the first transmissions, where the first transmission includes a sounding reference signal.

Some examples of the method, apparatuses, and non-transitory computer-readable medium described herein may further include operations, features, means, or instructions for transmitting control signaling scheduling the first transmission between the relay node and the parent node via the parent link.

In some examples of the method, apparatuses, and non-transitory computer-readable medium described herein, receiving the conflict indication may include operations, features, means, or instructions for receiving the conflict indication that includes a bitmap indicating a cancelled or interrupted resource over one or more transmission time intervals.

Some examples of the method, apparatuses, and non-transitory computer-readable medium described herein may further include operations, features, means, or instructions for transmitting a list configuration indicating a list of one or more resources over one or more transmission time intervals, and receiving the conflict indication that includes an index indicating a first resource from the list may be a cancelled resource or an interrupted resource.

Some examples of the method, apparatuses, and non-transitory computer-readable medium described herein may further include operations, features, means, or instructions for transmitting scheduling control signaling indicating a first semi-persistent resource or a first dynamic resource in which the first transmission may be scheduled for transmission.

In some examples of the method, apparatuses, and non-transitory computer-readable medium described herein, receiving the conflict indication may include operations, features, means, or instructions for receiving the conflict indication indicating cancellation of the first transmission based on a priority of the parent link relative to the child link.

In some examples of the method, apparatuses, and non-transitory computer-readable medium described herein, receiving the conflict indication may include operations, features, means, or instructions for receiving the conflict indication via a control channel, a medium access control (MAC) control element, or both.

Some examples of the method, apparatuses, and non-transitory computer-readable medium described herein may further include operations, features, means, or instructions for transmitting second control signaling rescheduling at least a portion of the first transmission based on the conflict indication, and communicating the at least a portion of the first transmission based on control signaling.

A method of wireless communications at a child node is described. The method may include communicating with a relay node operating in a time division multiplexing mode via a child link between the relay node and the child node, receiving control signaling scheduling a second transmission between the relay node and the child node via the child link, and receiving, based on the control signaling, a conflict indication indicating a TDM alignment conflict between the second transmission and a first transmission scheduled for a parent link between the relay node and a parent node.

An apparatus for wireless communications at a child node is described. The apparatus may include a processor, memory coupled with the processor, and instructions stored in the memory. The instructions may be executable by the processor to cause the apparatus to communicate with a relay node operating in a time division multiplexing mode via a child link between the relay node and the child node, receive control signaling scheduling a second transmission between the relay node and the child node via the child link, and receive, based on the control signaling, a conflict indication indicating a TDM alignment conflict between the second transmission and a first transmission scheduled for a parent link between the relay node and a parent node.

Another apparatus for wireless communications at a child node is described. The apparatus may include means for communicating with a relay node operating in a time division multiplexing mode via a child link between the relay node and the child node, receiving control signaling scheduling a second transmission between the relay node and the child node via the child link, and receiving, based on the control signaling, a conflict indication indicating a TDM alignment conflict between the second transmission and a first transmission scheduled for a parent link between the relay node and a parent node.

A non-transitory computer-readable medium storing code for wireless communications at a child node is described. The code may include instructions executable by a processor to communicate with a relay node operating in a time division multiplexing mode via a child link between the relay node and the child node, receive control signaling scheduling a second transmission between the relay node and the child node via the child link, and receive, based on the control signaling, a conflict indication indicating a TDM alignment conflict between the second transmission and a first transmission scheduled for a parent link between the relay node and a parent node.

In some examples of the method, apparatuses, and non-transitory computer-readable medium described herein, receiving the conflict indication may include operations, features, means, or instructions for receiving the conflict indication including a cancellation message indicating cancellation of at least a portion of the second transmission for at least a portion of an allocated resource.

In some examples of the method, apparatuses, and non-transitory computer-readable medium described herein, receiving the conflict indication may include operations, features, means, or instructions for receiving the conflict indication including the cancellation message prior to the allocated resource.

In some examples of the method, apparatuses, and non-transitory computer-readable medium described herein, receiving the conflict indication may include operations, features, means, or instructions for receiving the conflict indication including the cancellation message indicating cancellation of at least the portion of the second transmission that may be an uplink transmission or a downlink transmission scheduled via the child link.

Some examples of the method, apparatuses, and non-transitory computer-readable medium described herein may further include operations, features, means, or instructions for transmitting second control signaling reallocating the at least the portion of the allocated resource based on the cancellation message.

Some examples of the method, apparatuses, and non-transitory computer-readable medium described herein may further include operations, features, means, or instructions for discarding the first transmission from a set of downlink transmissions, and performing a feedback combination procedure based on the discarding.

In some examples of the method, apparatuses, and non-transitory computer-readable medium described herein, receiving the conflict indication may include operations, features, means, or instructions for receiving the conflict indication including an interruption message indicating interruption of at least a portion of the first transmission for at least a portion of an allocated resource.

In some examples of the method, apparatuses, and non-transitory computer-readable medium described herein, receiving the conflict indication may include operations, features, means, or instructions for receiving the conflict indication including the interruption message after the allocated resource.

In some examples of the method, apparatuses, and non-transitory computer-readable medium described herein, receiving the conflict indication may include operations, features, means, or instructions for receiving the conflict indication including the interruption message indicating interruption of at least the portion of the second transmission that may be an uplink transmission or a downlink transmission scheduled via the child link.

In some examples of the method, apparatuses, and non-transitory computer-readable medium described herein, receiving the conflict indication may include operations, features, means, or instructions for refraining from incrementing a transmission counter, where the second transmission includes a scheduling request or a random access message.

In some examples of the method, apparatuses, and non-transitory computer-readable medium described herein, receiving the conflict indication may include operations, features, means, or instructions for receiving the conflict indication that includes a bitmap indicating a cancelled or interrupted resource over one or more transmission time intervals.

Some examples of the method, apparatuses, and non-transitory computer-readable medium described herein may further include operations, features, means, or instructions for receiving a list configuration indicating a list of one or more resources over one or more transmission time intervals, and receiving the conflict indication that includes an index indicating a first resource from the list may be a cancelled resource or an interrupted resource.

Some examples of the method, apparatuses, and non-transitory computer-readable medium described herein may further include operations, features, means, or instructions for receiving scheduling control signaling indicating a first semi-persistent resource or a first dynamic resource in which the second transmission may be scheduled for transmission.

In some examples of the method, apparatuses, and non-transitory computer-readable medium described herein, receiving the conflict indication may include operations, features, means, or instructions for receiving the conflict indication indicating cancellation of the second transmission based on a priority of the parent link relative to the child link.

In some examples of the method, apparatuses, and non-transitory computer-readable medium described herein, receiving the conflict indication may include operations, features, means, or instructions for receiving the conflict indication via a control channel, a medium access control (MAC) control element, or both.

DETAILED DESCRIPTION

Figure 1:
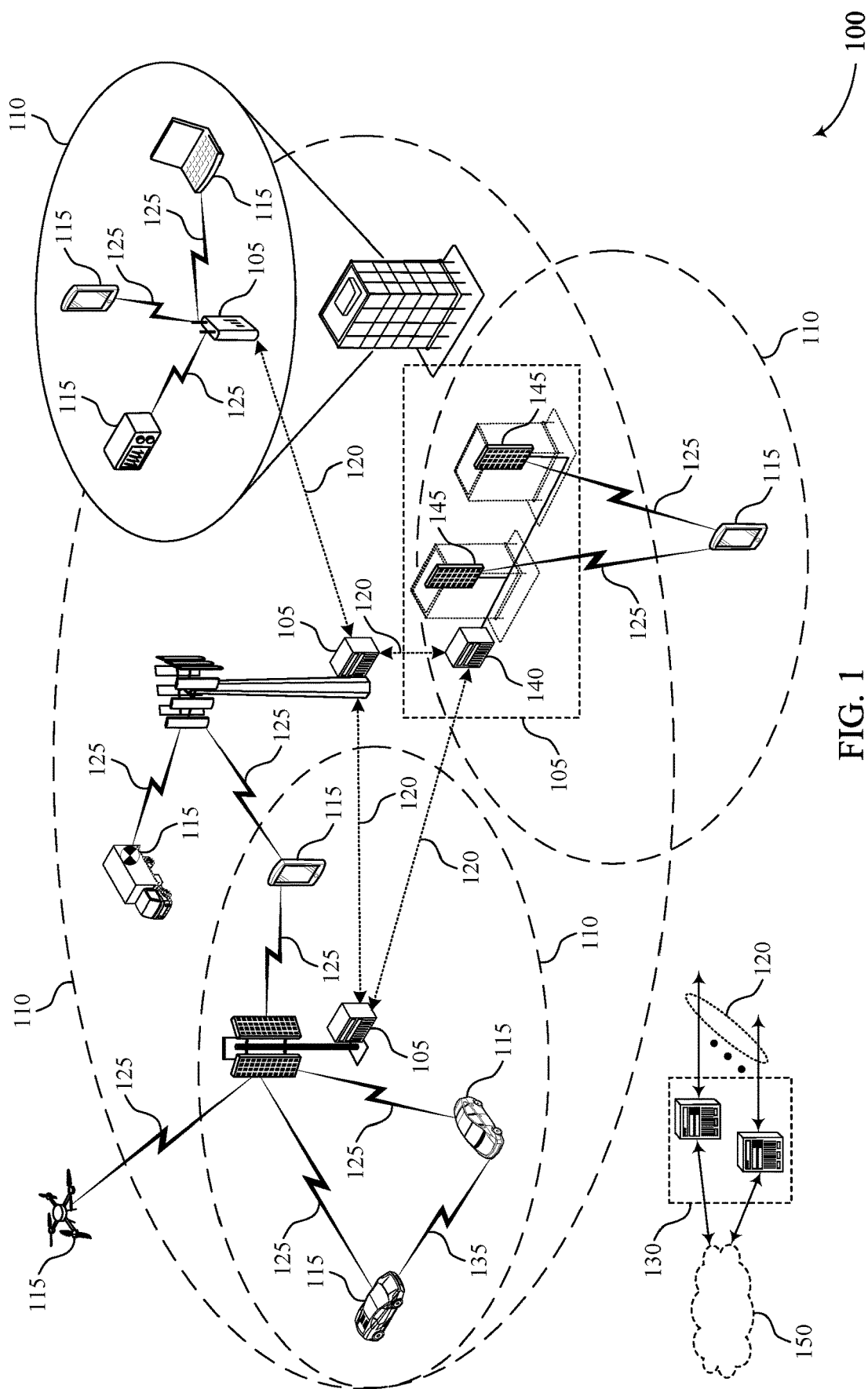
FIG. 1 illustrates an example of a system for wireless communications that supports cancellation and interruption indications in integrated access and backhaul (IAB) networks in accordance with aspects of the present disclosure.

In some wireless communications systems it may be desirable to deploy a large number of network devices (e.g., nodes) in a small area to provide acceptable coverage to users. In such deployments, it may be impractical to connect each access node to the network via a wired connection. Therefore, some communications systems (e.g., 5G new radio (NR) systems) may include infrastructure and spectral resources for wireless network access that additionally supports wireless backhaul link capabilities in supplement to wireline backhaul connections (e.g., providing an integrated access and backhaul (IAB) network architecture). Such systems may support both wireless access traffic (e.g., between nodes and user equipments (UEs)) and backhaul traffic (e.g., traffic between separate nodes). For example, network devices may support an IAB network (e.g., a self-backhauling network), where the network may share time and frequency resources between access traffic and backhaul traffic. In some cases, the IAB network may be implemented for millimeter-wave (mmW) systems (e.g., with narrow beams through beamforming techniques) to minimize interference (e.g., inter-link interference) between the different transmissions. Accordingly, the IAB network may enhance link capacity, reduce latency, and reduce cell deployment cost within the wireless communications system.

For example, an IAB network architecture may include a chain of connected wireless devices (e.g., starting with a donor node connected to the core network and ending with a UE, with any number of relay nodes in between). Wireless devices may be connected via link resources that support network access (e.g., NR access) and backhaul capabilities (e.g., a wireline backhaul or wireless backhaul). A relay node or relay network device may refer to an intermediary node in a relay chain (e.g., an intermediary node in an IAB relay chain). For example, a relay node may relay communications between a parent node (e.g., an IAB donor, or an IAB node upstream or higher on the relay chain) and a child node (e.g., an IAB node downstream or lower on the relay chain). Thus, a relay node may have an established communication link with a parent node (e.g., an established parent link for backhaul communications) as well as an established communication link with each child node (e.g., one or more established child links). While various examples provided herein describe IAB networks, the described techniques for improved resource management communication efficiency for parent and child links in an IAB network may be generally applied to any type of wireless network.

IAB nodes may be split into associated mobile-termination (MT) functionality and distributed unit (DU) functionality. MT functionality for a relay node may be controlled and or scheduled by a parent node (e.g., a donor node or another upstream node acting as a parent node with respect to the relay node) of the established connectivity via access and backhaul links of a coverage area. DU functionality may schedule child IAB nodes and UEs, and may control both access links and backhaul links under its coverage.

In some wireless communications systems, such as IAB networks, some IAB nodes (e.g., parent nodes, relay nodes, or child nodes) may operate using a time division multiplexing (TDM) mode, or a more advanced multiplexing scheme. For instance, an IAB node may operate in a TDM mode based on its own capabilities. That is, some IAB nodes may not be capable of operating in a more advanced multiplexing mode, and may communicate with a parent node, a child node, or both, in a TDM mode. In some examples, an IAB node may be capable of operating according to a more advanced multiplexing mode. For example, a relay node may be capable of communicating with a parent node via a parent link, and simultaneously communicating with multiple child nodes via multiple child links. For instance, while communicating with a parent node (e.g., transmitting an uplink signal or receiving a downlink signal) the relay node may be receiving simultaneous uplink signals from child nodes, or transmitting simultaneous downlink signals to child nodes. However, in some scenarios, an IAB node that is capable of advanced multiplexing schemes may be configured to utilize a TDM mode for a period of time, or may elect to operate under a TDM mode for a period of time based on changes in environment, signaling or quality requirements, or the like.

In some scenarios, when operating in a TDM mode, parent node transmissions and child node transmissions for a relay node may conflict (e.g., a parent node and a child node may wish to communicate with a node at the same time). A parent node may serve as a scheduler over its child link (the link between the node and its child node). For each node, a time resource may be associated with a resource type, which may define the usage of the resource by the node over its child link. Resource types may include hard, soft, and not available (NA). A hard resource of a device may refer to a resource that is available (e.g. controlled or configurable) by this device over its child link. A soft resource of a particular device may refer to a resource that is controlled by the parent node of the particular device (e.g., a resource that must be approved or authorized by a parent node of the particular device for use). A NA resource of the particular device may refer to a resource that may not be used by the device over a child link.

Generally, a central unit (CU) that controls an IAB network through configuration, may configure multiple devices operating in TDM mode such that a parent node and a child node (e.g., a parent node and a relay node, a relay node and a child node, or the like) successfully communicate without conflicting transmissions. However, in some examples, a relay node may be scheduled with hard resources for communication with a parent node, and hard resources for communication with a child node that partially or completely overlap. In some examples, despite TDM scheduling to avoid hard resource conflicts, a portion of a first transmission may overlap with a portion of a second transmissions (e.g., due to propagation delay, processing delay, or the like). In such examples, a collision may occur (e.g., a TDM alignment conflict), resulting in interference that may cause partial or complete decoding failure of scheduled transmissions.

An IAB node (e.g., a relay node) may identify such a TDM alignment conflict between a first transmission scheduled on a parent link, and a second transmission scheduled on a child link, and may transmit a conflict indication to one or more of the parent node or the child node. The TDM alignment conflict may be situation in which a relay node, operating in TDM mode, is to transmit and receive simultaneously via a parent link and a child link, in violation of TDM mode operation. The IAB node may transmit the conflict indication to resolve the TDM alignment conflict, as described herein. The first transmission (e.g., an uplink signal or a downlink signal) may be scheduled on hard resources, and the second transmissions (e.g., an uplink signal or a downlink signal) may also be scheduled on hard resources. In such examples, the relay node may determine a link priority (e.g., a priority of the parent link relative to the child link). If there is enough time prior to the identified conflict, the relay node may transmit a cancellation message (e.g., an MT cancellation message to the parent node via the parent link, or a DU cancellation message to the child node via the child link). The cancellation message may indicate, to the parent node, a cancellation of at least a portion of the first transmission, or may indicate, to the child node, a cancellation of at least a portion of the second transmission. If there is not enough time prior to the identified conflict, the relay node may transmit an interruption message (e.g., an MT interruption message to the parent node via the parent link, or a DU interruption message to the child node via the child link). The interruption message may indicate, to the parent node, an interruption of at least a portion of the first transmission, or may indicate, to the child node, an interruption of at least a portion of the second transmission. A parent node or child node that receives a conflict indication may take appropriate action to cancel or ignore a pending transmissions, reassign available resources, reschedule failed or canceled transmissions, adjust one or more communication procedures, or the like.

Particular aspects of the subject matter described herein may be implemented to realize one or more advantages. The described techniques may support improvements in system efficiency such that a parent node or a child node in an IAB system may avoid a conflicting transmissions in a TDM mode before the conflict occurs, or reduce negative impacts of a conflict after it occurs. This may result in improved system efficiency, power savings, increased accuracy in measurement procedures, beam forming, beam tracking, or link management procedures, or the like. As such, supported techniques may include improved network operations and, in some examples, may promote device and network efficiencies, among other benefits.

Aspects of the disclosure are initially described in the context of wireless communications systems. Aspects of the disclosure are further illustrated by and described with reference to resource allocations, timelines, and process flows. Aspects of the disclosure are further illustrated by and described with reference to apparatus diagrams, system diagrams, and flowcharts that relate to cancellation and interruption indications in IAB networks.

FIG. 1 illustrates an example of a wireless communications system 100 that supports cancellation and interruption indications in IAB networks in accordance with aspects of the present disclosure. The wireless communications system 100 may include one or more base stations 105, one or more UEs 115, and a core network 130. In some examples, the wireless communications system 100 may be a Long Term Evolution (LTE) network, an LTE-Advanced (LTE-A) network, an LTE-A Pro network, or a New Radio (NR) network. In some examples, the wireless communications system 100 may support enhanced broadband communications, ultra-reliable (e.g., mission critical) communications, low latency communications, communications with low-cost and low-complexity devices, or any combination thereof.

The base stations 105 may be dispersed throughout a geographic area to form the wireless communications system 100 and may be devices in different forms or having different capabilities. The base stations 105 and the UEs 115 may wirelessly communicate via one or more communication links 125. Each base station 105 may provide a coverage area 110 over which the UEs 115 and the base station 105 may establish one or more communication links 125. The coverage area 110 may be an example of a geographic area over which a base station 105 and a UE 115 may support the communication of signals according to one or more radio access technologies.

The UEs 115 may be dispersed throughout a coverage area 110 of the wireless communications system 100, and each UE 115 may be stationary, or mobile, or both at different times. The UEs 115 may be devices in different forms or having different capabilities. Some example UEs 115 are illustrated in FIG. 1. The UEs 115 described herein may be able to communicate with various types of devices, such as other UEs 115, the base stations 105, or network equipment (e.g., core network nodes, relay devices, integrated access and backhaul (IAB) nodes, or other network equipment), as shown in FIG. 1.

The base stations 105 may communicate with the core network 130, or with one another, or both. For example, the base stations 105 may interface with the core network 130 through one or more backhaul links 120 (e.g., via an S1, N2, N3, or other interface). The base stations 105 may communicate with one another over the backhaul links 120 (e.g., via an X2, Xn, or other interface) either directly (e.g., directly between base stations 105), or indirectly (e.g., via core network 130), or both. In some examples, the backhaul links 120 may be or include one or more wireless links.

One or more of the base stations 105 described herein may include or may be referred to by a person having ordinary skill in the art as a base transceiver station, a radio base station, an access point, a radio transceiver, a NodeB, an eNodeB (eNB), a next-generation NodeB or a giga-NodeB (either of which may be referred to as a gNB), a Home NodeB, a Home eNodeB, or other suitable terminology.

A UE 115 may include or may be referred to as a mobile device, a wireless device, a remote device, a handheld device, or a subscriber device, or some other suitable terminology, where the "device" may also be referred to as a unit, a station, a terminal, or a client, among other examples. A UE 115 may also include or may be referred to as a personal electronic device such as a cellular phone, a personal digital assistant (PDA), a tablet computer, a laptop computer, or a personal computer. In some examples, a UE 115 may include or be referred to as a wireless local loop (WLL) station, an Internet of Things (IoT) device, an Internet of Everything (IoE) device, or a machine type communications (MTC) device, among other examples, which may be implemented in various objects such as appliances, or vehicles, meters, among other examples.

The UEs 115 described herein may be able to communicate with various types of devices, such as other UEs 115 that may sometimes act as relays as well as the base stations 105 and the network equipment including macro eNBs or gNBs, small cell eNBs or gNBs, or relay base stations, among other examples, as shown in FIG. 1.

The UEs 115 and the base stations 105 may wirelessly communicate with one another via one or more communication links 125 over one or more carriers. The term "carrier" may refer to a set of radio frequency spectrum resources having a defined physical layer structure for supporting the communication links 125. For example, a carrier used for a communication link 125 may include a portion of a radio frequency spectrum band (e.g., a bandwidth part (BWP)) that is operated according to one or more physical layer channels for a given radio access technology (e.g., LTE, LTE-A, LTE-A Pro, NR). Each physical layer channel may carry acquisition signaling (e.g., synchronization signals, system information), control signaling that coordinates operation for the carrier, user data, or other signaling. The wireless communications system 100 may support communication with a UE 115 using carrier aggregation or multi-carrier operation. A UE 115 may be configured with multiple downlink component carriers and one or more uplink component carriers according to a carrier aggregation configuration. Carrier aggregation may be used with both frequency division duplexing (FDD) and time division duplexing (TDD) component carriers.

In some examples (e.g., in a carrier aggregation configuration), a carrier may also have acquisition signaling or control signaling that coordinates operations for other carriers. A carrier may be associated with a frequency channel (e.g., an evolved universal mobile telecommunication system terrestrial radio access (E-UTRA) absolute radio frequency channel number (EARFCN)) and may be positioned according to a channel raster for discovery by the UEs 115. A carrier may be operated in a standalone mode where initial acquisition and connection may be conducted by the UEs 115 via the carrier, or the carrier may be operated in a non-standalone mode where a connection is anchored using a different carrier (e.g., of the same or a different radio access technology).

The communication links 125 shown in the wireless communications system 100 may include uplink transmissions from a UE 115 to a base station 105, or downlink transmissions from a base station 105 to a UE 115. Carriers may carry downlink or uplink communications (e.g., in an FDD mode) or may be configured to carry downlink and uplink communications (e.g., in a TDD mode).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of determined bandwidths for carriers of a particular radio access technology (e.g., 1.4, 3, 5, 10, 15, 20, 40, or 80 megahertz (MHz)). Devices of the wireless communications system 100 (e.g., the base stations 105, the UEs 115, or both) may have hardware configurations that support communications over a particular carrier bandwidth or may be configurable to support communications over one of a set of carrier bandwidths. In some examples, the wireless communications system 100 may include base stations 105 or UEs 115 that support simultaneous communications via carriers associated with multiple carrier bandwidths. In some examples, each served UE 115 may be configured for operating over portions (e.g., a sub-band, a BWP) or all of a carrier bandwidth.

Signal waveforms transmitted over a carrier may be made up of multiple subcarriers (e.g., using multi-carrier modulation (MCM) techniques such as orthogonal frequency division multiplexing (OFDM) or discrete Fourier transform spread OFDM (DFT-S-OFDM)). In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme, the coding rate of the modulation scheme, or both). Thus, the more resource elements that a UE 115 receives and the higher the order of the modulation scheme, the higher the data rate may be for the UE 115. A wireless communications resource may refer to a combination of a radio frequency spectrum resource, a time resource, and a spatial resource (e.g., spatial layers or beams), and the use of multiple spatial layers may further increase the data rate or data integrity for communications with a UE 115.

One or more numerologies for a carrier may be supported, where a numerology may include a subcarrier spacing ($\Delta f$) and a cyclic prefix. A carrier may be divided into one or more BWPs having the same or different numerologies. In some examples, a UE 115 may be configured with multiple BWPs. In some examples, a single BWP for a carrier may be active at a given time and communications for the UE 115 may be restricted to one or more active BWPs.

The time intervals for the base stations 105 or the UEs 115 may be expressed in multiples of a basic time unit which may, for example, refer to a sampling period of $T_s=1/(\Delta f_{max} \cdot N_f)$ seconds, where $\Delta f_{max}$ may represent the maximum supported subcarrier spacing, and $N_f$ may represent the maximum supported discrete Fourier transform (DFT) size.

Time intervals of a communications resource may be organized according to radio frames each having a specified duration (e.g., 10 milliseconds (ms)). Each radio frame may be identified by a system frame number (SFN) (e.g., ranging from 0 to 1023).

Each frame may include multiple consecutively numbered subframes or slots, and each subframe or slot may have the same duration. In some examples, a frame may be divided (e.g., in the time domain) into subframes, and each subframe may be further divided into a number of slots. Alternatively, each frame may include a variable number of slots, and the number of slots may depend on subcarrier spacing. Each slot may include a number of symbol periods (e.g., depending on the length of the cyclic prefix prepended to each symbol period). In some wireless communications systems 100, a slot may further be divided into multiple mini-slots containing one or more symbols. Excluding the cyclic prefix, each symbol period may contain one or more (e.g., $N_f$) sampling periods. The duration of a symbol period may depend on the subcarrier spacing or frequency band of operation.

A subframe, a slot, a mini-slot, or a symbol may be the smallest scheduling unit (e.g., in the time domain) of the wireless communications system 100 and may be referred to as a transmission time interval (TTI). In some examples, the TTI duration (e.g., the number of symbol periods in a TTI) may be variable. Additionally, or alternatively, the smallest scheduling unit of the wireless communications system 100 may be dynamically selected (e.g., in bursts of shortened TTIs (sTTIs)).

Physical channels may be multiplexed on a carrier according to various techniques. A physical control channel and a physical data channel may be multiplexed on a downlink carrier, for example, using one or more of time division multiplexing (TDM) techniques, frequency division multiplexing (FDM) techniques, or hybrid TDM-FDM techniques. A control region (e.g., a control resource set (CORESET)) for a physical control channel may be defined by a number of symbol periods and may extend across the system bandwidth or a subset of the system bandwidth of the carrier. One or more control regions (e.g., CORESETs) may be configured for a set of the UEs 115. For example, one or more of the UEs 115 may monitor or search control regions for control information according to one or more search space sets, and each search space set may include one or multiple control channel candidates in one or more aggregation levels arranged in a cascaded manner. An aggregation level for a control channel candidate may refer to a number of control channel resources (e.g., control channel elements (CCEs)) associated with encoded information for a control information format having a given payload size. Search space sets may include common search space sets configured for sending control information to multiple UEs 115 and UE-specific search space sets for sending control information to a specific UE 115.

Each base station 105 may provide communication coverage via one or more cells, for example a macro cell, a small cell, a hot spot, or other types of cells, or any combination thereof. The term "cell" may refer to a logical communication entity used for communication with a base station 105 (e.g., over a carrier) and may be associated with an identifier for distinguishing neighboring cells (e.g., a physical cell identifier (PCID), a virtual cell identifier (VCID), or others). In some examples, a cell may also refer to a geographic coverage area 110 or a portion of a geographic coverage area 110 (e.g., a sector) over which the logical communication entity operates. Such cells may range from smaller areas (e.g., a structure, a subset of structure) to larger areas depending on various factors such as the capabilities of the base station 105. For example, a cell may be or include a building, a subset of a building, or exterior spaces between or overlapping with geographic coverage areas 110, among other examples.

A macro cell generally covers a relatively large geographic area (e.g., several kilometers in radius) and may allow unrestricted access by the UEs 115 with service subscriptions with the network provider supporting the macro cell. A small cell may be associated with a lower-powered base station 105, as compared with a macro cell, and a small cell may operate in the same or different (e.g., licensed, unlicensed) frequency bands as macro cells. Small cells may provide unrestricted access to the UEs 115 with service subscriptions with the network provider or may provide restricted access to the UEs 115 having an association with the small cell (e.g., the UEs 115 in a closed subscriber group (CSG), the UEs 115 associated with users in a home or office). A base station 105 may support one or multiple cells and may also support communications over the one or more cells using one or multiple component carriers.

In some examples, a carrier may support multiple cells, and different cells may be configured according to different protocol types (e.g., MTC, narrowband IoT (NB-IoT), enhanced mobile broadband (eMBB)) that may provide access for different types of devices.

In some examples, a base station 105 may be movable and therefore provide communication coverage for a moving geographic coverage area 110. In some examples, different geographic coverage areas 110 associated with different technologies may overlap, but the different geographic coverage areas 110 may be supported by the same base station 105. In other examples, the overlapping geographic coverage areas 110 associated with different technologies may be supported by different base stations 105. The wireless communications system 100 may include, for example, a heterogeneous network in which different types of the base stations 105 provide coverage for various geographic coverage areas 110 using the same or different radio access technologies.

The wireless communications system 100 may support synchronous or asynchronous operation. For synchronous operation, the base stations 105 may have similar frame timings, and transmissions from different base stations 105 may be approximately aligned in time. For asynchronous operation, the base stations 105 may have different frame timings, and transmissions from different base stations 105 may, in some examples, not be aligned in time. The techniques described herein may be used for either synchronous or asynchronous operations.

Some UEs 115, such as MTC or IoT devices, may be low cost or low complexity devices and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay such information to a central server or application program that makes use of the information or presents the information to humans interacting with the application program. Some UEs 115 may be designed to collect information or enable automated behavior of machines or other devices. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples, half-duplex communications may be performed at a reduced peak rate. Other power conservation techniques for the UEs 115 include entering a power saving deep sleep mode when not engaging in active communications, operating over a limited bandwidth (e.g., according to narrowband communications), or a combination of these techniques. For example, some UEs 115 may be configured for operation using a narrowband protocol type that is associated with a defined portion or range (e.g., set of subcarriers or resource blocks (RBs)) within a carrier, within a guard-band of a carrier, or outside of a carrier.

The wireless communications system 100 may be configured to support ultra-reliable communications or low-latency communications, or various combinations thereof. For example, the wireless communications system 100 may be configured to support ultra-reliable low-latency communications (URLLC) or mission critical communications. The UEs 115 may be designed to support ultra-reliable, low-latency, or critical functions (e.g., mission critical functions). Ultra-reliable communications may include private communication or group communication and may be supported by one or more mission critical services such as mission critical push-to-talk (MCPTT), mission critical video (MCVideo), or mission critical data (MCData). Support for mission critical functions may include prioritization of services, and mission critical services may be used for public safety or general commercial applications. The terms ultra-reliable, low-latency, mission critical, and ultra-reliable low-latency may be used interchangeably herein.

In some examples, a UE 115 may also be able to communicate directly with other UEs 115 over a device-to-device (D2D) communication link 135 (e.g., using a peer-to-peer (P2P) or D2D protocol). One or more UEs 115 utilizing D2D communications may be within the geographic coverage area 110 of a base station 105. Other UEs 115 in such a group may be outside the geographic coverage area 110 of a base station 105 or be otherwise unable to receive transmissions from a base station 105. In some examples, groups of the UEs 115 communicating via D2D communications may utilize a one-to-many (1:M) system in which each UE 115 transmits to every other UE 115 in the group. In some examples, a base station 105 facilitates the scheduling of resources for D2D communications. In other cases, D2D communications are carried out between the UEs 115 without the involvement of a base station 105.

In some systems, the D2D communication link 135 may be an example of a communication channel, such as a sidelink communication channel, between vehicles (e.g., UEs 115). In some examples, vehicles may communicate using vehicle-to-everything (V2X) communications, vehicle-to-vehicle (V2V) communications, or some combination of these. A vehicle may signal information related to traffic conditions, signal scheduling, weather, safety, emergencies, or any other information relevant to a V2X system. In some examples, vehicles in a V2X system may communicate with roadside infrastructure, such as roadside units, or with the network via one or more network nodes (e.g., base stations 105) using vehicle-to-network (V2N) communications, or with both.

The core network 130 may provide user authentication, access authorization, tracking, Internet Protocol (IP) connectivity, and other access, routing, or mobility functions. The core network 130 may be an evolved packet core (EPC) or 5G core (5GC), which may include at least one control plane entity that manages access and mobility (e.g., a mobility management entity (MME), an access and mobility management function (AMF)) and at least one user plane entity that routes packets or interconnects to external networks (e.g., a serving gateway (S-GW), a Packet Data Network (PDN) gateway (P-GW), or a user plane function (UPF)). The control plane entity may manage non-access stratum (NAS) functions such as mobility, authentication, and bearer management for the UEs 115 served by the base stations 105 associated with the core network 130. User IP packets may be transferred through the user plane entity, which may provide IP address allocation as well as other functions. The user plane entity may be connected to the network operators IP services 150. The operators IP services 150 may include access to the Internet, Intranet(s), an IP Multimedia Subsystem (IMS), or a Packet-Switched Streaming Service.

Some of the network devices, such as a base station 105, may include subcomponents such as an access network entity 140, which may be an example of an access node controller (ANC). Each access network entity 140 may communicate with the UEs 115 through one or more other access network transmission entities 145, which may be referred to as radio heads, smart radio heads, or transmission/reception points (TRPs). Each access network transmission entity 145 may include one or more antenna panels. In some configurations, various functions of each access network entity 140 or base station 105 may be distributed across various network devices (e.g., radio heads and ANCs) or consolidated into a single network device (e.g., a base station 105).

The wireless communications system 100 may operate using one or more frequency bands, typically in the range of 300 megahertz (MHz) to 300 gigahertz (GHz). Generally, the region from 300 MHz to 3 GHz is known as the ultra-high frequency (UHF) region or decimeter band because the wavelengths range from approximately one decimeter to one meter in length. The UHF waves may be blocked or redirected by buildings and environmental features, but the waves may penetrate structures sufficiently for a macro cell to provide service to the UEs 115 located indoors. The transmission of UHF waves may be associated with smaller antennas and shorter ranges (e.g., less than 100 kilometers) compared to transmission using the smaller frequencies and longer waves of the high frequency (HF) or very high frequency (VHF) portion of the spectrum below 300 MHz.

The wireless communications system 100 may also operate in a super high frequency (SHF) region using frequency bands from 3 GHz to 30 GHz, also known as the centimeter band, or in an extremely high frequency (EHF) region of the spectrum (e.g., from 30 GHz to 300 GHz), also known as the millimeter band. In some examples, the wireless communications system 100 may support millimeter wave (mmW) communications between the UEs 115 and the base stations 105, and EHF antennas of the respective devices may be smaller and more closely spaced than UHF antennas. In some examples, this may facilitate use of antenna arrays within a device. The propagation of EHF transmissions, however, may be subject to even greater atmospheric attenuation and shorter range than SHF or UHF transmissions. The techniques disclosed herein may be employed across transmissions that use one or more different frequency regions, and designated use of bands across these frequency regions may differ by country or regulating body.

The wireless communications system 100 may utilize both licensed and unlicensed radio frequency spectrum bands. For example, the wireless communications system 100 may employ License Assisted Access (LAA), LTE-Unlicensed (LTE-U) radio access technology, or NR technology in an unlicensed band such as the 5 GHz industrial, scientific, and medical (ISM) band. When operating in unlicensed radio frequency spectrum bands, devices such as the base stations 105 and the UEs 115 may employ carrier sensing for collision detection and avoidance. In some examples, operations in unlicensed bands may be based on a carrier aggregation configuration in conjunction with component carriers operating in a licensed band (e.g., LAA). Operations in unlicensed spectrum may include downlink transmissions, uplink transmissions, P2P transmissions, or D2D transmissions, among other examples.

A base station 105 or a UE 115 may be equipped with multiple antennas, which may be used to employ techniques such as transmit diversity, receive diversity, multiple-input multiple-output (MIMO) communications, or beamforming. The antennas of a base station 105 or a UE 115 may be located within one or more antenna arrays or antenna panels, which may support MIMO operations or transmit or receive beamforming. For example, one or more base station antennas or antenna arrays may be co-located at an antenna assembly, such as an antenna tower. In some examples, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations. Additionally, or alternatively, an antenna panel may support radio frequency beamforming for a signal transmitted via an antenna port.

The base stations 105 or the UEs 115 may use MIMO communications to exploit multipath signal propagation and increase the spectral efficiency by transmitting or receiving multiple signals via different spatial layers. Such techniques may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream and may carry bits associated with the same data stream (e.g., the same codeword) or different data streams (e.g., different codewords). Different spatial layers may be associated with different antenna ports used for channel measurement and reporting. MIMO techniques include single-user MIMO (SU-MIMO), where multiple spatial layers are transmitted to the same receiving device, and multiple-user MIMO (MU-MIMO), where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105, a UE 115) to shape or steer an antenna beam (e.g., a transmit beam, a receive beam) along a spatial path between the transmitting device and the receiving device. Beamforming may be achieved by combining the signals communicated via antenna elements of an antenna array such that some signals propagating at particular orientations with respect to an antenna array experience constructive interference while others experience destructive interference. The adjustment of signals communicated via the antenna elements may include a transmitting device or a receiving device applying amplitude offsets, phase offsets, or both to signals carried via the antenna elements associated with the device. The adjustments associated with each of the antenna elements may be defined by a beamforming weight set associated with a particular orientation (e.g., with respect to the antenna array of the transmitting device or receiving device, or with respect to some other orientation).

A base station 105 or a UE 115 may use beam sweeping techniques as part of beam forming operations. For example, a base station 105 may use multiple antennas or antenna arrays (e.g., antenna panels) to conduct beamforming operations for directional communications with a UE 115. Some signals (e.g., synchronization signals, reference signals, beam selection signals, or other control signals) may be transmitted by a base station 105 multiple times in different directions. For example, the base station 105 may transmit a signal according to different beamforming weight sets associated with different directions of transmission. Transmissions in different beam directions may be used to identify (e.g., by a transmitting device, such as a base station 105, or by a receiving device, such as a UE 115) a beam direction for later transmission or reception by the base station 105.

Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based on a signal that was transmitted in one or more beam directions. For example, a UE 115 may receive one or more of the signals transmitted by the base station 105 in different directions and may report to the base station 105 an indication of the signal that the UE 115 received with a highest signal quality or an otherwise acceptable signal quality.

In some examples, transmissions by a device (e.g., by a base station 105 or a UE 115) may be performed using multiple beam directions, and the device may use a combination of digital precoding or radio frequency beamforming to generate a combined beam for transmission (e.g., from a base station 105 to a UE 115). The UE 115 may report feedback that indicates precoding weights for one or more beam directions, and the feedback may correspond to a configured number of beams across a system bandwidth or one or more sub-bands. The base station 105 may transmit a reference signal (e.g., a cell-specific reference signal (CRS), a channel state information reference signal (CSI-RS)), which may be precoded or unprecoded. The UE 115 may provide feedback for beam selection, which may be a precoding matrix indicator (PMI) or codebook-based feedback (e.g., a multi-panel type codebook, a linear combination type codebook, a port selection type codebook). Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115) or for transmitting a signal in a single direction (e.g., for transmitting data to a receiving device).

A receiving device (e.g., a UE 115) may try multiple receive configurations (e.g., directional listening) when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets (e.g., different directional listening weight sets) applied to signals received at multiple antenna elements of an antenna array, or by processing received signals according to different receive beamforming weight sets applied to signals received at multiple antenna elements of an antenna array, any of which may be referred to as "listening" according to different receive configurations or receive directions. In some examples, a receiving device may use a single receive configuration to receive along a single beam direction (e.g., when receiving a data signal). The single receive configuration may be aligned in a beam direction determined based on listening according to different receive configuration directions (e.g., a beam direction determined to have a highest signal strength, highest signal-to-noise ratio (SNR), or otherwise acceptable signal quality based on listening according to multiple beam directions).

The wireless communications system 100 may be a packet-based network that operates according to a layered protocol stack. In the user plane, communications at the bearer or Packet Data Convergence Protocol (PDCP) layer may be IP-based. A Radio Link Control (RLC) layer may perform packet segmentation and reassembly to communicate over logical channels. A Medium Access Control (MAC) layer may perform priority handling and multiplexing of logical channels into transport channels. The MAC layer may also use error detection techniques, error correction techniques, or both to support retransmissions at the MAC layer to improve link efficiency. In the control plane, the Radio Resource Control (RRC) protocol layer may provide establishment, configuration, and maintenance of an RRC connection between a UE 115 and a base station 105 or a core network 130 supporting radio bearers for user plane data. At the physical layer, transport channels may be mapped to physical channels.

The UEs 115 and the base stations 105 may support retransmissions of data to increase the likelihood that data is received successfully. Hybrid automatic repeat request (HARQ) feedback is one technique for increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., low signal-to-noise conditions). In some examples, a device may support same-slot HARQ feedback, where the device may provide HARQ feedback in a specific slot for data received in a previous symbol in the slot. In other cases, the device may provide HARQ feedback in a subsequent slot, or according to some other time interval.

In some examples an IAB node (e.g., a node 105) may identify a TDM alignment conflict between a first transmission scheduled on a parent link, and a second transmission scheduled on a child link, and may transmit a conflict indication to the parent node or the child node. The first transmission (e.g., an uplink signal or a downlink signal) may be scheduled on hard resources, and the second transmissions (e.g., an uplink signal or a downlink signal) may also be scheduled on hard resources. In such examples, the relay node may determine a link priority (e.g., a priority of the parent link relative to the child link). If there is enough time prior to the identified conflict, the relay node may transmit a cancellation message (e.g., an MT cancellation message to the parent node via the parent link, or a DU cancellation message to the child node via the child link). The cancellation message may indicate, to the parent node, a cancellation of at least a portion of the first transmission, or may indicate, to the child node, a cancellation of at least a portion of the second transmission. If there is not enough time prior to the identified conflict, the relay node may transmit an interruption message (e.g., an MT interruption message to the parent node via the parent link, or a DU interruption message to the child node via the child link). The interruption message may indicate, to the parent node, an interruption of at least a portion of the first transmission, or may indicate, to the child node, an interruption of at least a portion of the second transmission. A parent node or child node that receives a conflict indication may take appropriate action to cancel or ignore a pending transmissions, reassign available resources, reschedule failed or canceled transmissions, adjust one or more communication procedures, or the like.

Figure 2:
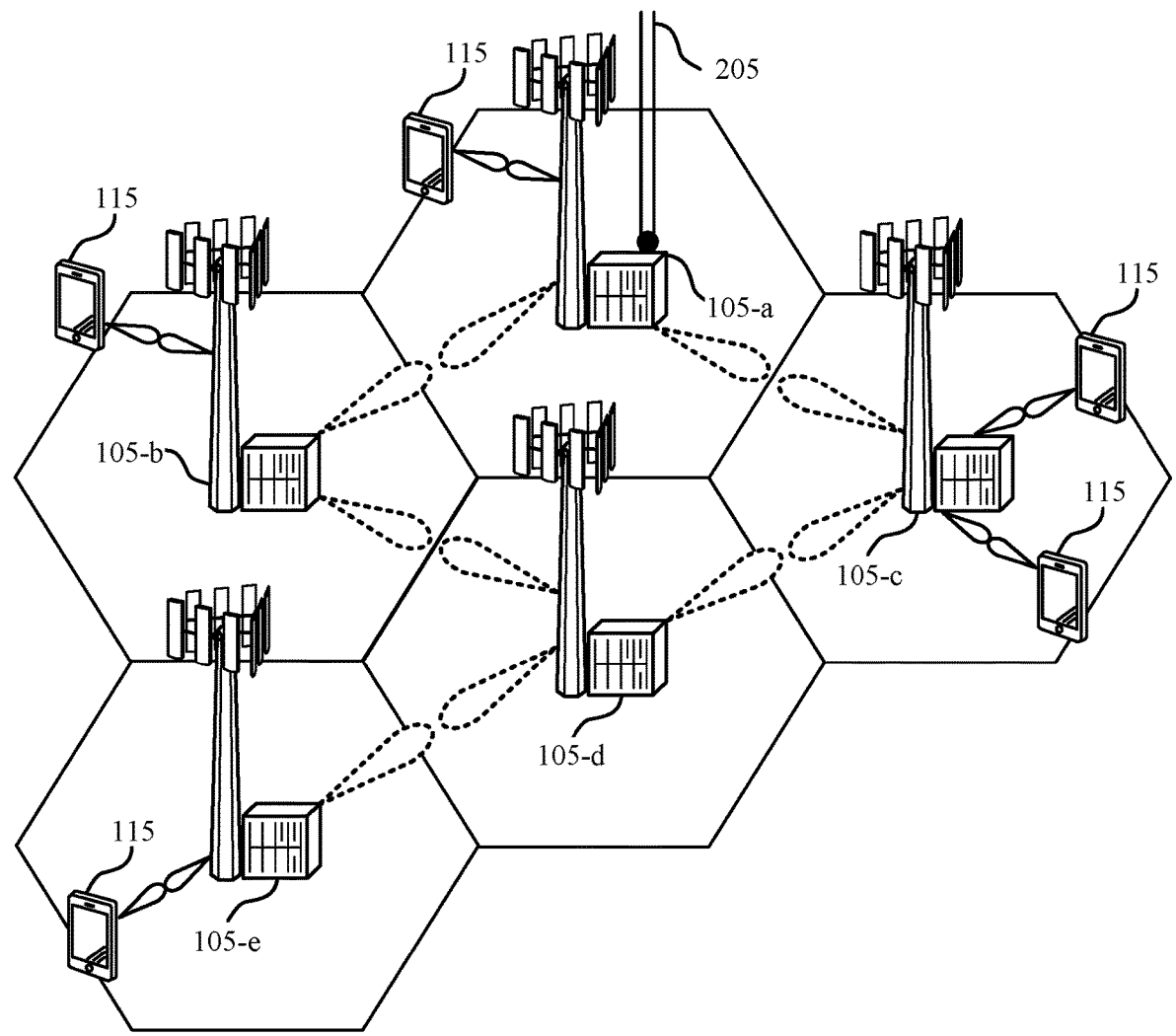
FIG. 2 illustrates an example of a wireless communications system that supports cancellation and interruption indications in IAB networks in accordance with aspects of the present disclosure.

FIG. 2 illustrates an example of a wireless communications system 200 that supports aspects of dynamic resource management in accordance with one or more aspects of the present disclosure. In some examples, wireless communications system 200 may implement aspects of wireless communications system 100. Wireless communications system 200 may support one or more nodes 105 (e.g., network devices) supporting network access to one or more UEs 115 within cell coverage areas 110. Infrastructure and spectral resources for network access within wireless communications system 200 may additionally support wireless backhaul link 215 capabilities in supplement to wireline backhaul connections 205, providing an IAB network architecture. Aspects of the supporting functionalities of the nodes 105 may be referred to as IAB nodes. For example, FIG. 2 illustrates a wireless communications system 200 (e.g., an NR system) that may implement the IAB architecture by connecting one access node (e.g., node 105-a) in the wireless communications system 200 to the core network 130 via, for example, a fiber point backhaul connection 205, while other nodes 105 in the wireless communications system 200 (e.g., node 105-b, node 105-c, node 105-d, and node 105-e) may exchange access traffic with the fiber point backhaul connection 205 via the wireless backhaul network, using wireless backhaul links 215 (e.g., using beamformed wireless backhaul connections). Each node 105 may then communicate the access traffic with the one or more UEs 115 that it serves over the access network, using access links 210 (e.g., using beamformed wireless access connections).

In wireless communications systems that employ wireline links for backhaul communications, a wireless node may enjoy a robust wireline link to a network entity that coordinates aspects of backhaul communications (e.g., the network entity provides timing information, cell identity, etc.) for neighboring nodes to coordinate backhaul transmissions. However, in some systems, deploying a wireline link to wireless nodes may result in substantial expense and resource expenditure. For example, wireless nodes operating in mmW frequency ranges may be associated with a reduced coverage area (e.g., a smaller geographic footprint, directional transmissions, etc.), which may result in a deployment of a larger number of access nodes (e.g., nodes 105 or IAB nodes) to provide acceptable coverage areas to users. As a result, a number of nodes 105 within the wireless communications system may not be coupled with a wireline backhaul link and may instead use wireless backhaul links 215 for backhaul communications in a wireless backhaul network.

In some cases, a node 105 (e.g., node 105-a) may be split into associated base station CU and DU entities (as described with respect to FIG. 3), where one or more DUs may be partially controlled by an associated CU. The CU entity of the node 105-a may facilitate connection between the core network 130 and the node 105-a (e.g., via a wireline backhaul connection 205 or, in some cases, a wireless connection to the core network). The CU entity may control part or all of an IAB network via configuration. The DUs of the node 105-a may control and/or schedule functionality for additional devices (e.g., relay base stations or relay IAB nodes 105, such as node 105-b, node 105-c, and UEs 115) according to configured wireless backhaul links 215 and wireless access links 210. Based on the supported entities at the node 105-a (e.g., such as the CU entity), the node 105-a may be referred to as an IAB donor.

A relay node (e.g., node 105-b and node 105-c) may support link connectivity with the IAB donor (e.g., node 105-a) as part of a relay chain within the IAB network architecture. For example, node 105-b may be split into associated MT and DU entities (as described with respect to FIG. 3), where MT functionality of the base station 105-b may be controlled and/or scheduled by a DU entity of node 105-a. In some examples, DUs associated with node 105-b may be controlled by MT functionality of the node 105-b. In addition, in some cases, one or more DUs of the node 105-b may be partially controlled by signaling messages from CU entities of associated IAB donor nodes (e.g., a CU of node 105-a) of the network connection (e.g., via an F1-application protocol (AP)). The DU of the node 105-b may support a serving cell 110 of the IAB network coverage area, and may provide for communications with one or more UEs 115 via access links 210. Based on the supported entities at the node 105-b, the node 105-b may be referred to as a relay node, an IAB node, a relay node, etc.

A node 105 (e.g., a relay node) may thus be configured for access network functionality (ANF) and UE functionality (UEF) to allow the node 105 to act as a scheduling entity and a receiving (e.g., scheduled) entity. Each of the functionalities may be operated via the one or more backhaul links 215. ANF functionality may enable nodes 105 to operate as a scheduling entity over one or more access links 210, and communicate with one or more UEs 115 located within the IAB network. ANF functionality may further enable nodes 105 to operate as a scheduling entity over one or more coupled backhaul links 215, to facilitate communication between the one or more other nodes 105 of the IAB network (i.e., via the mesh topology). UEF functionality may enable nodes 105 to operate as a scheduled entity and communicate with one or more other nodes 105 to receive data. In some cases, a node 105 may include a routing table for examining a received data packet and forwarding the packet along the preferred path of the IAB network toward the specified IP address of the packet's destination. In some cases, each relay node 105 may be associated with a single MT function, and may thus employ backhaul relaying as shown. In some cases, relay base stations or relay nodes 105 may support multiple MT functions, in which case relay base stations 105 may be capable of multi-connected cellular backhaul.

Wireless communications system 200 may employ one or more wireless access links 210 for establishing mobile access to one or more coupled UEs 115. Each of the nodes 105 and the UEs 115 may be configured to support cellular radio access technologies (RATs), such as mmW-based RATs, for access traffic between the UEs 115 and the nodes 105. Moreover, each of nodes 105 may share resources of the configured RATs for access traffic with backhaul traffic over the network (e.g., as in the case of IAB). IAB network solutions may be increasingly beneficial with the evolution of cellular technologies due to enhancements in wireless link capacity. Specifically, IAB network solutions may provide solutions to densification of network cells (i.e., cost reduction of small cell deployments) and increases in data traffic, as a means to maximize spectrum efficiency through joint optimization and integration of access and backhaul resources within the network. For example, IAB network solutions may be suitable for mmW RATs due to a large bandwidth per channel and the ability to mitigate short term signal blocking.

An access link using a mmW-based radio access technology (RAT) may be designed as an asymmetric single-hop link, which may be used for assigning control and scheduling tasks to a node 105 while providing instruction to one or more UEs 115 for scheduling communication. In such cases, a node 105 may coordinate wireless resources among multiple UEs 115, while each UE 115 may be assigned to one or more nodes 105. In some cases, inter-node links may be symmetric in nature and may form mesh topologies for enhanced robustness, where wireless transport may occur along multiple hops. The combination of the UEF and ANF capability at a node 105 of the IAB network may allow the node 105 to utilize switching operations over the wireless spectrum associated with the RAT, to transmit access traffic to/from UEs 115 and backhaul traffic to/from core network 130 (e.g., via backhaul links 215 to node 105-*a*) providing coupled access to the one or more PDNs.

Using the techniques described herein, wireless communications system 200 may coordinate and configure wireless resources (e.g., for access traffic and backhaul traffic) and efficiently handle any system constraints (e.g., half-duplexed communications, inter-link interference, etc.). For instance, inter-link interference may be managed using spatial division multiple access (SDMA) techniques (e.g., through the use of narrow beams), and inter-node beam coordination may account for any remaining interference. For example, node 105-*a* may be considered a parent node, node 105-*b* may be considered an access or relay node, and node 105-*d* may be considered a child node.

Figure 3:
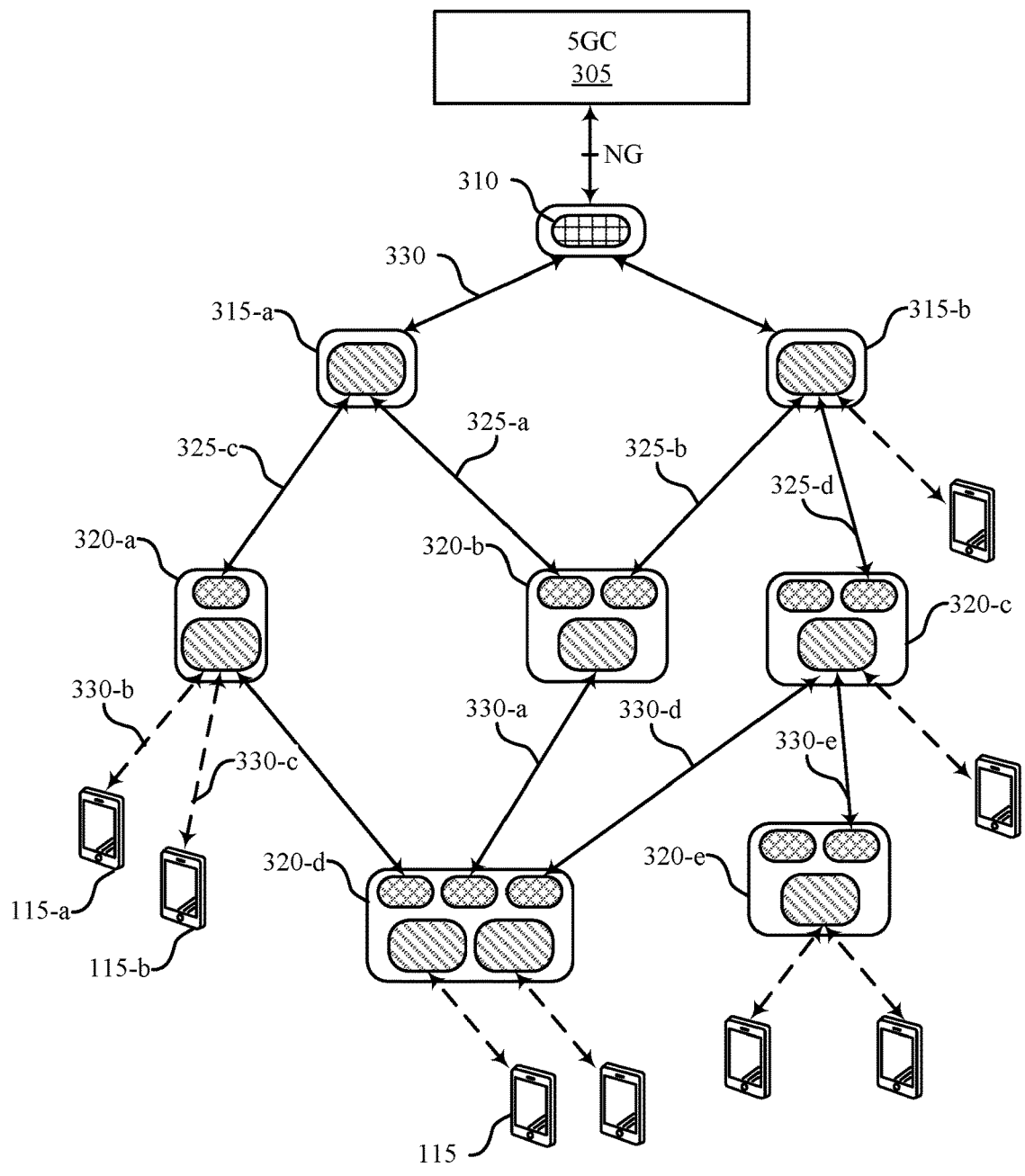
FIG. 3 illustrates an example of a wireless communications system that supports cancellation and interruption indications in IAB networks in accordance with aspects of the present disclosure.

FIG. 3 illustrates an example of a wireless communications system 300 that supports dynamic resource management in accordance with one or more aspects of the present disclosure. In some examples, wireless communications system 300 may implement aspects of wireless communications system 100 and wireless communications system 200, as described with reference to FIGS. 1 and 2. For example, FIG. 3 illustrates a wireless communications system 300 (e.g., a NR system) that supports sharing of infrastructure and spectral resources for NR access with wireless backhaul link capabilities, in supplement to wireline backhaul connections, providing an IAB network architecture. Wireless communications system 300 may include a core network 305 (e.g., 5GC), and nodes 320 (e.g., base stations, IAB nodes, etc.) that may be split into one or more support entities (e.g., functionalities) for promoting wireless backhaul density in collaboration with network communication access.

Wireless communications system 300 may include a donor node (e.g., a donor IAB node, donor base station, etc.) split into associated CU 310 and DU 315 entities, where DUs 315 associated with the donor node may be partially controlled by the associated CU 310 of the node. In some cases, CU 310, DU 315-*a* and DU 315-*b* may be located within a single device. In other cases, DU 315-*a* and DU 315-*b* of the donor node may be externally located, and may be in wired or wireless communication with the CU 310. CU may be a component of a database, data center, core network, or network cloud, and may host layer 3 (L3) (e.g., radio resource control (RRC), service data adaption protocol (SDAP), packet data convergence protocol (PDCP), etc.) functionality and signaling. Further CU 310 of the donor node may communicate with core network 305 over, for example, an NG interface (which may be an example of a portion of a backhaul link). DUs 315 may host lower layer, such as layer 1 (L1) and layer 2 (L2) (e.g., radio link control (RLC), media access control (MAC), physical (PHY), etc.) functionality and signaling. A DU 315 entity of a donor network node may support one of multiple serving cells of the network coverage according to connections associated with backhaul and access links of the IAB network. DUs 315 of the IAB donor node may control both access links and backhaul links within the corresponding network coverage and provide controlling and scheduling for descendant (e.g., child) relay nodes 320 and/or UEs 115.

Nodes 320 may be split into associated MT and DU entities. MT functionality (e.g., UE-F) of the relay IAB devices (e.g., relay nodes 320 or IAB nodes) may be controlled and/or scheduled by antecedent IAB nodes (e.g., by a donor node or another upstream node as its parent node) of the established connectivity via access and backhaul links of a coverage area. DUs associated with a node 320 may be controlled by MT functionality of the node (e.g., a DU of a node may be controlled by the node's own MT). In addition, DUs of the nodes 320 may be partially controlled by signaling messages from CU 310 entities of associated donor nodes of the network connection (e.g., via an F1-AP interface). The DUs of the nodes 320 may support one of multiple serving cells of the network coverage area. DU functionality (e.g., AN-F) may schedule child IAB nodes and UEs, and may control both access links and backhaul links under its coverage.

A node 320 may communicate with a donor node CU (e.g., CU 310) via a backhaul link (e.g., wireline backhaul or wireless backhaul). Generally, one or more donor node (e.g., IAB donors) may be in communication with one or more additional nodes 320 (e.g., IAB nodes or relay nodes) and one or more UEs 115. As an example, node 320-*d* may support MT functionality controlled and scheduled by a donor node and/or parent relative to the MT supported IAB nodes (e.g., such as nodes 320-*b*, 320-*a*, and 320-*c*). Node 320-*d* may additionally support DU operability relative to additional entities (e.g., such as UEs 115) within the relay chain or configuration of the access network. For example, an IAB network architecture may include a chain of connected wireless devices (e.g., starting with a donor node and ending with a UE 115, with any number of nodes 320 in between) via link resources that support NR access and backhaul capabilities (e.g., a wireline backhaul or wireless backhaul).

As discussed herein, a relay node 320 may refer to a node that include at least one MT function and one DU function.

The relay node 320 may connect to a parent node or a donor node via a MT function, and may further support connections to child nodes (e.g., other IAB node 105 or UEs 115) via the DU. In some cases, node DUs and donor node DUs may be connected to a centralized donor CU (e.g., CU 310), which may hold a network management function, or be connected to a network management function. In some cases, the network management function may support link management, route management, topology management, resource management, etc. for the wireless communications system 300 (e.g., the IAB network). Each relay node MT function may include a radio resource control (RRC) connection to the CU 310. In this manner, the network management function may support link configuration, route configuration, and resource configuration tasks for the wireless backhaul topology.

A relay node 320 may relay communications between a parent node (e.g., an IAB donor, or an IAB node upstream or higher on the relay chain) and a child node (e.g., an IAB node downstream or lower on the relay chain, a UE 115, or the like). In some cases, the relay node may refer to the DU or access node function (AN-F) of an intermediary IAB node. A child node may refer to an IAB node (e.g., the MT of the IAB node) or a UE that is the child of another IAB node (e.g., such as the relay node). A parent node in communication with the relay node may refer to an upstream IAB node (e.g., a node closer to the donor node or a node with less hops to the wireline backhaul link to the core network) or an IAB donor (e.g., the DU/ANF of the IAB node or IAB donor). In some cases, a parent node may be referred to as a control node (e.g., a control node may refer to a parent node or a DU of a parent node in communication with an MT of a relay node or other intermediary IAB node).

As such, wireless communications system 300 may implement 5G NR technologies (e.g., such as mmW) to support an access network (e.g., between an access node, such as nodes 320, and UEs 115) and a backhaul network (e.g., between access node, such as nodes 320). An IAB donor may refer to a node with a wireline connection to the core network, and an IAB node may refer to a node that relays traffic to or from the anchor (e.g., the donor) through one or more hops. IAB networks may thus share resources between access and backhaul, and may reuse aspects of access network frameworks. An IAB node may hold MT and DU functions. For example, the MT function of node 320-*d* may act as or serve as a scheduled node (e.g., similar to a UE) scheduled by its parent node (e.g., node 320-*a*). The DU function of node 320-*d* may act as or serve as a scheduling node that schedules child nodes of the node 320-*d* (e.g., such as UEs 115). DU functionality of a node may also schedule child IAB nodes downstream in the relay chain (e.g., DU function of node 320-*a* may act as or serve as a scheduling node that schedules node 320-*d*).

In some examples, different nodes 320 may have different multiplexing capabilities. For example, relay node 320-*a* may be capable of operating in a TDM mode. In such examples, during a first transmission time interval (TTI) (e.g., a slot, a subframe), relay node 320-*a* may send an uplink transmission or receive a downlink transmission (e.g., based on a resource type assigned to the first TTI) to a parent node via parent link 325-*c*. During a second TTI, relay node 320-*a* may send one or more downlink transmissions or receive one or more uplink signals (e.g., based on a resource type assigned to the second TTI) from one or more child nodes (e.g., UE 115-*a* and UE 115-*b*) via child link 330-*b* and child link 330-*c*. However, while operating in a TDM mode, relay node 320-*a* may not be capable of simultaneously communicating via parent link 325-*c* and child links 330-*b* and 330-*c*.

In some examples, a node 320 (e.g., relay node 320-*c*) may be capable of more advanced multiplexing. In such examples, relay node 320-*c* may transmit uplink signals or receive downlink signals from a parent node via parent link 325-*d*. Relay node 320-*c* may transmit downlink signals to both child node 320-*d* via child link 330-*d* and to child node 320-*e* via child link 330-*e*, while simultaneously transmitting or receiving via parent link 325-*d*. Similarly, relay node 320-*c* may receive uplink signals from both child node 320-*d* via child link 330-*d* and to child node 320-*e* via child link 330-*e*, while simultaneously transmitting or receiving via parent link 325-*d*. In such examples, relay node 320-*c* may not be constrained to operate in a TDM mode. However, in some cases (e.g., based on changes in environment, configuration instructions received from CU 310, or the like) relay node 320-*c* may be constrained to operate in a TDM mode for a period of time, despite its capability to utilize more advanced multiplexing. Resources types may be configured according to multiplexing modes, as described in greater detail with respect to FIG. 4.

Figure 4:
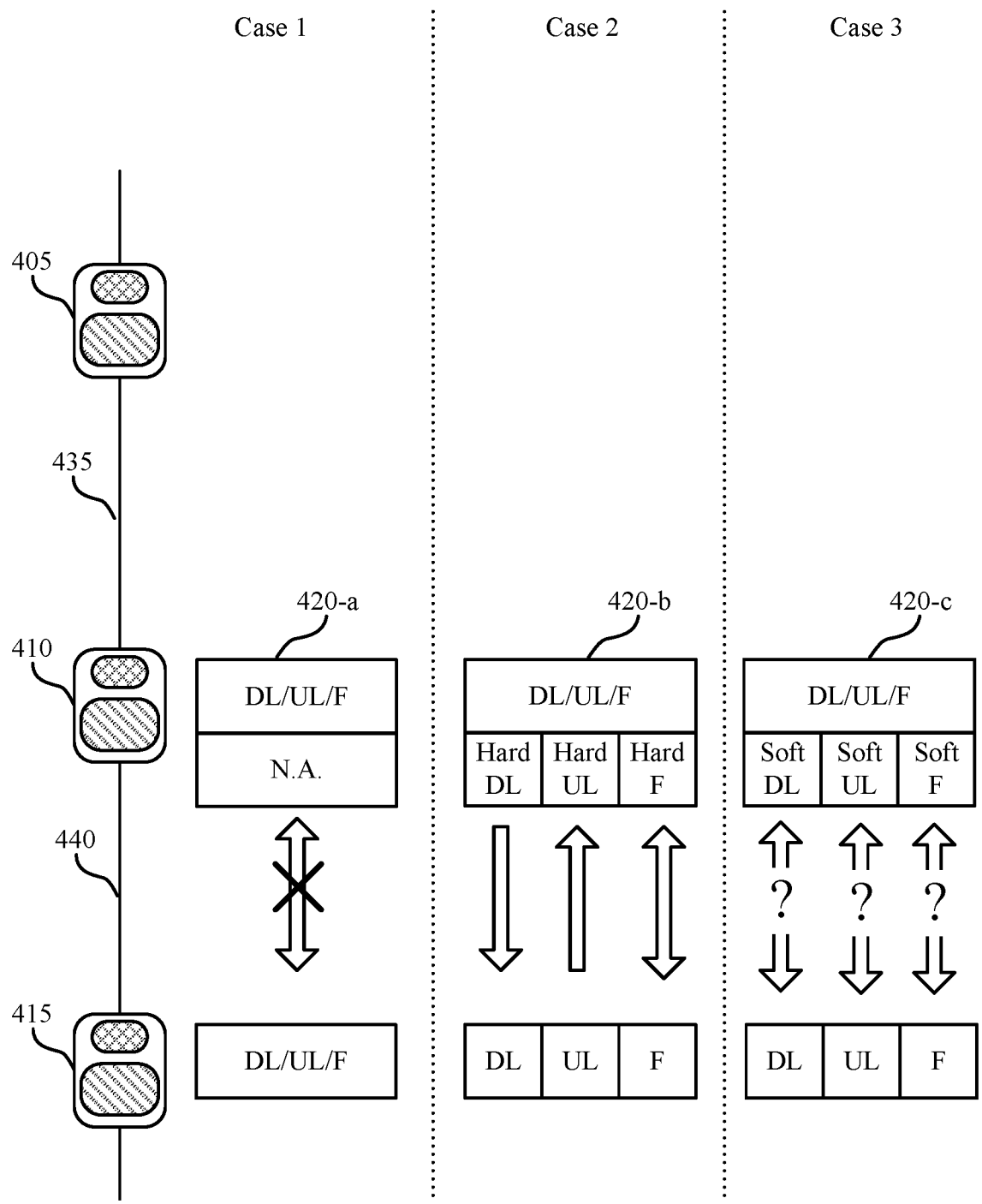
FIG. 4 illustrates a resource allocation that supports cancellation and interruption indications in IAB networks in accordance with aspects of the present disclosure.

FIG. 4 illustrates an example of a resource allocation 400 that supports cancellation and interruption indications in IAB networks in accordance with aspects of the present disclosure. In some examples, resource allocation 400 may implement aspects of wireless communications system 100. In some examples, as described with respect to FIGS. 2 and 3, a parent node 405 may communicate with a relay node 410 via a parent link 435. The relay node 410 may communicate with a child node 415 via child link 440. DU functionality of the parent node 405 may schedule or control communication with the relay node 410. MT functionality of the relay node 410 may receive scheduling from the parent node 405, and conduct communication with the parent node 405 via the parent link 435 accordingly. Similarly, DU functionality of the relay node 410 may schedule or control communication with child node 415 via child link 440.

In some cases, wireless communications systems may assign resource direction types (e.g., for time-domain resources in NR). For example, a time-domain resource may be assigned (e.g., or configured by the network) as a downlink resource, an uplink resource or a flexible resource. A downlink (DL) resource may refer to a resource where downlink communication (e.g., downstream communications from a parent node to a child node) is allowed (e.g., such as synchronization signal block (SSB) resources, channel state information reference signal (CSI-RS) resources, physical downlink control channel (PDCCH) resources, physical downlink shared channel (PDSCH) resources, etc.). An uplink (UL) resource may refer to a resource where uplink communication (e.g., upstream communications from a UE or child node to a parent node) is allowed (e.g., such as physical random access channel (PRACH) resources, physical uplink control channel (PUCCH) resources, physical uplink shared channel (PUSCH) resources, sounding reference signal (SRS) resources, etc.). A flexible resource may refer to a resource where the communication direction may be overwritten (e.g., to uplink or downlink) later by a scheduling node (e.g., by a donor node, a parent node, etc.).

Wireless communications systems further may support different layers or different types of DL/UL/Flexible assignment and release (e.g., wireless communications systems may use different mechanisms or techniques to specify DL/UL/Flexible slot configurations). In some examples, resource types may be defined or configured for different links between nodes (e.g., IAB nodes) in a wireless communications system. A node may have one or more established parent links and one or more established child links. Wireless communications systems may employ techniques for resource management in IAB networks. From an MT point-of-view, time-domain resources for a parent link may be configured as a downlink time resource, an uplink time resource, or a flexible time resource. From a DU point-of-view, time-domain resources for a child link may be configured as a downlink time resource, an uplink time resource, a flexible time resource, or a not available time resource (e.g., a resource type indicating the resource cannot be scheduled and is not to be used for communication on the DU child links).

Further, in some cases, some nodes may operate under a TDM mode. In some cases, parent and child node transmissions may conflict (e.g., a parent node and a child node may wish to communicate with a node at the same time). Time division multiplexing (TDM) may be used between the MT and the DU of the node to accommodate such conflicts. Further, a MT of a node may be transparent with the parent node as to the child needs and the resources requested by the DU.

As such, there may be different classes of availability or criteria for usage for each of the downlink, uplink, and flexible time-resource types of the DU child link. For example, each of the downlink, uplink, and flexible time-resource types of the DU child link may further be configured as, not available (NA), hard, or soft. If a resource is NA, then the DU of relay node 410 may not assume that the resources are available. If a resource is hard, then the DU of relay node 410 may assume that relay node 410 may use the type of resource regardless of MT configuration. If the resource is soft, then the resource may be controlled by the parent node 405 via explicit signaling or implicit determination. In such cases, a soft resource may exist in two states. In a first state, parent node 405 may indicate that the resource is available. In such cases, the resource may be treated as if it were a hard resource, and is available to the DU of relay node 410 regardless of MT configuration. In a second state, parent node 405 may not have indicated that the resource are available. In such cases, the DU of relay node 410 may assume that the resources are NA. A hard resource configuration may result in the corresponding time resource always being available for the DU child link. A soft resource configuration may result in the availability of the corresponding time resource for the DU child link being explicitly and/or implicitly controlled by the parent node. Implicit determination may control a DU's ability to transmit or receive via at soft resource without impacting MT operation. As such a DU may be configured with the following resource types: downlink (DL) (e.g., hard downlink), uplink (UL) (e.g., hard uplink), flexible (F) (e.g., hard flexible), not available (N.A.), soft downlink (soft-DL), soft uplink (soft-UL), and soft flexible (soft-F). A soft resource (soft Rx) (e.g., soft-DL, soft-UL, or soft-F resource) may initially be unavailable for a DU's child link, and may be converted to a hard resource (hard Rx) (e.g., hard-DL, hard-UL, or hard-F resource) by a parent node (e.g., either explicitly or implicitly). MT resource types are determined according scheduling from a parent node or RRC configuration from an IAB donor CU. Example resource assignments (e.g., resource type slot configurations) are shown with reference to FIG. 4.

In case 1, as illustrated with reference to FIG. 4, resources 420-a (e.g., DL resources, UL resources, or F resources) may be designated as NA for relay node 410. In such examples, relay node 410 may determine that the resources 420a are not available for communicating with child node 415, and may not communicate with child node 415 via child link 440.

In case 2, as illustrated with reference to FIG. 4, resources 420-b (e.g., DL resources, UL resources, and F resources) may be designated as hard resources. In such examples, the DU of relay node 410 may schedule communications with child node 415 according to the hard resources. During a first portion of resources 420-b, relay node 410 may transmit, and child node 415 may receive, downlink signaling. During a second portion of resources 420-b, child node 415 may transmit, and relay node 410 may receive, uplink signaling. During a third portion of resources 420-b, the DU of relay node 410 may schedule uplink or downlink communications with child node 415, according to the hard flexible resources of resources 420-b.

In case 3, as illustrated with reference to FIG. 4, resources 420-c (e.g., DL resources, UL resources and F resources) may be designated as soft resources. In some examples, parent node 405 may indicate that the soft resources are available. In such examples, relay node 410 may treat resources 420-c as hard, and may communicate with child node 415 as shown in case 2. In some examples, parent node 405 may not indicate that resources 420-c are available. In such examples, relay node 410 may assume that the resources are unavailable, and may treat them as NA resources, as shown in case 1. In some examples, implicitly determine whether the soft resources 420-c are available. That is, relay node 410 may determine whether use of the soft resources will interfere with MT functionality. If parent node 405 has scheduled communications with relay node 410, and relay node 410 is in TDM mode (e.g., as configured or based on its own capabilities), then relay node 410 may determine that it cannot use resources 420-c without impacting MT functionality, and may treat resources 420-c as NA. In some examples, relay node 410 may determine that using soft resources 420-c will not interfere with MT functionality, and may schedule communications with child node 415 accordingly.

In some cases, conflicting hard resources for a node in TDM mode may occur, as described in greater detail with reference to FIG. 5. A node may transmit a conflict indication to address such conflicts, as described in greater detail with reference to FIGS. 6-13.

Figure 5:
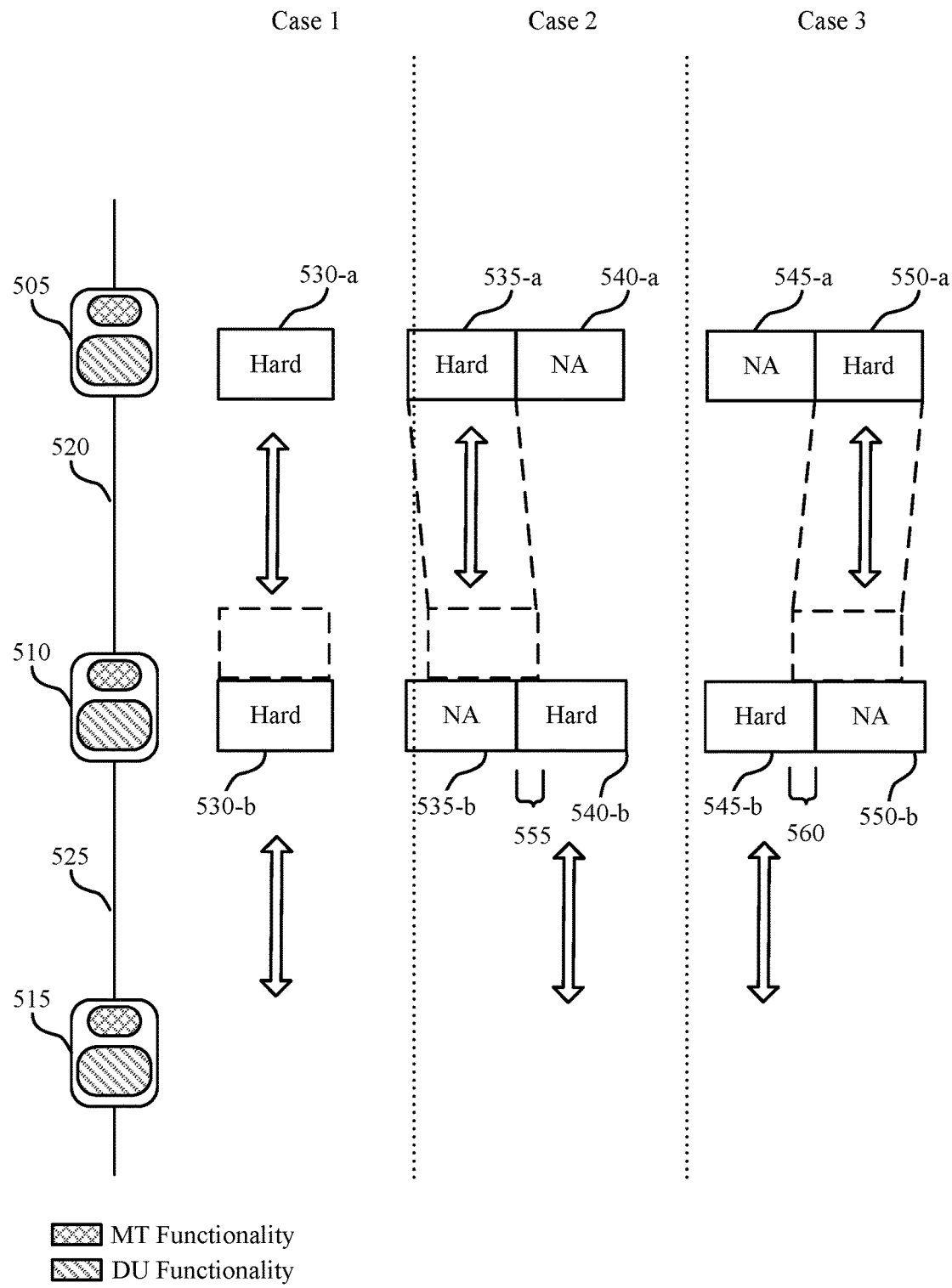
FIG. 5 illustrates an example of various timelines that support cancellation and interruption indications in IAB networks in accordance with aspects of the present disclosure.

FIG. 5 illustrates an example of a timeline 500 that supports cancellation and interruption indications in IAB networks in accordance with aspects of the present disclosure. In some examples, timeline 500 may implement aspects of wireless communications system 100. In some examples, as described with respect to FIGS. 2-4, a parent node 505 may communicate with a relay node 510 via a parent link 520. The relay node 510 may communicate with a child node 515 via child link 525. DU functionality of the parent node 405 may schedule or control communication with the relay node 510. MT functionality of the relay node 510 may receive scheduling from the parent node 505, and conduct communication with the parent node 505 via the parent link 520 accordingly. Similarly, DU functionality of the relay node 510 may schedule or control communication with child node 515 via child link 525.

In some examples, a CU, one or more parent nodes, or the like, may schedule IAB node communications to avoid a TDM alignment conflict (e.g., hard resource conflicts for nodes in TDM mode). For instance, if a relay node and a child node, or parent node and relay node, are both capable of advanced multiplexing schemes, then a scheduling hard resources for an uplink transmission to a parent node, and overlapping hard resources for a downlink transmission to a child node may not be problematic. For parent nodes and child nodes operating in TDM mode, a CU of an IAB system may configure DU resource types (hard, soft, NA, etc.) across parent nodes and child nodes to achieve TDM between the parent node and the child node, as described in FIG. 4. However, in some cases, as described below, conflicting hard resource scheduling for a node operating in TDM mode may occur. Hard resources may refer to resources designated as hard resources, soft resources configured (e.g., by a parent node) as available and thus treated as hard resources, or NA resources or soft resources with cell-specific signals or channels configured thereon.

In a first case, hard resources scheduled for parent node 505 may conflict with hard resources scheduled for a relay node 510 operating in a TDM mode, and is an example of a TDM alignment conflict. That is, hard resources for communications between parent node 505 may be simultaneously scheduled with hard resources for communications between relay node 510 and child node 515, despite the fact that relay node 510 is operating in a TDM mode. This may occur because a node (e.g., relay node 510) may be capable of advanced multiplexing, and the CU may schedule relay node 510 accordingly. However, multiplexing capabilities may not be static. For example, relay node 510 may be capable of advanced multiplexing schemes in some scenarios, but environments, beam quality, beam reflection occurrences, beam directions, or the like, may change over time. In some cases, these changes may result in a change in relay node 510 multiplexing capabilities. For instance, relay node 510 may no longer be capable of advanced multiplexing schemes, but may have been previously scheduled as shown in case 1. Additionally, or alternatively, a CU may permit the scheduling of conflicting hard resources at relay node 510 based on an assumption that conflicts are unlikely in some scenarios. For instance, resources may be configured as hard resources for random access procedures. Either a parent node 505 or a relay node 510 may select resources and initiate a random access procedure. However, a CU may assume that the likelihood of both resources utilizing the resources simultaneously is small enough to risk scheduling conflicting hard resources, even if relay node 510 is operating in a TDM mode.

In the first case, the entirety of one or more hard resources 530-a for communication by the MT of relay node 510 may overlap with hard resources 535-b for communication by the DU of relay node 510. When relay node 510 is operating in a TDM mode, relay node 510 may not be able to communicate with both parent node 505 and child node 515 simultaneously. This may result in one or more failed transmissions.

In some examples, the hard resource alignment may occur because hard resources (e.g., hard resources 530-a) are aligned with NA resources. But the NA resources may be configured for cell-specific signals or channels, and may therefore be treated as hard resources (e.g., hard resources 530-b). In some examples, the hard resource alignment may occur because hard resources 530-a and hard resource 530-b are scheduled to be shared between parent node 505 and relay node 510 (e.g., PRACH resources).

In the second case, relay node 510 may be scheduled to satisfy the TDM mode in which it operates, a partial conflict 555 (e.g., a partial overlap between hard resources 535-a and hard resources 540-b) may still occur. For example, parent node 505 may be scheduled with hard resources 535-a for communicating with the MT of relay node 510. Corresponding to hard resources 535-a, relay node 510 may be scheduled with NA resources 535-b (indicating that the resources are not available for the DU of relay node 510 due to hard resources 535-a). Relay node 510 may be configured with hard resources 540-b such that the DU of relay node 510 can communicate with the MT of child node 515. Corresponding to hard resources 540-b, parent node 505 may be configured with NA resources 540-a, indicating that the MT of relay node 510 is unavailable for communication with parent node 505 during hard resources 540-b. However, relay node 510 may transition from MT functionality to DU functionality between NA resources 535-b and hard resources 540-b. The transition may result in a partial overlap between hard resources and partial conflict 555. Additionally, or alternatively, partial conflict 55 may occur due to one or more delays (e.g., a propagation delay, processing delay, or the like). Relay node 510 may receive or process a first transmission on hard resources 535-a later than scheduled. The first transmission may thus overlap partially or entirely with hard resources 540-b, resulting in conflict 555. During conflict 555, relay node 510 may attempt to communicate with the parent node 505 over hard resources 535-a and communicate with child node 515 over hard resources 540-b. However, because relay node 510 is operating in a TDM mode, relay node 510 may be unable to do so. Thus, at least a portion of a first transmission scheduled on hard resources 535-a between relay node 510 and parent node 505, or at least a portion of a second transmission scheduled on hard resources 540-b between relay node 510 and child node 515, or both, may fail.

In cases where hard resources partially overlap with hard resources due to transition between MT functionality and DU functionality, a relay node 510 or other device may perform signaling requesting guard symbols from parent node 505. Signaling for guard symbols may be optional, and may be left to the implementation or preference of relay node 510 to determine whether to provide guard symbols and the number of guard symbols, if provided. In some examples, parent node 505 may provide no guard symbols or insufficient guard symbols for a transition instance (e.g., between MT functionality and DU functionality) and a child node or relay node 510 may be allowed to handle resulting conflicts between child MT and child DU at an overlap or partial overlap of hard resources. Techniques for addressing such conflicts are described herein.

In the third case, relay node 510 may be scheduled to satisfy the TDM mode in which it operates, but a partial conflict 560 (e.g., a partial overlap between hard resources 545-b and hard resources 550-a) may still occur. For example, relay node 510 may be scheduled with hard resources 545-b such that its DU may communicate with child node 515. Parent node 505 may accordingly be scheduled with NA resources 545-a, so as not to interfere with communications between relay node 510 and child node 515 over hard resources 545-b. Parent node 505 may also be scheduled with hard resources 550-a for communicating with the MT of relay node 510. Relay node 510 may accordingly be scheduled with NA resources 550-b, indicating that the DU of relay node 510 cannot use NA resources 550-b for communicating with child node 515. However, relay node 510 may transition from DU functionality to MT functionality between hard resources 545-b and NA resources 550-b. The transition may result in a partial overlap between hard resources and partial conflict 560. Additionally, or alternatively, partial conflict 55 may occur as a result of one or more delays or timing offsets. In some examples, relay node 510 may receive a first transmission over hard resources 550-*a* early. For example, a signaling environment between relay node 510 and parent node 505 may change, a preferred beam or beam pair may have change, a signal route may change, or the like. In such cases, parent node 505 may transmit a first downlink transmission early, or relay node 510 may transmit a first uplink transmission according to an outdated timing advance value, resulting in conflict 560. That is, during conflict 560, relay node 510 may attempt to communicate a first transmission with parent node 505 prior to completing a second transmission over hard resources 545-*b* with child node 515. Thus, at least a portion of the first transmission scheduled on hard resources 550-*a* between relay node 510 and parent node 505, or at least a portion of the second transmission scheduled on hard resources 545-*b* between relay node 510 and child node 515, or both, may fail.

To address such conflicts, a relay node 510 may transmit a conflict indication to parent node 505 or child node 515, as described in greater detail with reference to FIG. 6.

Figure 6:
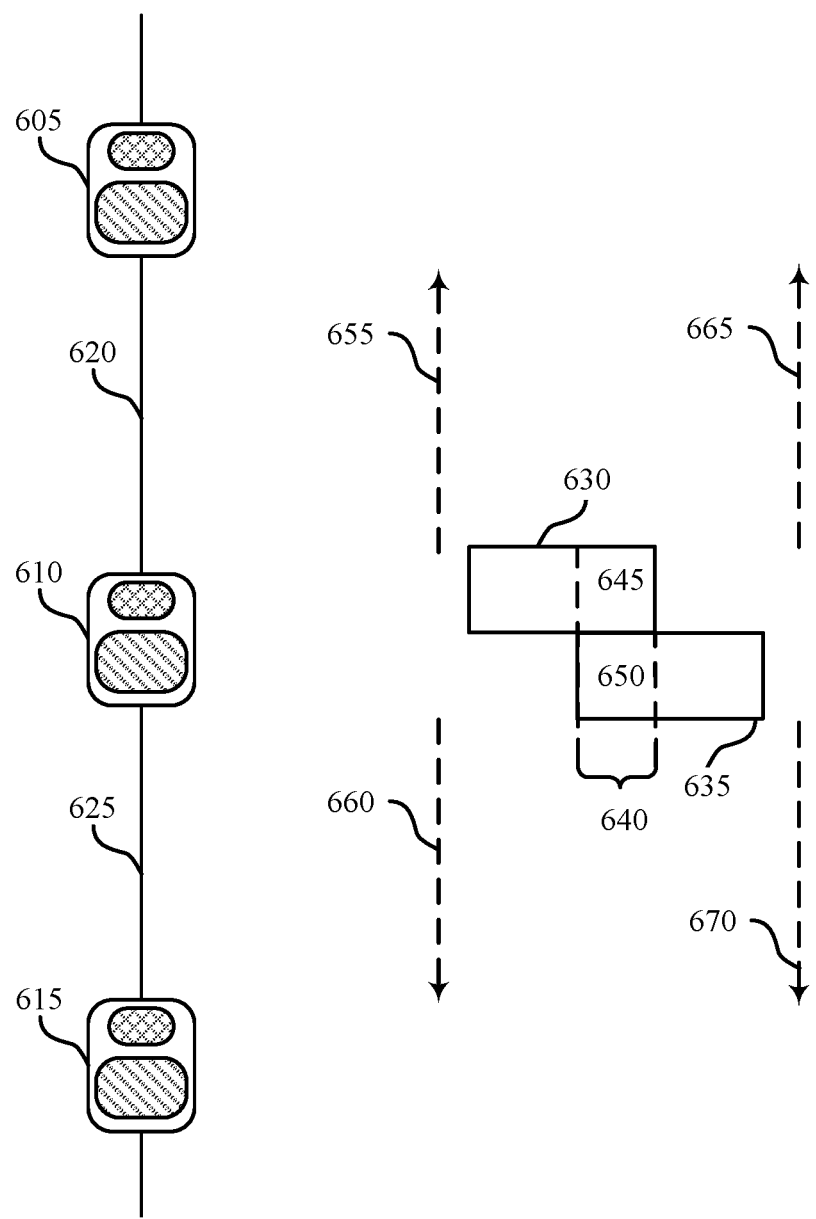
FIG. 6 illustrates an example of a timeline that supports cancellation and interruption indications in IAB networks in accordance with aspects of the present disclosure.

FIG. 6 illustrates an example of a timeline 600 that supports cancellation and interruption indications in IAB networks in accordance with aspects of the present disclosure. In some examples, timeline 600 may implement aspects of wireless communications system 100. In some examples, as described with respect to FIGS. 2, 3, 4, and 5, a parent node 605 may communicate with a relay node 610 via a parent link 620. The relay node 610 may communicate with a child node 615 via child link 625. DU functionality of the parent node 605 may schedule or control communication with the relay node 610. MT functionality of the relay node 610 may receive scheduling from the parent node 605, and conduct communication with the parent node 605 via the parent link 620 accordingly. Similarly, DU functionality of the relay node 610 may schedule or control communication with child node 615 via child link 625.

In some examples, as described with reference to FIGS. 5 and 6, relay node 610 may be scheduled with hard resources for MT communication with parent node 605 and hard resources for DU communication with child node 615. Thus, a first transmission 630 between parent node 605 and a second transmission 635 between relay node 610 and child node 615 may partially overlap (as shown with reference to conflict 640) or completely overlap (not shown), resulting in a TDM alignment conflict. First transmission 630 may be a downlink message from parent node 605, or an uplink message from relay node 610. Second transmission 635 may be an uplink message to relay node 610 or a downlink message to child node 615. Where relay node 610 operates in a TDM mode, conflict 640 may result in partial or complete decoding failure of first transmission 630, second transmission 635, or both. Such failed transmissions may result in inefficient use of available resources, one or more retransmissions, increased power expenditures, and increased system latency.

In some examples, a parent node may be aware of a child DUs resource configuration, and the parent node may determine how to handle potential conflicts. However, the parent node may be constrained to fulfill performance requirements. In some cases, parent node DUs may back off from using resources over a parent link 520 to allow a child node to use the resources without conflict. Or, a parent node 505 may take the chance that using the resources over the parent link 520 to the MT of relay node 510, and may allow relay node 510 to address any conflict that occurs. In such examples, signaling described herein may address such TDM alignment conflict (e.g., hard resource conflict). In some examples of a conflict between child MT and child DU, the child node may have freedom to give priority to child MT or child DU to use the resources. Such freedom may be constrained by performance requirements. When priority is given to the child MT, or child DU, to use the resource, a child DU (or child MT) may have interrupted communications with grand-child nodes or parent nodes.

To avoid partial or complete decoding failure, increased interference, or the like, relay node 610 may send a conflict indication to parent node 605, or to child node 615. For example, prior to conflict 640, relay node 610 may give priority to the DU to use the resources of conflict, and may transmit a cancellation message to parent node 605 (e.g., an MT cancellation indication 655). MT cancellation indication 655 may indicate a cancellation of MT transmission or reception operations for relay node 610 over all or a subset of allocated resources before MT scheduled transmission or reception time. For instance, MT cancellation indication 655 may indicate a cancellation of first transmission 630, or a cancellation of a portion 645 of first transmission 630. In some examples, relay node 610 may determine that it has sufficient time between identifying conflict 640, and the initiation of first transmission 630, and may transmit MT cancellation indication 655 based on the determining. MT cancellation indication 655 may be carried by L1 signaling, including physical uplink control channel (PUCCH), uplink media access control (MAC) control element (CE), or the like. For L1 signaling, periodic PUCCH resources may be allocated to carry MT cancellation indications. The periodicity of the signaling may be based on a resource pattern of hard resource conflicts (hard DU resources overlapping with hard MT resources for one or more devices). Hard resource conflicts may be scheduled, or may be due to transition and delay due to MT to DU transition for a device. The message content of the MT cancellation indication may be an indication of resources where a child MT's transmission reception operations are to be cancelled. In some examples, the MT cancellation indication may also include addition information. Additional information may include proposed resources for a next transmission or retransmission of cancelled signals or channels between the parent DU and the child MT.

Upon receiving MT cancellation indication 655, parent node 605 may take one or more actions. For example, if first transmission 630 is a downlink transmission, parent node 605 may cancel part (e.g., portion 645) or all of first transmission 630, which may result in decreased interference, improved system efficiency, and power savings for parent node 605. If first transmission 630 is an uplink transmission, parent node 605 may refrain from receiving part (e.g., portion 645) or all of first transmission 630, resulting in power savings (e.g., from refraining to monitor for a signal that has not been transmitted) and increased system efficiency. In some examples, parent node 605 may reallocate resources (e.g., the resources for first transmission 630, or for portion 645 of first transmission 630) for communication with another node (e.g., another relay node, a child node, a UE 115, or the like), which may result in increased efficiency in resource management. In some examples, parent node 605 may adjust its scheduling strategy for subsequent scheduling periods based on receiving MT cancellation indication 655. That is, having determined that a scheduling scenario resulted in TDM alignment conflict 640, parent node 605 may adjust a scheduling strategy, and may schedule and assign resources differently in the future, to avoid MT hard resources that conflict with DU hard resources. For instance, parent node 605 may decoded to back off from using the resources for a next conflict between MT hard resources and DU hard resources. In some examples, parent node 605 may adjust a feedback process based on receiving MT cancellation indication 655. For example, if first transmission 630 is a downlink transmission, parent node 605 may not wait to receive a negative acknowledgement message from relay node 610 before initiating retransmission of the coded bits of first transmission 645. If first transmission 630 is one of a set of uplink transmissions, then when performing feedback combination (e.g., HARQ combining for the set of uplink transmissions), parent node 605 may discard first transmission 630, or portion 645 of first transmission 630, based on receiving MT cancellation indication 655. In some examples, upon receiving MT cancellation indication 655, parent node 605 may reschedule first transmission 630 on subsequent resources, and may retransmit or monitor for first transmission 630 accordingly.

In some examples, relay node 610 may give priority to the MT to use the resources when a TDM conflict is identified, and may transmit a cancellation message to child node 615 (e.g., DU cancellation indication 660). DU cancellation indication 660 may indicate a cancellation of DU transmission or reception operations for relay node 610 over all or a subset of allocated resources before DU scheduled transmission or reception time. For instance, DU cancellation indication 660 may indicate a cancellation of second transmission 635, or a cancellation of a portion 650 of second transmission 635. In some examples, relay node 610 may determine that it has sufficient time between identifying TDM alignment conflict 640, and the initiation of second transmission 635, and may transmit MT cancellation indication 655 based on the determining. DU cancellation indication 660 may be carried by a cancellation indication that supports indication of cancelled uplink communications, or in a new message that supports indication of cancelled uplink communications and cancelled downlink communications. an MT cancellation indication may be carried by L1 signaling, such as periodic PDCCH resources allocated to carry DU cancellation indication. The periodicity of such signaling may be based on a resource pattern of hard resource conflicts, or partial hard resource overlaps due to transition between MT and DU operations. Existing uplink cancelation indications may be extended to communicate both cancellation of downlink and uplink operations. An MT cancellation indication may include an indication of resources were parent DU transmission or reception are to be cancelled. In some examples, the MT cancellation indication may include additional information, such as proposed resources for a next transmission or retransmission of cancelled signals or channels between a parent DU and child MT.

Upon receiving DU cancellation indication 660, child node 615 may take one or more actions. Child node 615 may cancel a transmission or reception of second transmission 635, which may result in power savings and system efficiency. In some examples, child node 615 may reallocate resources for second transmission 635 or portion 650 of second transmission 635 for communicating with other entities (e.g., another child node, a UE 115, another relay node, another parent node, or the like). In some examples, child node 615 may adjust one or more procedures based on receiving DU cancellation indication 660. For example, second transmission 635 may be a downlink synchronization signal block (SSB), a reference signal (e.g., a channel state information reference signal (CSI-RS), or the like. In such examples, upon receiving DU cancellation indication, child node 615 may refrain from performing measurements on second transmission 635, making measurements on second transmission 635, including second transmission 635 in a channel state information (CSI) report, or any combination thereof. Additionally, or alternatively, child node 615 may refrain from using second transmission 635 in updating a tracking loop, performing radio link monitoring, performing beam failure detection, or the like. In some examples, child node 615 may adjust a feedback procedure based on receiving DU cancellation indication 660. For example, if second transmission 635 is a downlink transmission of a set of downlink transmissions, and if child node 615 is performing feedback combining (e.g., HARQ combining), then child node 615 may discard the resources for second transmission 635 or portion 650 of second transmission 635 in a combined feedback message.

In some examples, relay node 610 may not have sufficient time to transmit a cancellation message (e.g., MT cancellation indication 655 or DU cancellation indication 660) prior to when the TDM alignment conflict 640 occurs. In such examples, relay node 610 may give priority to the DU to use the conflicting resources of conflict, and may transmit an interruption message to parent node 605 (e.g., MT interruption indication 665). MT interruption indication 665 may indicate an interruption of MT transmission or reception operations at relay node 610 during all or a subset of allocated resources after MT scheduled transmission or receive times. For instance, MT interruption indication 665 may indicate that all of first transmission 630 was interrupted, or that portion 645 of first transmission 630 was interrupted. Relay node 610 may transmit MT interruption indication 665 after second transmission 635. MT interruption indication 665 may be carried by L1 signaling such as PUCCH or uplink MAC CEs. For L1 signaling, periodic PUCCH resources may be allocated for carrying MT interruption indications. The periodicity of such signaling may be based on resource patterns of hard resource conflicts, or partial hard resource overlap due to MT to DU operation transmission. An MT interruption indication may include an indication of where child MT transmission or reception operations were interrupted. In some examples, an MT interruption indication may include additional information, such as proposed resources for a next transmission or retransmission of interrupted signals or channels between the parent DU and child MT.

Upon receiving MT interruption indication 665, parent node 605 may take one or more actions. For example, first transmission 630 may be a sounding reference signal, which parent node 605 may have been measuring. Upon receiving MT interruption indication 665, parent node 605 may determine that the measurements taken on first transmission 630 or portion 645 of first transmission 630 are invalid, and may discard such measurements. In some cases, first transmission 630 may be a sounding reference signal, which parent node 605 was to measure. However, upon receiving MT interruption indication 665, parent node 605 may not make or may discard SRS measurement as a result of the interruption at TDM alignment conflict 640. In some cases, first transmission 630 may be a channel state information reference signal (CSI-RS), which relay node 510 was to measure. In such examples, parent node 605 may not receive a CSI report from relay node 610 (e.g., parent node 605 may save power by refraining from monitoring for an incoming CSI report that will be based on invalid measurements, or may receive and discard the CSI report). In some examples, parent node 605 may adjust a scheduling strategy for subsequent transmissions, attempting to avoid scenarios where hard DU resources and hard MT resources conflict (e.g., a TDM alignment conflict). For example, parent node 605 may determine to back off from using the resources for the next instance of hard resource overlap. In some examples, parent node 605 may adjust a feedback process based on receiving MT interruption indication 665. For example, if first transmission 630 is one of a set of uplink transmissions, then when performing feedback combination (e.g., HARQ combining for the set of uplink transmissions), parent node 605 may discard first transmission 630, or portion 645 of first transmission 630, based on receiving MT interruption indication 665.

In some examples, relay node 610 may not have sufficient time to transmit a cancellation message prior to TDM alignment conflict 640. In such examples, relay node 610 may give priority to the MT to use the conflicting resources, and may transmit an interruption message to child node 615 (e.g., a DU interruption indication 670). DU interruption indication 670 may indicate an interruption of DU transmission or reception operations over all or a subset of allocated resources after DU scheduled transmission receive time. For example, DU interruption indication 670 may indicate an interruption of all of second transmission 635, or portion 650 of second transmission 635. Relay node 610 may transmit DU interruption indication 670 after second transmission 635. DU interruption indication 670 may be a downlink preemption indication, which may support indication of interrupted downlink communications. Or, the DU interruption indication 670 may be a new or enhanced signal that supports an indication of interrupted downlink communications and interrupted uplink communications. A DU interruption indication may be carried by L1 signaling such as PDCCH or uplink MAC CEs. For L1 signaling, periodic PDCCH resources may be allocated to carry DU interruption indications. In such examples, the periodicity of such signaling may be based on resource patterns of hard resource conflicts or partial hard resource overlaps due to MT or DU transition. A DU interruption indication may indicate resource where a parent DU transmission or receive operations were interrupted. In some examples, a DU interruption indication may also carry additional information, such as proposed resources for a next transmission or retransmission of interrupted signals or channels between parent DU and child MT.

Upon receiving DU interruption indication 670, child node 615 may take one or more actions. For example, second transmission 635 may be a downlink synchronization signal block a reference signal (e.g., a CSI-RS), or the like. In such examples, upon receiving DU interruption indication 670, child node 615 may refrain from including second transmission 635 in a CSI report, or may refrain from transmitting a CSI report. Additionally, or alternatively, child node 615 may refrain from using second transmission 635 in updating a tracking loop, performing radio link monitoring, performing beam failure detection, or the like. In some examples, second transmission 635 may be a scheduling request for relay node 610, or a random access message (e.g., a physical random access channel (PRACH)) for relay node 610. In such examples, upon receiving DU interruption indication 670, child node 615 may refrain from incrementing a scheduling request counter, a random access message counter, or the like, so that interrupted second transmission 635 does not count towards a defined (e.g., maximum) number of transmissions limit for a scheduling request, random access message, or the like. In some examples, child node 615 may adjust a feedback procedure based on receiving DU interruption indication 670. For example, if second transmission 635 is a downlink transmission of a set of downlink transmissions, then child node 615 may discard second transmission 635 when performing HARQ combining.

In some examples, relay node 610 may determine whether to transmit a cancellation indication (e.g., because there is enough time before TDM alignment conflict 640) or an interruption indication (e.g., because there is not enough time before TDM alignment conflict 640) to parent node 605 (MT conflict indication) or to child node 615 based on a link bias or link preference. That is, to ensure communications between parent node 605 and relay node 610 are successful (e.g., a parent link bias), relay node 610 may cancel or interrupt DU communications with child node 615, and may transmit DU cancellation indication 660 (if there is enough time to transmit DU cancellation indication 660 before TDM alignment conflict 640) or DU interruption indication 670 (if there is not enough time to transmit DU cancellation indication 660 before TDM alignment conflict 640) based on the parent link bias. Or, in some examples, to ensure communications between relay node 610 and child node 615 are successful (e.g., a child link bias), relay node 610 may cancel or interrupt MT communications with parent node 605, and may transmit MT cancellation indication 655 (if there is enough time to transmit MT cancellation indication 665 before TDM alignment conflict 640) or MT interruption indication 665 (if there is not enough time to transmit MT cancellation indication 665 before TDM alignment conflict 640). Link bias may be based on node implementation, current environmental conditions (e.g., which link is more likely to be successful) preconfigured or predetermined rules, configuration by a CU, or based on performance requirements. For example, relay node 610 may have one or more predetermined performance operations to complete, such as measurement or transmissions of cell-specific signals or channels. If interruption or cancellation of one link would result in failure to satisfy such measurements or transmissions, then relay node 610 may elect to maintain that link (e.g., bias that link). Thus, in some examples, relay node 610 may determine whether to transmit a conflict indication to a parent node 605 or a child node 615 based on a link bias, and may determine whether to transmit a cancellation message or an interruption message based on whether there is sufficient time between identifying a TDM alignment conflict 640 and the TDM alignment conflict 640. Whether sufficient time exists may be based on how and when first transmission 630 and second transmission 635 are scheduled. Such timing considerations are described in greater detail with respect to FIGS. 7-11.

In some examples, an DU interruption indication 670 may be a preemption indication, which may indicate resources where downlink transmission to another device (e.g., a UE or child node 615) were interrupted. The preemption indication may be communicated to a UE or child node 615 after a downlink communication via a physical downlink control channel group-common downlink control information (DCI). However, such a preemption indication may only support an indication that downlink communication has been interrupted. Additionally, or alternatively, a new signal (e.g., DU interruption indication 670) may indicate that both downlink and uplink communications at the DU of relay node 610 have been interrupted.

In some examples, a DU cancellation indication 660 may be a cancellation indication that indicates resources on which scheduled downlink communication to a device (e.g., a UE or child node 615) were interrupted. The cancellation indication may be carried via a physical downlink control channel (PDCCH) group common DCI. However, such a cancellation indication may only support an indication of cancelled uplink communication. Additionally, or alternatively, a new signal (e.g., DU cancellation indication 660) may indicate that both downlink and uplink communications at the DU of relay node 610 have been cancelled.

In some examples, a cancellation indication or an interruption indication may indicate specific resources on which a transmission is canceled or has been interrupted. In some examples, a bitmap may indicate cancelled or interrupted resources over one or more slots. In some examples, cancelled or interrupted resources may be predetermined based on side information available at both parent node 605 and relay node 610, or both relay node 610 and child node 615, and a cancellation or interruption indication may indicate resources from the available information. Side information may indicate, for child node 515, a DU resource configuration of hard, soft, NA resources, or TDD configuration, number of desired guard symbols requested by child node 515 or relay node 510, or any combination thereof. In some examples, an index referring to a pre-configured list of cancelled or interrupted resources over one or more slots may be indicated in a cancellation indication or interruption indication. For instance, parent node 605 and relay node 610 may communicate (e.g., via RRC signaling, or MAC CE, or both) a list configuration indicating a list of one or more resources over one or more TTIs. In such cases, a cancellation indication or interruption indication may be a one-bit message indicating one resource from the list of one or more resources, or small bitstream indicating a subset of resources of the list of one or more resources.

Figure 7:
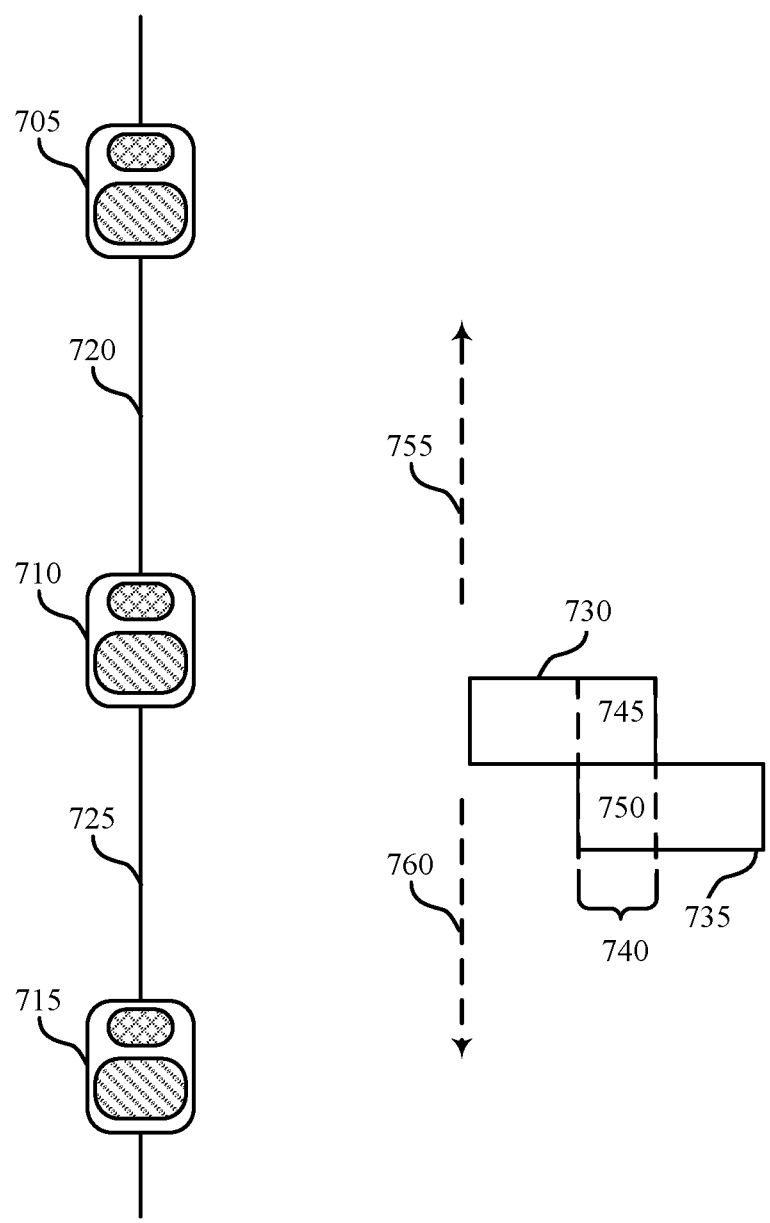
FIG. 7 illustrates an example of a timeline that supports cancellation and interruption indications in IAB networks in accordance with aspects of the present disclosure.

FIG. 7 illustrates an example of a timeline 700 that supports cancellation and interruption indications in IAB networks in accordance with aspects of the present disclosure. In some examples, timeline 700 may implement aspects of wireless communications system 100. In some examples, as described with respect to FIGS. 2-6, a parent node 705 may communicate with a relay node 710 via a parent link 720. The relay node 710 may communicate with a child node 715 via child link 725. DU functionality of the parent node 705 may schedule or control communication with the relay node 710. MT functionality of the relay node 710 may receive scheduling from the parent node 705, and conduct communication with the parent node 705 via the parent link 720 accordingly. Similarly, DU functionality of the relay node 710 may schedule or control communication with child node 715 via child link 725.

In some examples, as described with reference to FIGS. 7-9, a node (e.g., relay node 710) may identify a TDM alignment conflict (e.g., conflict 740) prior to the occurrence of the TDM alignment conflict. In such examples, the relay node 710 may determine a link bias, link priority, or link preference, as described in greater detail with reference to FIG. 6. In some examples, an IAB node may identify incoming TDM alignment conflict before it occurs based on semi-static radio resource control (RRC) allocations, semi-persistent scheduling (SPS), or dynamic scheduling via DCI with a gap. If the gap between a DCI grant and the detected TDM alignment conflict is large enough to allow for preparing, transmitting, and decoding a conflict indication, then the conflict indication may be a cancellation message, as shown with reference to FIGS. 7-9. However, if a relay node 710 cannot identify a TDM alignment conflict beforehand, or if a relay node 710 does not have sufficient time between identifying the TDM alignment conflict and the actual TDM alignment conflict for preparation, transmission, and decoding of a conflict indication, then the relay node 710 may transmit an interruption indication, as shown with reference to FIGS. 10-11.

In some examples, parent node 705 may schedule a first transmission 730 for MT communication with parent node 705. Parent node 705 may schedule first transmission 730 via semi-static RRC signaling, or SPS. Similarly, relay node 710 may schedule a second transmission 735 for DU communication with child node 715. Relay node 710 may schedule second transmission 735 via semi-static RRC signaling, or SPS. Because of the semi-static RRC signaling or SPS, relay node 710 may identify a TDM alignment conflict (e.g., conflict 740) between first transmission 730 and second transmission 735 prior to the occurrence of conflict 740. With a large amount of time between identifying conflict 740 and the occurrence of conflict 740, relay node 710 may determine that there is sufficient time to generate and transmit a conflict indication, and that parent node 705 or child node 715 would have sufficient time to decode a conflict indication prior to conflict 740. Thus, relay node 710 may generate an MT cancellation indication 755 in the case of a child link bias or a DU cancellation indication 760 in case of a parent link bias. MT cancellation indication 755 may indicate a cancelation of portion 745 of first transmission 730. DU cancellation indication 760 may indicate a cancellation of portion 750 of second transmission 735. Upon receipt of MT cancellation indication 755, parent node 705 may take one or more actions, as described in greater detail with reference to FIG. 6. Similarly, upon receipt of DU cancellation indication 760, child node 715 may take one or more actions, as described in greater detail with reference to FIG. 6.

Figure 8:
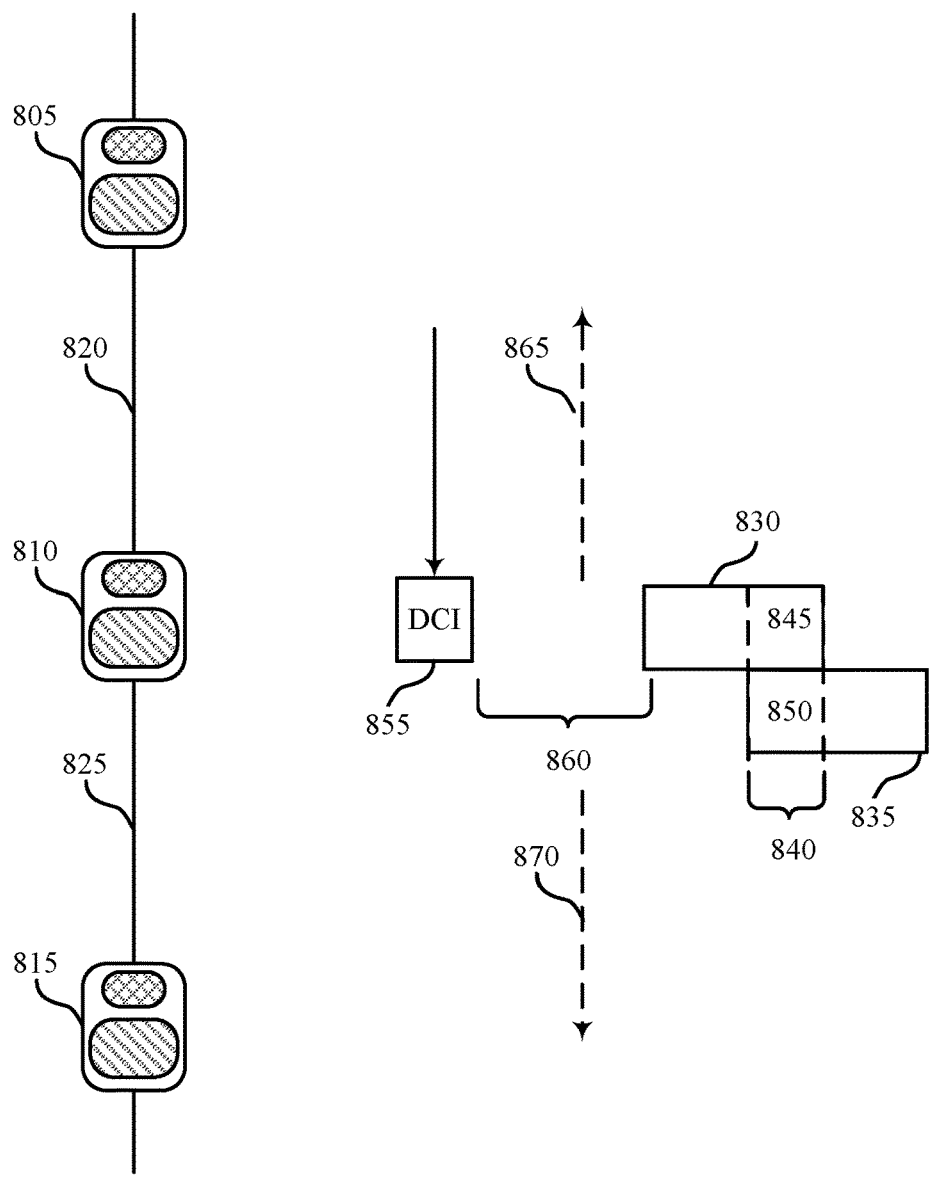
FIG. 8 illustrates an example of a timeline that supports cancellation and interruption indications in IAB networks in accordance with aspects of the present disclosure.

FIG. 8 illustrates an example of a timeline 800 that supports cancellation and interruption indications in IAB networks in accordance with aspects of the present disclosure. In some examples, timeline 800 may implement aspects of wireless communications system 100. In some examples, as described with respect to FIGS. 2, 3, 4, and 5, a parent node 805 may communicate with a relay node 810 via a parent link 820. The relay node 810 may communicate with a child node 815 via child link 825. DU functionality of the parent node 805 may schedule or control communication with the relay node 810. MT functionality of the relay node 810 may receive scheduling from the parent node 805, and conduct communication with the parent node 805 via the parent link 820 accordingly. Similarly, DU functionality of the relay node 810 may schedule or control communication with child node 815 via child link 825.

In some examples, parent node 805 may schedule a first transmission 830 for MT communication by relay node 810 with parent node 805. Relay node 810 may receive DCI 855, which may include a scheduling grant indicating resources (e.g., hard resources) for first transmission 830 after a scheduling gap 860. Relay node 810 may also schedule second transmission 835 for DU communication with child node 815. In some examples, relay node 810 may schedule second transmission 835 via semi-static RRC signaling, or SPS. Because of the semi-static RRC signaling or SPS and the size of gap 860, relay node 810 may identify a TDM alignment conflict (e.g., conflict 840) between first transmission 830 and second transmission 835 prior to the occurrence of conflict 840. With a large amount of time between identifying conflict 840 and the occurrence of conflict 840, relay node 810 may determine that there is sufficient time to generate and transmit a conflict indication, and that parent node 805 or child node 815 would have sufficient time to decode a conflict indication prior to the occurrence of conflict 840. Thus, relay node 810 may generate an MT cancellation indication 865 in the case of a child link bias or a DU cancellation indication 870 in case of a parent link bias. MT cancellation indication 865 may indicate a cancelation of portion 845 of first transmission 830. DU cancellation indication 870 may indicate a cancellation of portion 850 of second transmission 835. Upon receipt of MT cancellation indication 865, parent node 805 may take one or more actions, as described in greater detail with reference to FIG. 6. Similarly, upon receipt of DU cancellation indication 870, child node 815 may take one or more actions, as described in greater detail with reference to FIG. 6.

Figure 9:
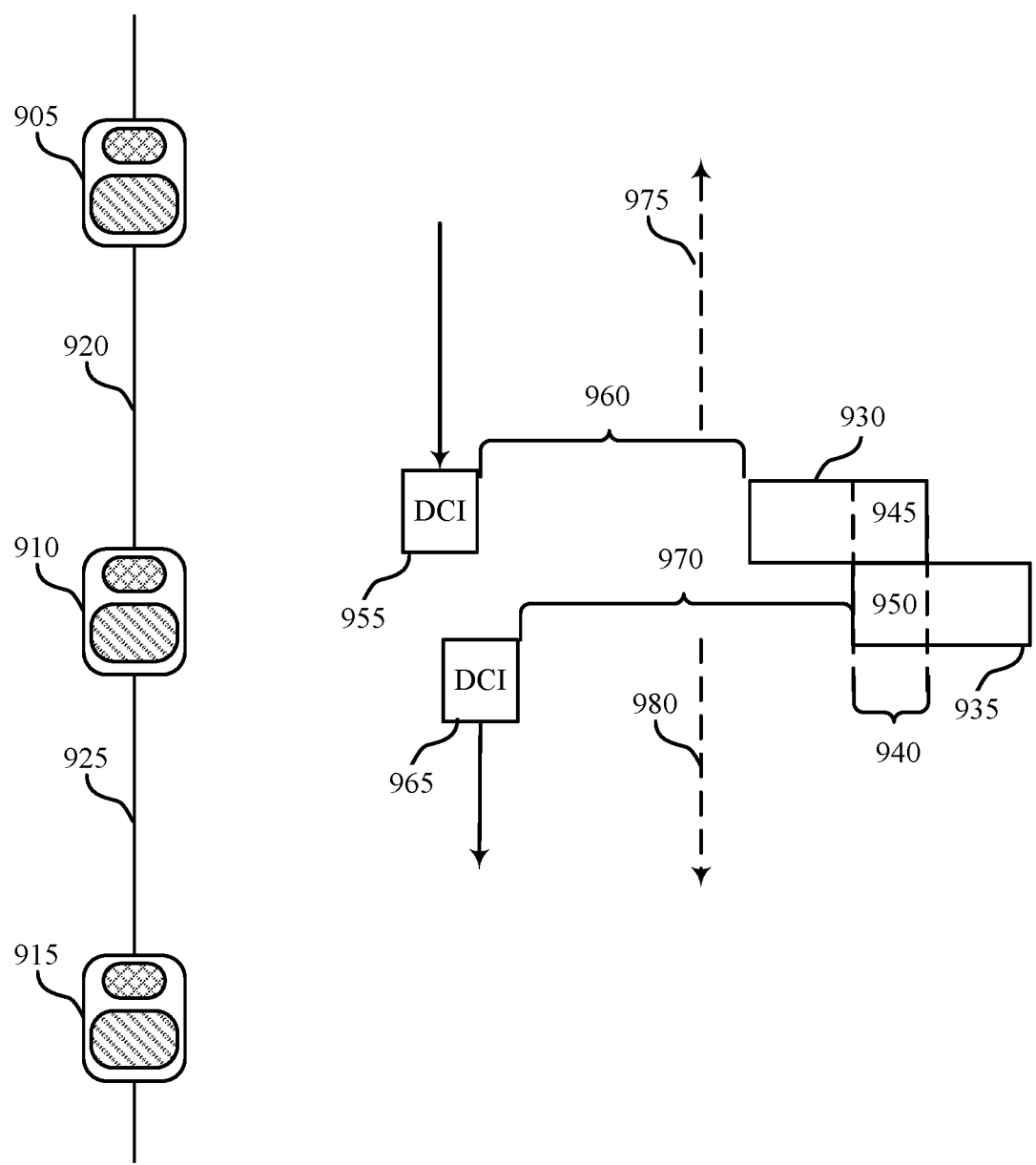
FIG. 9 illustrates an example of a timeline that supports cancellation and interruption indications in IAB networks in accordance with aspects of the present disclosure.

FIG. 9 illustrates an example of a timeline 900 that supports cancellation and interruption indications in IAB networks in accordance with aspects of the present disclosure. In some examples, timeline 900 may implement aspects of wireless communications system 100. In some examples, as described with respect to FIGS. 2, 3, 4, and 5, a parent node 905 may communicate with a relay node 910 via a parent link 920. The relay node 910 may communicate with a child node 915 via child link 925. DU functionality of the parent node 905 may schedule or control communication with the relay node 910. MT functionality of the relay node 910 may receive scheduling from the parent node 905, and conduct communication with the parent node 905 via the parent link 920 accordingly. Similarly, DU functionality of the relay node 910 may schedule or control communication with child node 915 via child link 925.

In some examples, parent node 905 may schedule a first transmission 930 for MT communication by relay node 910 with parent node 905. Relay node 910 may receive DCI 955, which may include a scheduling grant indicating resources (e.g., hard resources) for first transmission 930 after a scheduling gap 960. Relay node 910 may also schedule second transmission 935 for DU communication with child node 915. In some examples, relay node 910 may transmit, and child node 915 may receive, DCI 965, which may include a scheduling grant indicating resources (e.g., hard resources) for second transmission 935 after scheduling gap 970. As illustrated with reference to FIG. 9, the relay node 910 may receive DCI 955 before receiving DCI 965. However, in some examples (not shown) relay node 910 may receive DCI 965 before receiving DCI 955. Because of the size of gap 960 and the size of gap 970, relay node 910 may identify a TDM alignment conflict (e.g., conflict 940) between first transmission 930 and second transmission 935 prior to the occurrence of conflict 940. With a large amount of time between identifying conflict 940 and the occurrence of conflict 940, relay node 910 may determine that there is sufficient time to generate and transmit a conflict indication, and that parent node 905 or child node 915 would have sufficient time to decode a conflict indication prior to the occurrence of conflict 940. Thus, relay node 910 may generate an MT cancellation indication 975 in the case of a child link bias or a DU cancellation indication 980 in case of a parent link bias. MT cancellation indication 975 may indicate a cancelation of portion 945 of first transmission 930. DU cancellation indication 980 may indicate a cancellation of portion 950 of second transmission 935. Upon receipt of MT cancellation indication 975, parent node 905 may take one or more actions, as described in greater detail with reference to FIG. 6. Similarly, upon receipt of DU cancellation indication 980, child node 915 may take one or more actions, as described in greater detail with reference to FIG. 6.

In some examples, if relay node 910 receives DCI 965 before receiving DCI 955 (such that gap 970 is larger than gap 960), relay node 910 may transmit DU cancellation indication 980 (e.g., because gap 960 may not be large enough for preparing, transmitting, and decoding MT cancellation indication 975). In some examples, if relay node 910 receives DCI 955 before receiving DCI 965 (such that gap 960 is larger than gap 970), relay node 910 may transmit MT cancellation indication 975 (e.g., because gap 970 may not be large enough for preparing, transmit, and decoding DU cancellation indication 780).

Figure 10:
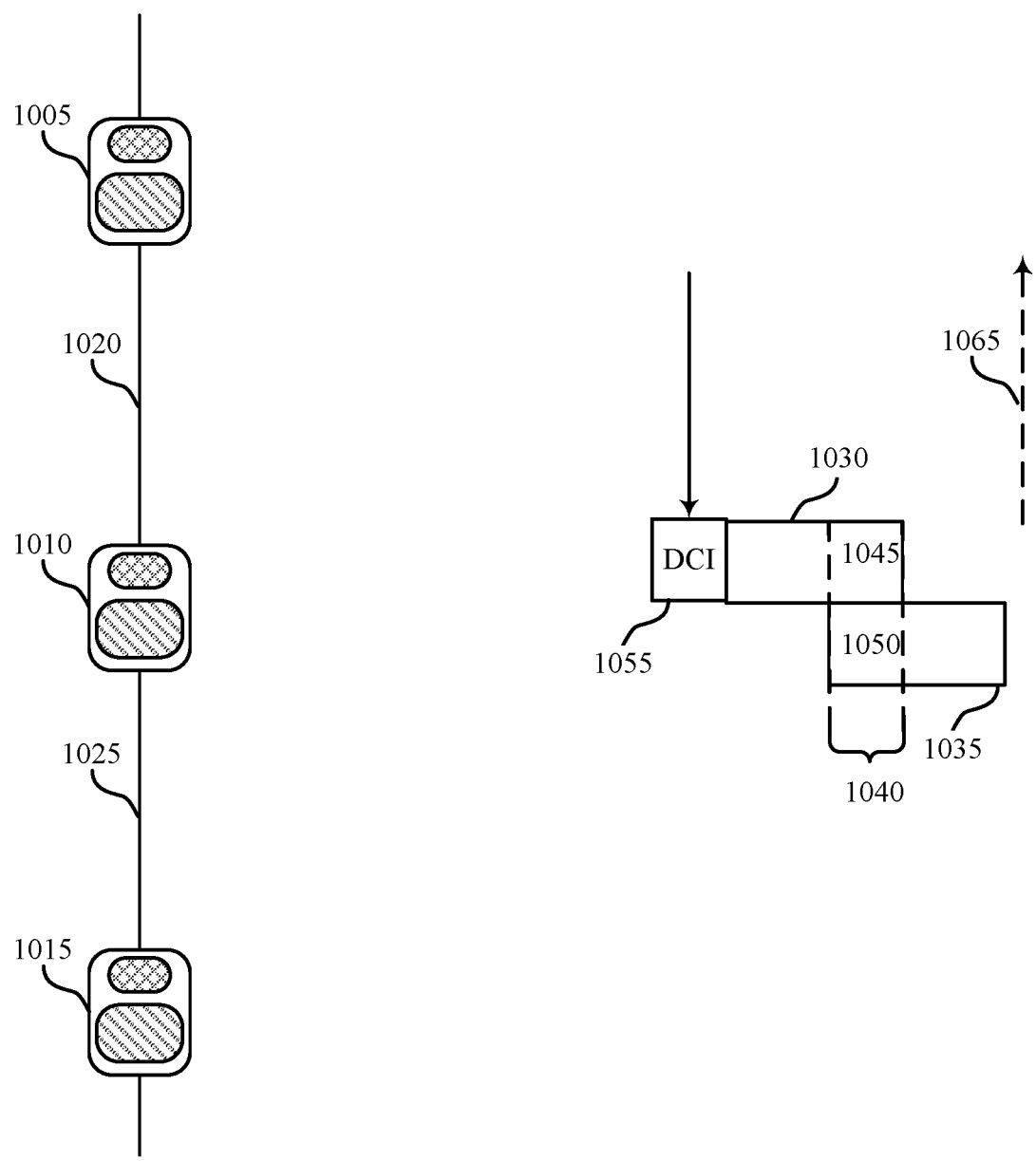
FIG. 10 illustrates an example of a timeline that supports cancellation and interruption indications in IAB networks in accordance with aspects of the present disclosure.

FIG. 10 illustrates an example of a timeline 1000 that supports cancellation and interruption indications in IAB networks in accordance with aspects of the present disclosure. In some examples, timeline 1000 may implement aspects of wireless communications system 100. In some examples, as described with respect to FIGS. 2-6, a parent node 1005 may communicate with a relay node 1010 via a parent link 1020. The relay node 1010 may communicate with a child node 1015 via child link 1025. DU functionality of the parent node 1005 may schedule or control communication with the relay node 1010. MT functionality of the relay node 1010 may receive scheduling from the parent node 1005, and conduct communication with the parent node 1005 via the parent link 1020 accordingly. Similarly, DU functionality of the relay node 1010 may schedule or control communication with child node 1015 via child link 1025.

In some examples, parent node 1005 may schedule a first transmission 1030 for MT communication by relay node 1010 with parent node 1005. Relay node 1010 may receive DCI 1055, which may include a scheduling grant indicating resources (e.g., hard resources) for first transmission 1030 immediately subsequent to DCI 1055 (or after a very small scheduling gap). Relay node 1010 may also schedule second transmission 1035 for DU communication with child node 1015. In some examples, relay node 1010 may schedule second transmission 1035 via semi-static RRC signaling, or SPS. Because of the semi-static RRC signaling or SPS, relay node 1010 may be aware of second transmission 1035. However, relay node 1010 may only become aware of a TDM alignment conflict (e.g., conflict 1040) after decoding DCI 1055, by which time it may be too late to generate and transmit a cancellation indication before the occurrence of conflict 1040. In some examples, relay node 1010 may immediately initiate first transmission 1030 upon decoding DCI 1055. In such examples, relay node 1010 may generate an MT interruption indication 1065. MT interruption indication 1065 may indicate a cancelation of portion 1045 of first transmission 1030. Upon receipt of MT interruption indication 1065, parent node 1005 may take one or more actions, as described in greater detail with reference to FIG. 6. Similarly, in case of a parent link bias, relay node 1010 may generate and transmit a DU interruption indication.

Figure 11:
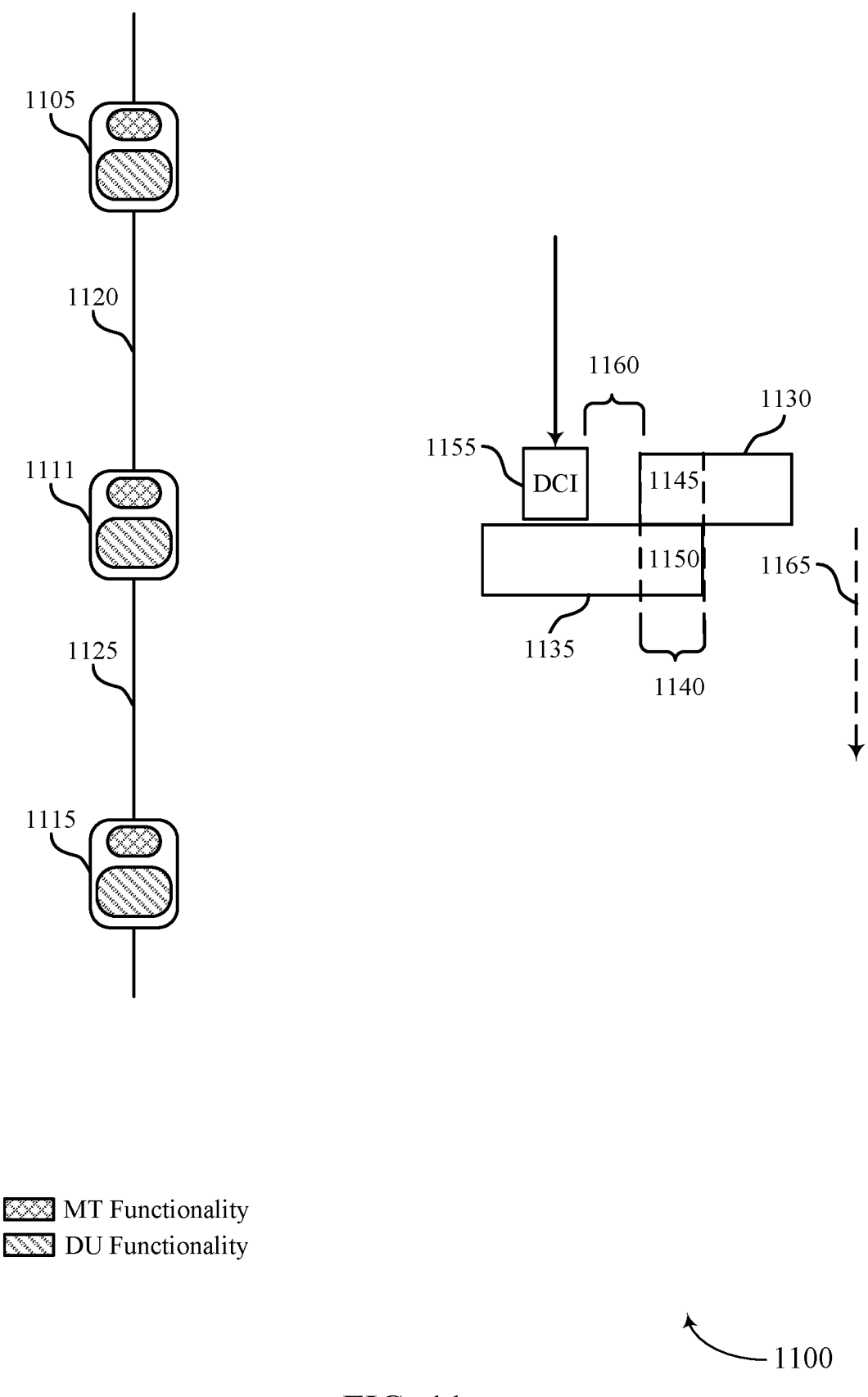
FIG. 11 illustrates an example of a timeline that supports cancellation and interruption indications in IAB networks in accordance with aspects of the present disclosure.

FIG. 11 illustrates an example of a timeline 1100 that supports cancellation and interruption indications in IAB networks in accordance with aspects of the present disclosure. In some examples, timeline 1100 may implement aspects of wireless communications system 100. In some examples, as described with respect to FIGS. 2-6, a parent node 1105 may communicate with a relay node 1110 via a parent link 1120. The relay node 1110 may communicate with a child node 1115 via child link 1125. DU functionality of the parent node 1105 may schedule or control communication with the relay node 1110. MT functionality of the relay node 1110 may receive scheduling from the parent node 1105, and conduct communication with the parent node 1105 via the parent link 1120 accordingly. Similarly, DU functionality of the relay node 1110 may schedule or control communication with child node 1115 via child link 1125.

In some examples, parent node 1105 may schedule a first transmission 1130 for MT communication by relay node 1110 with parent node 1105. Relay node 1110 may receive DCI 1155, which may include a scheduling grant indicating resources (e.g., hard resources) for first transmission 1130 immediately subsequent to DCI 1155, or after a small scheduling gap 1160. Relay node 1110 may also schedule second transmission 1135 for DU communication with child node 1115. In some examples, relay node 1110 may schedule second transmission 1135 via semi-static RRC signaling, or SPS. Because of the semi-static RRC signaling or SPS and the size of gap 1160, relay node 1110 may be aware of second transmission 1135. However, relay node 1110 may only become aware of a TDM alignment conflict (e.g., conflict) 1140 after decoding DCI 1155, by which time it may be too late to generate and transmit a cancellation indication before the occurrence of conflict 1140. In some examples, by the time relay node 1110 receives and decodes DCI 1155 and identifies the pending conflict 1140, relay node 1110 may have already initiated second transmission 1135. In such examples, relay node 1110 may generate a DU interruption indication 1165. DU interruption indication 1165 may indicate a cancelation of portion 1150 of second transmission 1135. Upon receipt of DU interruption indication 1165, child node 1115 may take one or more actions, as described in greater detail with reference to FIG. 6. Similarly, in case of a child link bias, relay node 1110 may generate and transmit an MT interruption indication.

Figure 12:
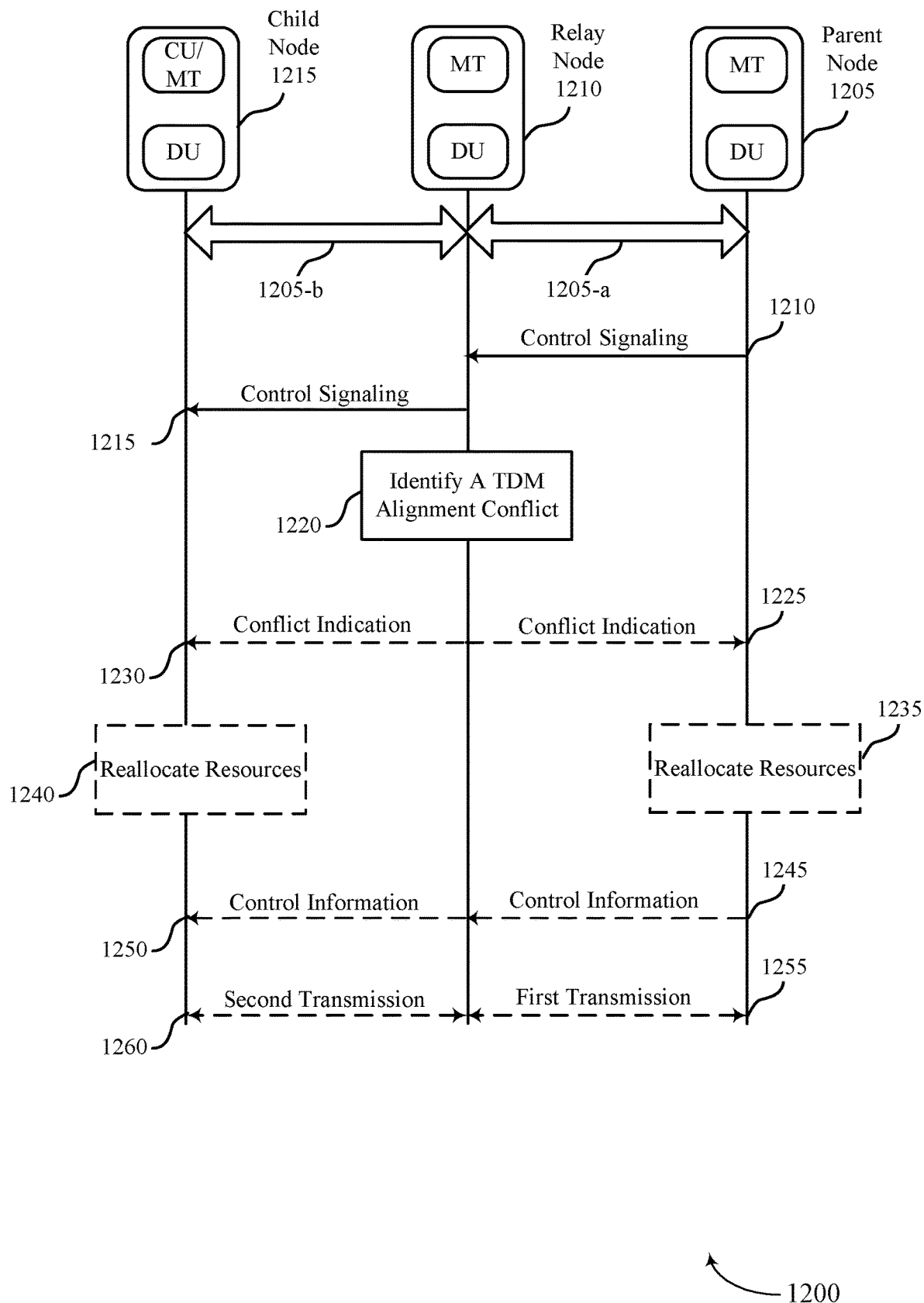
FIG. 12 illustrates an example of a process flow that supports cancellation and interruption indications in IAB networks in accordance with aspects of the present disclosure.

FIG. 12 illustrates an example of a process flow 1200 that supports cancellation and interruption indications in IAB networks in accordance with aspects of the present disclosure. In some examples, process flow 1200 may implement aspects of wireless communications system 100. In some examples, as described with respect to FIGS. 2-11, a parent node 1205 may communicate with a relay node 1210 via a parent link. The relay node 1210 may communicate with a child node 1215 via child link. DU functionality of the parent node 1205 may schedule or control communication with the relay node 1210. MT functionality of the relay node 1210 may receive scheduling from the parent node 1205, and conduct communication with the parent node 1205 via the parent link accordingly. Similarly, DU functionality of the relay node 1210 may schedule or control communication with child node 1215 via a child link.

At 1205-a, relay node 1210 may communicate with parent node 1205 in a TDM mode via a parent link between parent node 1205. At 1205-b, relay node 1210 may communicate with child node 1215 in a TDM mode via a child link between relay node 1210 and child node 1215.

At 1210, parent node 1205 may transmit, and relay node 1210 may receive control signaling. The control signaling may include scheduling information for a first transmission. The control signaling may indicate semi-persistent resources for a first transmission, or may indicate (e.g., via a DCI message), dynamic resources for the first transmission.

At 1215, relay node 1210 may transmit, and child node 1215 may receive, control signaling. The control signaling may include scheduling information for a second transmission. The control signaling may indicate semi-persistent resources for a second transmission, or may indicate (e.g., via a DCI message), dynamic resources for the second transmission.

At 1220, relay node 1210 may identify a TDM alignment conflict. For example, relay node 1210 may determine, based on the control signaling received at 1210 and transmitted at 1215, that at least a portion of the first transmission overlaps in time with at least a portion of the second transmission. In some examples, based on the control signaling, relay node 1210 may have sufficient time between identifying the TDM alignment conflict at 1220 and the occurrence of the TDM alignment conflict, to generate, and transmit a conflict indication including a cancellation message, and parent node 1205 or child node 1215 may have time to decode the conflict indication including the cancellation message prior to the occurrence of the TDM alignment conflict. In such cases, relay node 1210 may transmit a conflict indication including a cancellation message to either parent node 1205 or child node 1215, based on a link bias.

At 1225, relay node 1210 may give priority to DU operations (e.g., a child link preference), and may transmit a conflict indication including a cancellation message to parent node 1205. The cancellation message may indicate a cancellation of at least a portion of the first transmission, the second transmission, or both, for at least a portion of an allocated resource. For example, the cancellation message may indicate that relay node 1210 has canceled its transmission or reception operations for the portion of the first transmission that overlaps with the second transmission. In such examples, at 1235, parent node 1205 may reallocate one or more resources for communicating with another device. For instance, parent node 1205 may reallocate the at least a portion of an allocated resource on which at least a portion of the first transmission, the second transmission, or both, have been cancelled. At 1245, in some examples, parent node 1205 may transmit additional control information to relay node 1210, and may schedule resources for a retransmission of the first transmission or a portion of the first transmission. At 1255, relay node 1210 may communicate the first transmission or portion of the first transmission with parent node 1205.

At 1230, relay node 1210 may give priority to MT operations (e.g., a parent link preference), and may transmit a conflict indication including a cancellation message to child node 1215. The cancellation message may indicate a cancellation of at least a portion of the first transmission, the second transmission, or both, for at least a portion of an allocated resources. For example, the cancellation message may indicate that relay node 1210 has canceled its transmission or reception operations for the portion of the second transmission that overlaps with the first transmission. In such examples, at 1240, child node 1215 may reallocate one or more resources for communicating with another device (e.g., its own child node in an IAB chain). For instance, child node 1215 may reallocate the at least a portion of an allocated resources on which at least a portion of the second transmission, the first transmission, or both, have been cancelled. At 1250, in some examples, child node 1215 may receive additional control information from relay node 1210, rescheduling the second transmission or a portion of the second transmission. At 1260, relay node 1210 and child node 1215 may communicate the second transmission or a portion of the second transmission.

Figure 13:
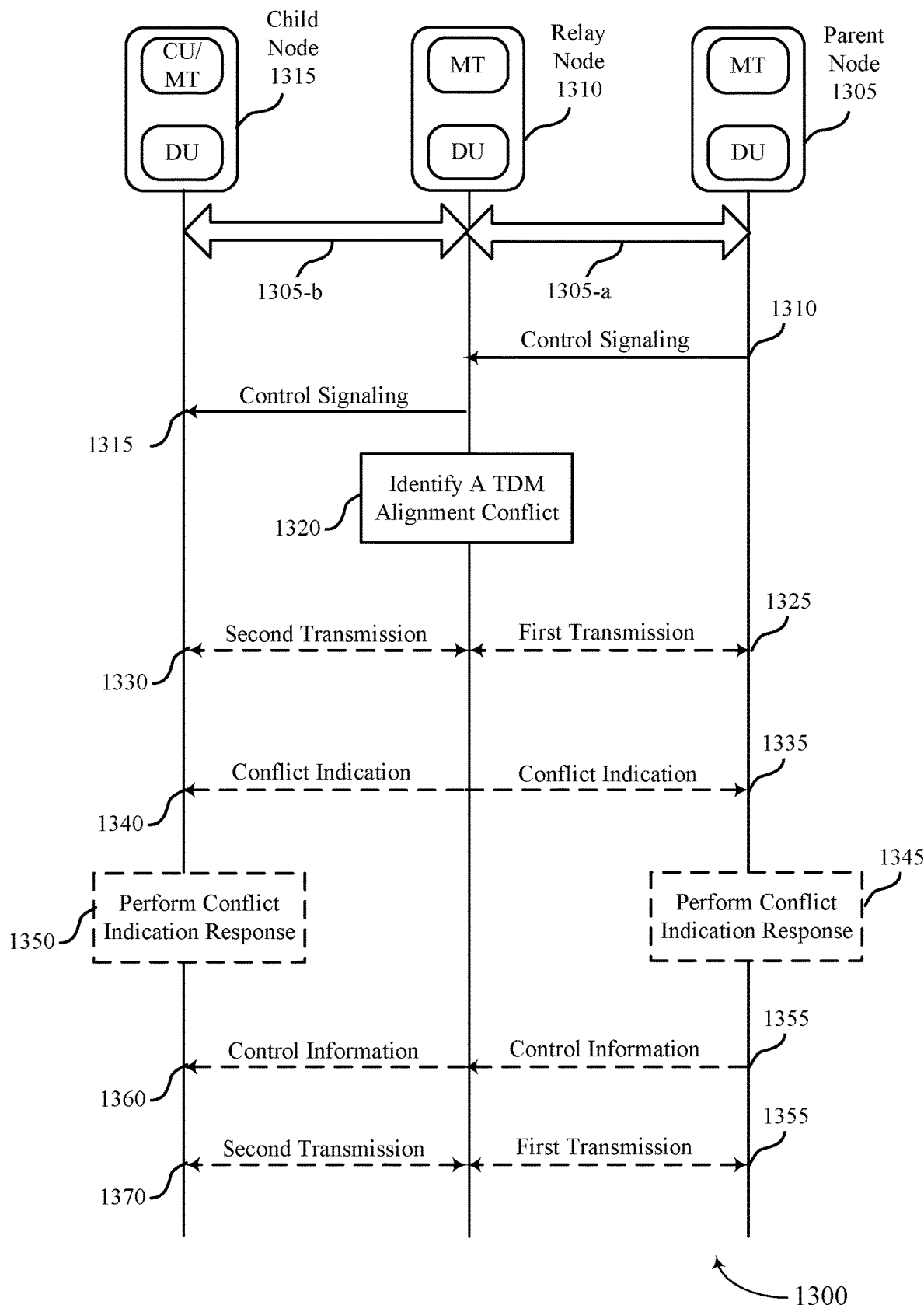
FIG. 13 illustrates an example of a process flow that supports cancellation and interruption indications in IAB networks in accordance with aspects of the present disclosure.

FIG. 13 illustrates an example of a process flow 1300 that supports cancellation and interruption indications in IAB networks in accordance with aspects of the present disclosure. In some examples, process flow 1300 may implement aspects of wireless communications system 100. In some examples, as described with respect to FIGS. 2-12, a parent node 1305 may communicate with a relay node 1310 via a parent link. The relay node 1310 may communicate with a child node 1315 via a child link. DU functionality of the parent node 1305 may schedule or control communication with the relay node 1310. MT functionality of the relay node 1310 may receive scheduling from the parent node 1305, and conduct communication with the parent node 1305 via the parent link accordingly. Similarly, DU functionality of the relay node 1310 may schedule or control communication with child node 1315 via a child link.

At 1305-a, relay node 1310 may communicate with parent node 1305 in a TDM mode via a parent link between parent node 1305. At 1305-b, relay node 1310 may communicate with child node 1315 in a TDM mode via a child link between relay node 1310 and child node 1315.

At 1310, parent node 1305 may transmit, and relay node 1310 may receive control signaling. The control signaling may include scheduling information for a first transmission. The control signaling may indicate semi-persistent resources for a first transmission, or may indicate (e.g., via a DCI message), dynamic resources for the first transmission.

At 1315, relay node 1310 may transmit, and child node 1315 may receive, control signaling. The control signaling may include scheduling information for a second transmission. The control signaling may indicate semi-persistent resources for a second transmission, or may indicate (e.g., via a DCI message), dynamic resources for the second transmission.

At 1320, relay node 1310 may identify a TDM alignment conflict. For example, relay node 1310 may determine, based on the control signaling received at 1310 and transmitted at 1315, that at least a portion of the first transmission overlaps in time with at least a portion of the second transmission. In some examples, relay node 1310 may identify the TDM alignment conflict prior to the occurrence of the TDM alignment conflict. However, relay node 1310 may not have sufficient time between identifying the TDM alignment conflict at 1320 and the occurrence of the TDM alignment conflict, to generate, and transmit a conflict indication including a cancellation message, and parent node 1305 or child node 1315 may not have time to decode the conflict indication including the cancellation message prior to the occurrence of the TDM alignment conflict. Or, in some examples, relay node 1310 may not identify the TDM alignment conflict until immediately prior to or during one of the first transmission or the second transmission, or both. In such cases, relay node 1310 may transmit a conflict indication including an interruption message to either parent node 1305 or child node 1315, based on a link bias.

At 1325, parent node 1305 may attempt to initiate the first transmission (e.g., receive an uplink transmission or transmit a downlink transmission). At 1330, child node 1315 may attempt to initiate the second transmission (e.g., receive a downlink transmission or transmit an uplink transmission). However, as a result of the TDM alignment conflict identified at 1320, relay node 1310 may transmit a conflict indication including an interruption message to either parent node 1305 or child node 1315, based on a link bias.

At 1335, relay node 1310 may give priority to DU operations (e.g., a child link preference), and may transmit a conflict indication including an interruption message to parent node 1305. The interruption message may indicate an interruption of at least a portion of the first transmission that is an uplink transmission or a downlink transmission via the parent link, of the second transmission that is an uplink transmission or a downlink transmission via the child link, or both. For example, the interruption message may indicate that transmission or reception operations of relay node 1310 have been interrupted for the portion of the first transmission that overlaps with the second transmission. In such examples, at 1345, parent node 1305 may perform one or more conflict indication responses (e.g., take one or more actions, as described in greater detail with reference to FIG. 6). At 1355, in some examples, parent node 1305 may transmit additional control information to relay node 1310, and may schedule resources for a retransmission of the first transmission or a portion of the first transmission. At 1365, relay node 1310 may communicate the first transmission or portion of the first transmission with parent node 1305.

At 1330, relay node 1310 may give priority to MT operations (e.g., a parent link preference), and may transmit a conflict indication including an interruption message to child node 1315. The interruption message may indicate an interruption of at least a portion of the first transmission that is an uplink transmission or a downlink transmission via the parent link, of the second transmission that is an uplink transmission or a downlink transmission via the child link, or both. For example, the interruption message may indicate that transmission or reception operations of relay node 1310 have been interrupted for the portion of the second transmission that overlaps with the first transmission. In such examples, at 1305, child node 1315 may perform one or more conflict indication responses (e.g., take one or more actions, as described in greater detail with reference to FIG. 6). At 1360, in some examples, child node 1315 may receive additional control information from relay node 1310, which may schedule resources for a retransmission of the second transmission or a portion of the second transmission. At 1365, relay node 1310 may communicate the second transmission or portion of the second transmission with child node 1315.

Figure 14:
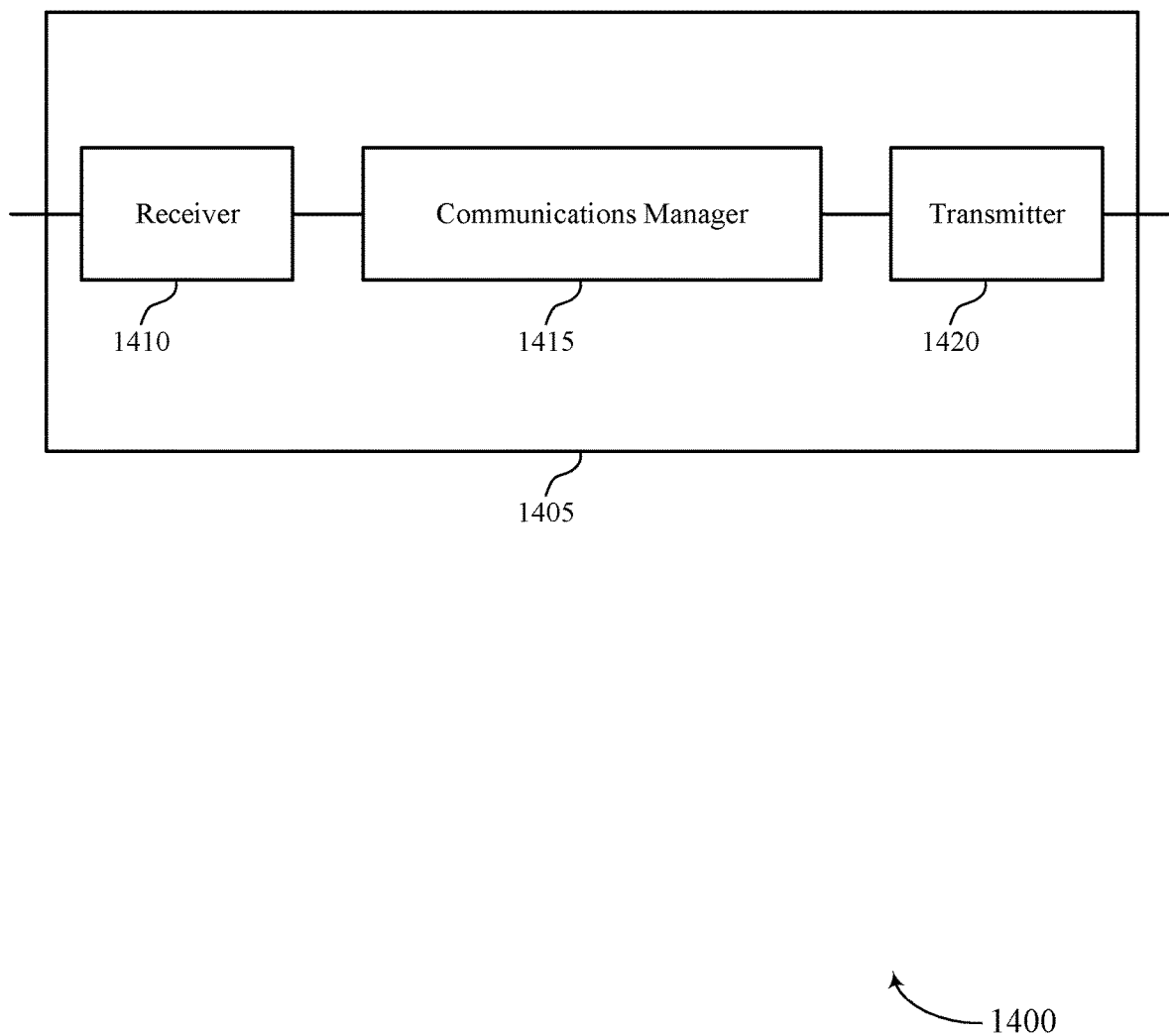
FIGS. 14 and 15 show diagrams of devices that support cancellation and interruption indications in IAB networks in accordance with aspects of the present disclosure.

FIG. 14 shows a diagram 1400 of a device 1405 that supports cancellation and interruption indications in IAB networks in accordance with aspects of the present disclosure. The device 1405 may be an example of aspects of a UE 115 as described herein. The device 1405 may include a receiver 1410, a communications manager 1415, and a transmitter 1420. The device 1405 may also include a processor. Each of these components may be in communication with one another (e.g., via one or more buses).

The receiver 1410 may receive information such as packets, user data, or control information associated with various information channels (e.g., control channels, data channels, and information related to cancellation and interruption indications in IAB networks, etc.). Information may be passed on to other components of the device 1405. The receiver 1410 may be an example of aspects of the transceiver 1720 described with reference to FIG. 17. The receiver 1410 may utilize a single antenna or a set of antennas.

The communications manager 1415 may communicate with a relay node operating in a time division multiplexing mode via a child link between the relay node and the child node, receive control signaling scheduling a second transmission between the relay node and the child node via the child link, and receive, based on the control signaling, a conflict indication indicating a TDM alignment conflict between the second transmission and a first transmission scheduled for a parent link between the relay node and a parent node. The communications manager 1415 may be an example of aspects of the communications manager 1710 described herein.

The communications manager 1415, or its sub-components, may be implemented in hardware, code (e.g., software or firmware) executed by a processor, or any combination thereof. If implemented in code executed by a processor, the functions of the communications manager 1415, or its sub-components may be executed by a general-purpose processor, a digital signal processor (DSP), an application-specific integrated circuit (ASIC), a field programmable gate array (FPGA) or other programmable logic device, discrete gate or transistor logic, discrete hardware components, or any combination thereof designed to perform the functions described in the present disclosure.

The communications manager 1415, or its sub-components, may be physically located at various positions, including being distributed such that portions of functions are implemented at different physical locations by one or more physical components. In some examples, the communications manager 1415, or its sub-components, may be a separate and distinct component in accordance with various aspects of the present disclosure. In some examples, the communications manager 1415, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1420 may transmit signals generated by other components of the device 1405. In some examples, the transmitter 1420 may be collocated with a receiver 1410 in a transceiver module. For example, the transmitter 1420 may be an example of aspects of the transceiver 1720 described with reference to FIG. 17. The transmitter 1420 may utilize a single antenna or a set of antennas.

In some examples, the communications manager 1415 may be implemented as an integrated circuit or chipset for a mobile device modem, and the receiver 1410 and transmitter 1420 may be implemented as analog components (e.g., amplifiers, filters, antennas) coupled with the mobile device modem to enable wireless transmission and reception over one or more bands.

The communications manager 1415 as described herein may be implemented to realize one or more potential advantages. The described techniques may support improvements in system efficiency such that a parent node or a child node in an IAB system may avoid a conflicting transmissions in a TDM mode before the conflict occurs, or reduce negative impacts of a conflict after it occurs. This may result in improved system efficiency, power savings, increased accuracy in measurement procedures, beam forming, beam tracking, or link management procedures, or the like.

Figure 17:
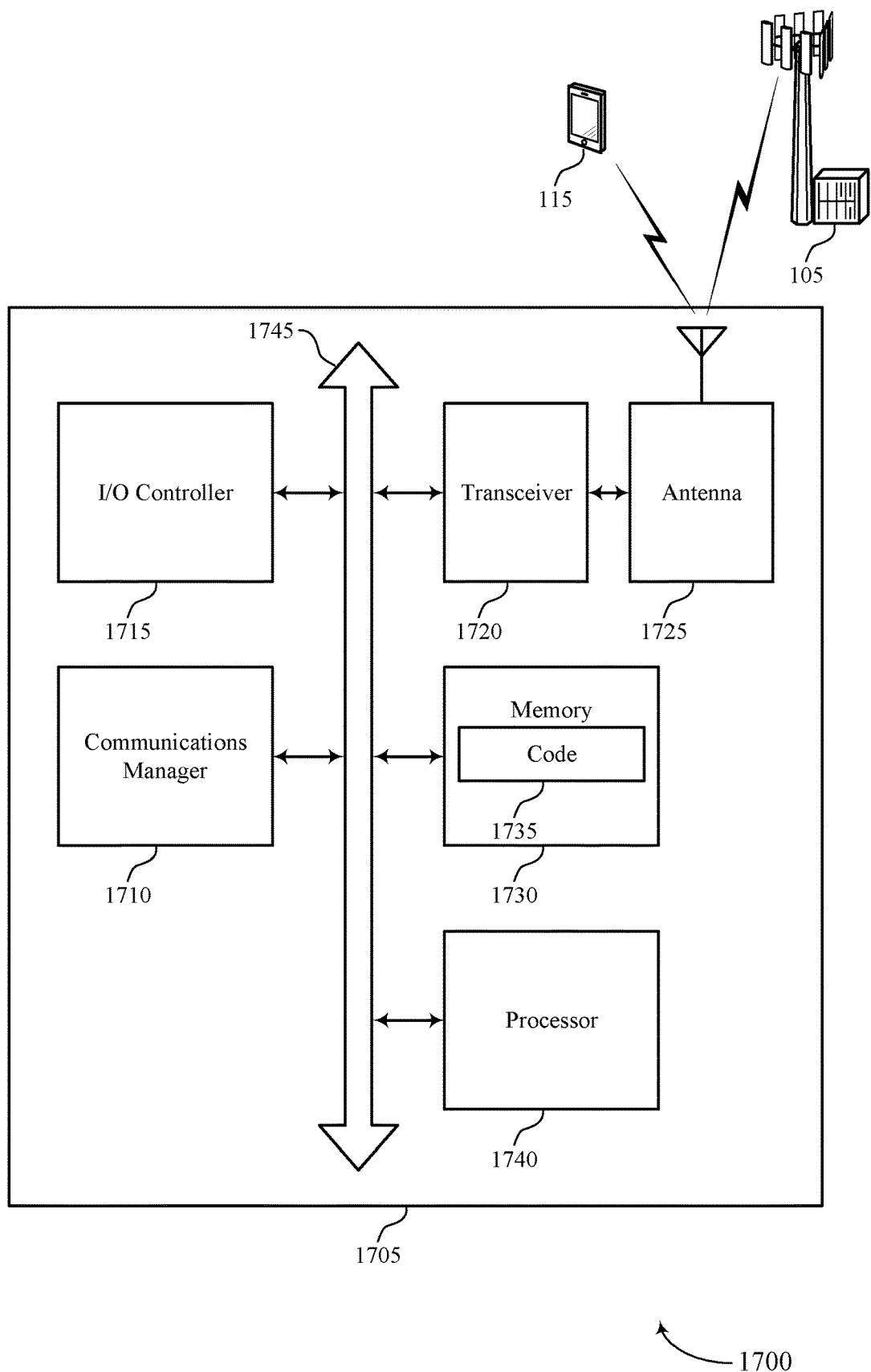
FIG. 17 shows a diagram of a system including a device that supports cancellation and interruption indications in IAB networks in accordance with aspects of the present disclosure.

Based on techniques for efficiently communicating maximum number of layers for a device as described herein, a processor of a UE 115 (e.g., controlling the receiver 1410, the transmitter 1420, or a transceiver 1720 as described with respect to FIG. 17) may increase system efficiency and decrease unnecessary processing at a device.

Figure 15:
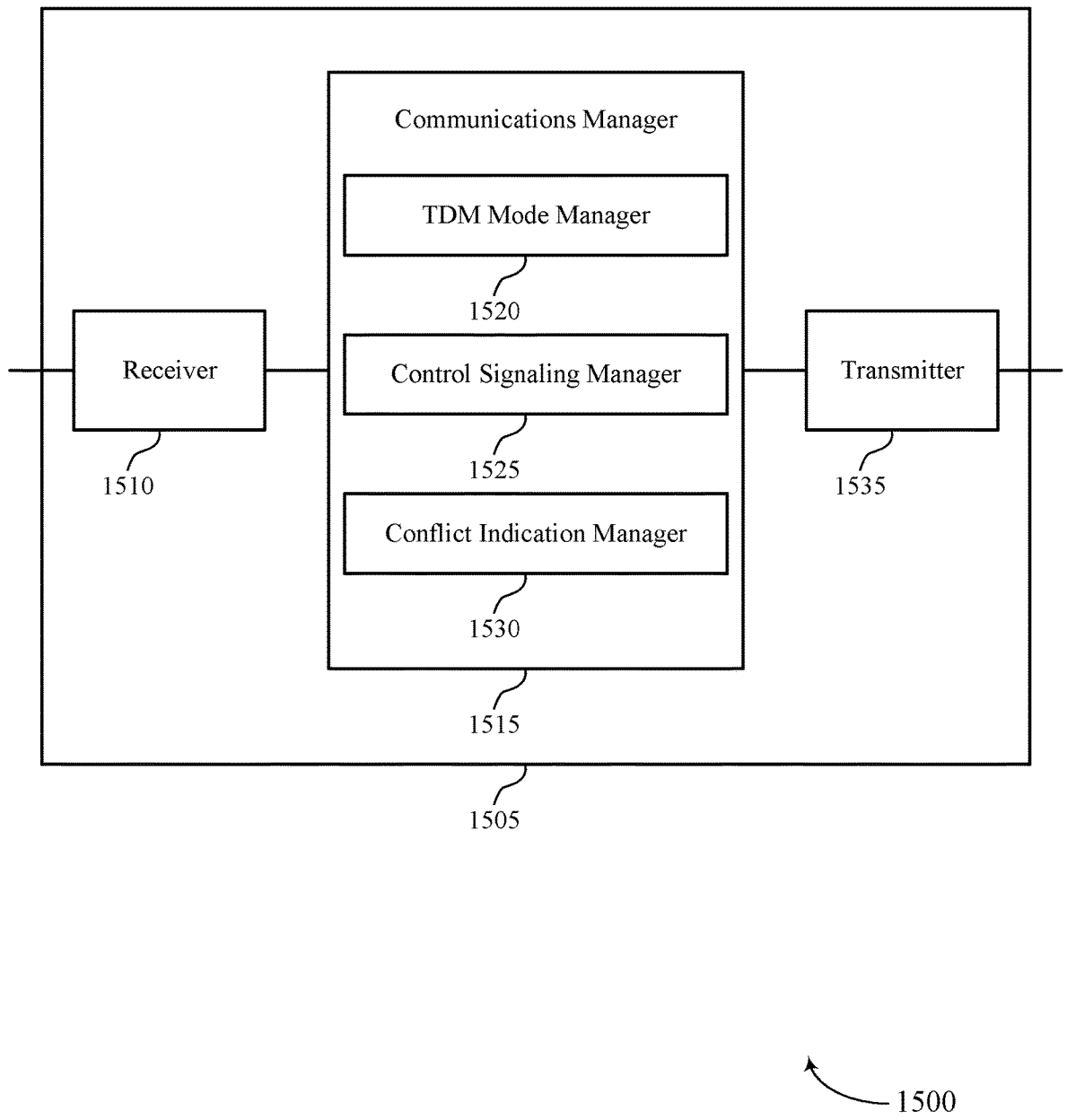

FIG. 15 shows a diagram 1500 of a device 1505 that supports cancellation and interruption indications in IAB networks in accordance with aspects of the present disclosure. The device 1505 may be an example of aspects of a device 1405, or a UE 115 as described herein. The device 1505 may include a receiver 1510, a communications manager 1515, and a transmitter 1535. The device 1505 may also include a processor. Each of these components may be in communication with one another (e.g., via one or more buses).

The receiver 1510 may receive information such as packets, user data, or control information associated with various information channels (e.g., control channels, data channels, and information related to cancellation and interruption indications in IAB networks, etc.). Information may be passed on to other components of the device 1505. The receiver 1510 may be an example of aspects of the transceiver 1720 described with reference to FIG. 17. The receiver 1510 may utilize a single antenna or a set of antennas.

The communications manager 1515 may be an example of aspects of the communications manager 1415 as described herein. The communications manager 1515 may include a TDM mode manager 1520, a control signaling manager 1525, and a conflict indication manager 1530. The communications manager 1515 may be an example of aspects of the communications manager 1710 described herein.

The TDM mode manager 1520 may communicate with a relay node operating in a time division multiplexing mode via a child link between the relay node and the child node.

The control signaling manager 1525 may receive control signaling scheduling a second transmission between the relay node and the child node via the child link.

The conflict indication manager 1530 may receive, based on the control signaling, a conflict indication indicating a TDM alignment conflict between the second transmission and a first transmission scheduled for a parent link between the relay node and a parent node.

The transmitter 1535 may transmit signals generated by other components of the device 1505. In some examples, the transmitter 1535 may be collocated with a receiver 1510 in a transceiver module. For example, the transmitter 1535 may be an example of aspects of the transceiver 1720 described with reference to FIG. 17. The transmitter 1535 may utilize a single antenna or a set of antennas.

Figure 16:
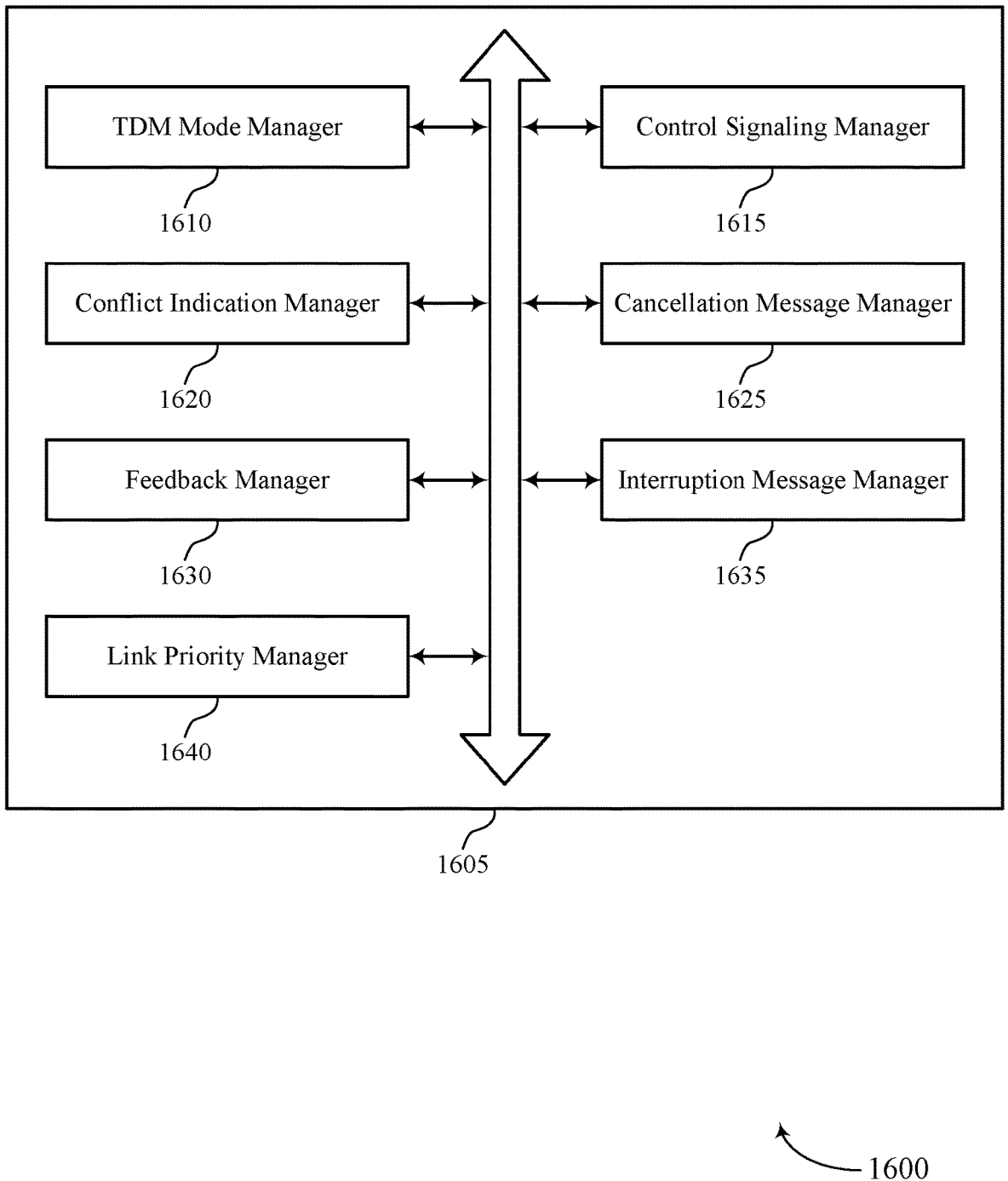
FIG. 16 shows a diagram of a communications manager that supports cancellation and interruption indications in IAB networks in accordance with aspects of the present disclosure.

FIG. 16 shows a diagram 1600 of a communications manager 1605 that supports cancellation and interruption indications in IAB networks in accordance with aspects of the present disclosure. The communications manager 1605 may be an example of aspects of a communications manager 1415, a communications manager 1515, or a communications manager 1710 described herein. The communications manager 1605 may include a TDM mode manager 1610, a control signaling manager 1615, a conflict indication manager 1620, a cancellation message manager 1625, a feedback manager 1630, an interruption message manager 1635, and a link priority manager 1640. Each of these modules may communicate, directly or indirectly, with one another (e.g., via one or more buses).

The TDM mode manager 1610 may communicate with a relay node operating in a time division multiplexing mode via a child link between the relay node and the child node.

The control signaling manager 1615 may receive control signaling scheduling a second transmission between the relay node and the child node via the child link. In some examples, the control signaling manager 1615 may transmit second control signaling reallocating the at least the portion of the allocated resource based on the cancellation message. In some examples, the control signaling manager 1615 may receive scheduling control signaling indicating a first semi-persistent resource or a first dynamic resource in which the second transmission is scheduled for transmission.

The conflict indication manager 1620 may receive, based on the control signaling, a conflict indication indicating a TDM alignment conflict between the second transmission and a first transmission scheduled for a parent link between the relay node and a parent node. In some examples, refraining from incrementing a transmission counter, where the second transmission includes a scheduling request or a random access message. In some examples, receiving the conflict indication that includes a bitmap indicating a cancelled or interrupted resource over one or more transmission time intervals. In some examples, the conflict indication manager 1620 may receive a list configuration indicating a list of one or more resources over one or more transmission time intervals. In some examples, receiving the conflict indication that includes an index indicating a first resource from the list is a cancelled resource or an interrupted resource. In some examples, the conflict indication manager 1620 may receive the conflict indication via a control channel, a medium access control (MAC) control element, or both.

The cancellation message manager 1625 may receive the conflict indication including a cancellation message indicating cancellation of at least a portion of the second transmission for at least a portion of an allocated resource. In some examples, the cancellation message manager 1625 may receive the conflict indication including the cancellation message prior to the allocated resource. In some examples, the cancellation message manager 1625 may receive the conflict indication including the cancellation message indicating cancellation of at least the portion of the second transmission that is an uplink transmission, or a downlink transmission scheduled via the child link.

The feedback manager 1630 may discard the first transmission from a set of downlink transmissions. In some examples, the feedback manager 1630 may perform a feedback combination procedure based on the discarding.

The interruption message manager 1635 may receive the conflict indication including an interruption message indicating interruption of at least a portion of the first transmission for at least a portion of an allocated resource. In some examples, the interruption message manager 1635 may receive the conflict indication including the interruption message after the allocated resource. In some examples, the interruption message manager 1635 may receive the conflict indication including the interruption message indicating interruption of at least the portion of the second transmission that is an uplink transmission, or a downlink transmission scheduled via the child link.

The link priority manager 1640 may receive the conflict indication indicating cancellation of the second transmission based on a priority of the parent link relative to the child link.

FIG. 17 shows a diagram of a system 1700 including a device 1705 that supports cancellation and interruption indications in IAB networks in accordance with aspects of the present disclosure. The device 1705 may be an example of or include the components of device 1405, device 1505, or a UE 115 as described herein. The device 1705 may include components for bi-directional voice and data communications including components for transmitting and receiving communications, including a communications manager 1710, an I/O controller 1715, a transceiver 1720, an antenna 1725, memory 1730, and a processor 1740. These components may be in electronic communication via one or more buses (e.g., bus 1745).

The communications manager 1710 may communicate with a relay node operating in a time division multiplexing mode via a child link between the relay node and the child node, receive control signaling scheduling a second transmission between the relay node and the child node via the child link, and receive, based on the control signaling, a conflict indication indicating a TDM alignment conflict between the second transmission and a first transmission scheduled for a parent link between the relay node and a parent node.

The I/O controller 1715 may manage input and output signals for the device 1705. The I/O controller 1715 may also manage peripherals not integrated into the device 1705. In some cases, the I/O controller 1715 may represent a physical connection or port to an external peripheral. In some cases, the I/O controller 1715 may utilize an operating system such as iOS®, ANDROID®, MS-DOS®, MS-WINDOWS®, OS/2®, UNIX®, LINUX®, or another known operating system. In other cases, the I/O controller 1715 may represent or interact with a modem, a keyboard, a mouse, a touchscreen, or a similar device. In some cases, the I/O controller 1715 may be implemented as part of a processor. In some cases, a user may interact with the device 1705 via the I/O controller 1715 or via hardware components controlled by the I/O controller 1715.

The transceiver 1720 may communicate bi-directionally, via one or more antennas, wired, or wireless links as described above. For example, the transceiver 1720 may represent a wireless transceiver and may communicate bi-directionally with another wireless transceiver. The transceiver 1720 may also include a modem to modulate the packets and provide the modulated packets to the antennas for transmission, and to demodulate packets received from the antennas.

In some cases, the wireless device may include a single antenna 1725. However, in some cases the device may have more than one antenna 1725, which may be capable of concurrently transmitting or receiving multiple wireless transmissions.

The memory 1730 may include random-access memory (RAM) and read-only memory (ROM). The memory 1730 may store computer-readable, computer-executable code 1735 including instructions that, when executed, cause the processor to perform various functions described herein. In some cases, the memory 1730 may contain, among other things, a basic input/output (IO) system (BIOS) which may control basic hardware or software operation such as the interaction with peripheral components or devices.

The processor 1740 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1740 may be configured to operate a memory array using a memory controller. In other cases, a memory controller may be integrated into the processor 1740. The processor 1740 may be configured to execute computer-readable instructions stored in a memory (e.g., the memory 1730) to cause the device 1705 to perform various functions (e.g., functions or tasks supporting cancellation and interruption indications in IAB networks).

The code 1735 may include instructions to implement aspects of the present disclosure, including instructions to support wireless communications. The code 1735 may be stored in a non-transitory computer-readable medium such as system memory or other type of memory. In some cases, the code 1735 may not be directly executable by the processor 1740 but may cause a computer (e.g., when compiled and executed) to perform functions described herein.

Figure 18:
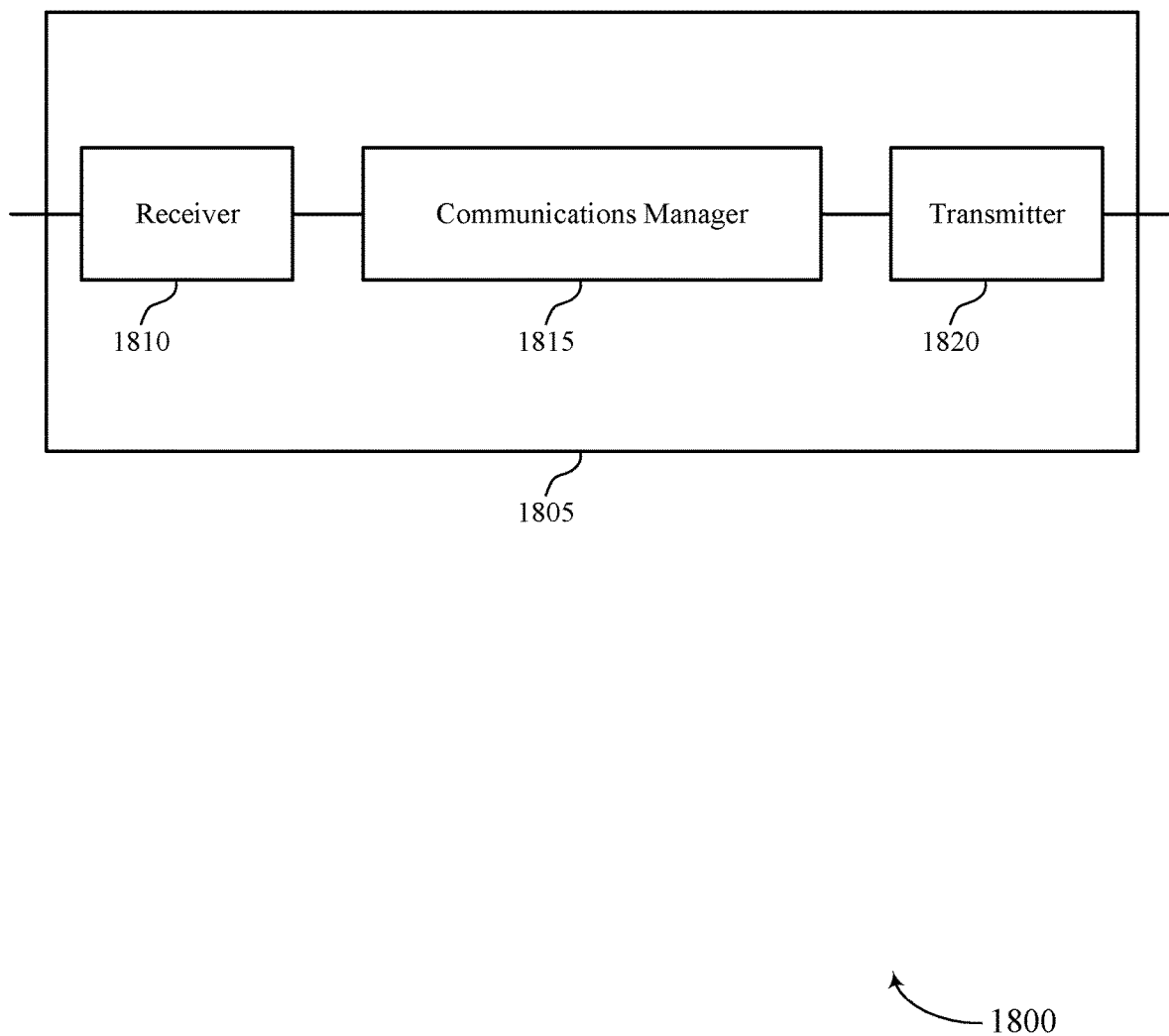
FIGS. 18 and 19 show diagrams of devices that support cancellation and interruption indications in IAB networks in accordance with aspects of the present disclosure.

FIG. 18 shows a diagram 1800 of a device 1805 that supports cancellation and interruption indications in IAB networks in accordance with aspects of the present disclosure. The device 1805 may be an example of aspects of a base station 105 as described herein. The device 1805 may include a receiver 1810, a communications manager 1815, and a transmitter 1820. The device 1805 may also include a processor. Each of these components may be in communication with one another (e.g., via one or more buses).

The receiver 1810 may receive information such as packets, user data, or control information associated with various information channels (e.g., control channels, data channels, and information related to cancellation and interruption indications in IAB networks, etc.). Information may be passed on to other components of the device 1805. The receiver 1810 may be an example of aspects of the transceiver 2120 described with reference to FIG. 21. The receiver 1810 may utilize a single antenna or a set of antennas.

The communications manager 1815 may communicate, by the relay node operating in a time division multiplexing (TDM) mode, with a parent node via a parent link configured between the relay node and the parent node and with a child node via a child link configured between the relay node and the child node, identify, based on the relay node operating in the TDM mode, a TDM alignment conflict between a first transmission scheduled for the parent link and a second transmission scheduled for the child link, and transmit, to at least one of the parent node or the child node, a conflict indication based on the identifying. The communications manager 1815 may also communicate with a relay node operating in a time division multiplexing (TDM) mode via a parent link between the relay node and the parent node, transmit control signaling scheduling a first transmission between the relay node and the parent node via the parent link, and receive, based on the control signaling, a conflict indication indicating a TDM alignment conflict between the first transmission and a second transmission scheduled for a child link between the relay node and a child node. The communications manager 1815 may be an example of aspects of the communications manager 2110 described herein.

The communications manager 1815, or its sub-components, may be implemented in hardware, code (e.g., software or firmware) executed by a processor, or any combination thereof. If implemented in code executed by a processor, the functions of the communications manager 1815, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 1815, or its sub-components, may be physically located at various positions, including being distributed such that portions of functions are implemented at different physical locations by one or more physical components. In some examples, the communications manager 1815, or its sub-components, may be a separate and distinct component in accordance with various aspects of the present disclosure. In some examples, the communications manager 1815, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 1820 may transmit signals generated by other components of the device 1805. In some examples, the transmitter 1820 may be collocated with a receiver 1810 in a transceiver module. For example, the transmitter 1820 may be an example of aspects of the transceiver 2120 described with reference to FIG. 21. The transmitter 1820 may utilize a single antenna or a set of antennas.

Figure 19:
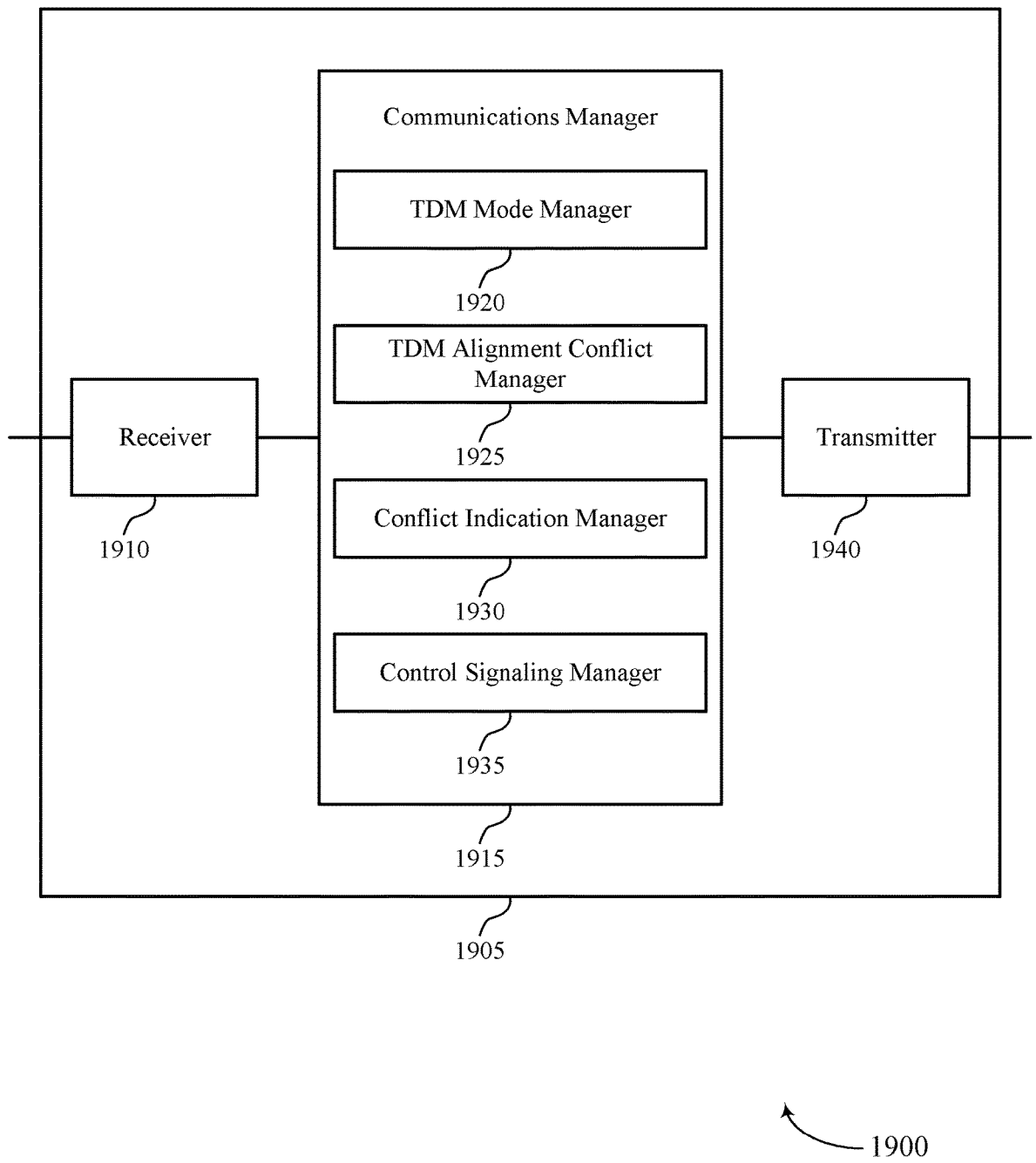

FIG. 19 shows a diagram 1900 of a device 1905 that supports cancellation and interruption indications in IAB networks in accordance with aspects of the present disclosure. The device 1905 may be an example of aspects of a device 1805, or a base station 105 as described herein. The device 1905 may include a receiver 1910, a communications manager 1915, and a transmitter 1940. The device 1905 may also include a processor. Each of these components may be in communication with one another (e.g., via one or more buses).

The receiver 1910 may receive information such as packets, user data, or control information associated with various information channels (e.g., control channels, data channels, and information related to cancellation and interruption indications in IAB networks, etc.). Information may be passed on to other components of the device 1905. The receiver 1910 may be an example of aspects of the transceiver 2120 described with reference to FIG. 21. The receiver 1910 may utilize a single antenna or a set of antennas.

The communications manager 1915 may be an example of aspects of the communications manager 1815 as described herein. The communications manager 1915 may include a TDM mode manager 1920, a TDM alignment conflict manager 1925, a conflict indication manager 1930, and a control signaling manager 1935. The communications manager 1915 may be an example of aspects of the communications manager 2110 described herein.

The TDM mode manager 1920 may communicate, by the relay node operating in a time division multiplexing (TDM) mode, with a parent node via a parent link configured between the relay node and the parent node and with a child node via a child link configured between the relay node and the child node.

The TDM alignment conflict manager 1925 may identify, based on the relay node operating in the TDM mode, a TDM alignment conflict between a first transmission scheduled for the parent link and a second transmission scheduled for the child link.

The conflict indication manager 1930 may transmit, to at least one of the parent node or the child node, a conflict indication based on the identifying.

The TDM mode manager 1920 may communicate with a relay node operating in a time division multiplexing (TDM) mode via a parent link between the relay node and the parent node.

The control signaling manager 1935 may transmit control signaling scheduling a first transmission between the relay node and the parent node via the parent link.

The conflict indication manager 1930 may receive, based on the control signaling, a conflict indication indicating a TDM alignment conflict between the first transmission and a second transmission scheduled for a child link between the relay node and a child node.

The transmitter 1940 may transmit signals generated by other components of the device 1905. In some examples, the transmitter 1940 may be collocated with a receiver 1910 in a transceiver module. For example, the transmitter 1940 may be an example of aspects of the transceiver 2120 described with reference to FIG. 21. The transmitter 1940 may utilize a single antenna or a set of antennas.

Figure 20:
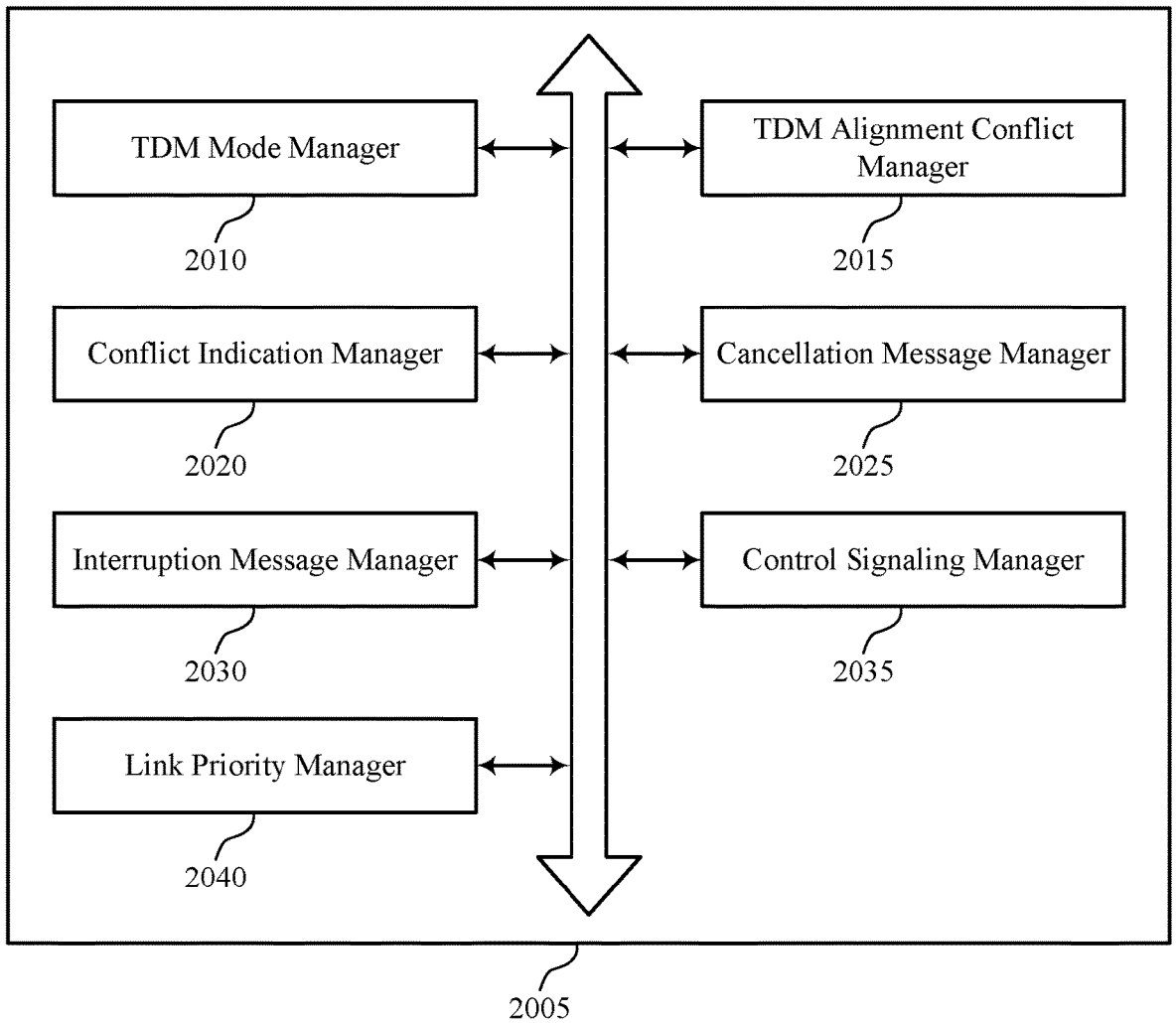
FIG. 20 shows a diagram of a communications manager that supports cancellation and interruption indications in IAB networks in accordance with aspects of the present disclosure.

FIG. 20 shows a diagram 2000 of a communications manager 2005 that supports cancellation and interruption indications in IAB networks in accordance with aspects of the present disclosure. The communications manager 2005 may be an example of aspects of a communications manager 1815, a communications manager 1915, or a communications manager 2110 described herein. The communications manager 2005 may include a TDM mode manager 2010, a TDM alignment conflict manager 2015, a conflict indication manager 2020, a cancellation message manager 2025, an interruption message manager 2030, a control signaling manager 2035, and a link priority manager 2040. Each of these modules may communicate, directly or indirectly, with one another (e.g., via one or more buses).

The TDM mode manager 2010 may communicate, by the relay node operating in a time division multiplexing (TDM) mode, with a parent node via a parent link configured between the relay node and the parent node and with a child node via a child link configured between the relay node and the child node. In some examples, the TDM mode manager 2010 may communicate with a relay node operating in a time division multiplexing (TDM) mode via a parent link between the relay node and the parent node. In some examples, the TDM mode manager 2010 may communicate the at least a portion of the first transmission, the second transmission, or both, based on the control signaling. In some examples, the TDM mode manager 2010 may initiate retransmission of the first transmission based on the refraining. In some examples, discarding one or more measurements performed on the first transmissions, where the first transmission includes a sounding reference signal. In some examples, the TDM mode manager 2010 may communicate the at least a portion of the first transmission based on control signaling.

The TDM alignment conflict manager 2015 may identify, based on the relay node operating in the TDM mode, a TDM alignment conflict between a first transmission scheduled for the parent link and a second transmission scheduled for the child link. In some examples, the TDM alignment conflict manager 2015 may identify the TDM alignment conflict based on the first transmission scheduled for the parent link at least partially overlapping in time with the second transmission scheduled for the child link. In some examples, the TDM alignment conflict manager 2015 may identify the TDM alignment conflict based on the first transmission scheduled for the parent link being adjacent in time with the second transmission scheduled for the child link.

The conflict indication manager 2020 may transmit, to at least one of the parent node or the child node, a conflict indication based on the identifying. In some examples, the conflict indication manager 2020 may receive, based on the control signaling, a conflict indication indicating a TDM alignment conflict between the first transmission and a second transmission scheduled for a child link between the relay node and a child node.

In some examples, transmitting the conflict indication that includes a bitmap indicating a cancelled or interrupted resource over one or more transmission time intervals. In some examples, the conflict indication manager 2020 may receive a list configuration indicating a list of one or more resources over one or more transmission time intervals. In some examples, transmitting the conflict indication that includes an index indicating a first resource from the list is a cancelled resource or an interrupted resource.

In some examples, the conflict indication manager 2020 may transmit the conflict indication via a control channel, a medium access control (MAC) control element, or both. In some examples, receiving the conflict indication that includes a bitmap indicating a cancelled or interrupted resource over one or more transmission time intervals. In some examples, the conflict indication manager 2020 may transmit a list configuration indicating a list of one or more resources over one or more transmission time intervals. In some examples, receiving the conflict indication that includes an index indicating a first resource from the list is a cancelled resource or an interrupted resource. In some examples, the conflict indication manager 2020 may receive the conflict indication via a control channel, a medium access control (MAC) control element, or both.

The control signaling manager 2035 may transmit control signaling scheduling a first transmission between the relay node and the parent node via the parent link. In some examples, the control signaling manager 2035 may receive control signaling scheduling the first transmission between the relay node and the parent node via the parent link. In some examples, the control signaling manager 2035 may transmit control signaling scheduling the second transmission between the relay node and the child node via the child link. In some examples, the control signaling manager 2035 may communicate first scheduling control signaling indicating a first semi-persistent resource or a first dynamic resource in which the first transmission is scheduled and second scheduling control signaling indicating a second semi-persistent resource or a second dynamic resource in which the second transmission is scheduled that are adjacent in time or at least partially overlap in time.

In some examples, the control signaling manager 2035 may communicate control signaling rescheduling at least a portion of the first transmission, the second transmission, or both, based on the conflict indication. In some examples, the control signaling manager 2035 may transmit second control signaling reallocating the at least the portion of the allocated resource based on the cancellation message. In some examples, the control signaling manager 2035 may transmit control signaling scheduling the first transmission between the relay node and the parent node via the parent link. In some examples, the control signaling manager 2035 may transmit scheduling control signaling indicating a first semi-persistent resource or a first dynamic resource in which the first transmission is scheduled for transmission. In some examples, the control signaling manager 2035 may transmit second control signaling rescheduling at least a portion of the first transmission based on the conflict indication.

The cancellation message manager 2025 may transmit the conflict indication including a cancellation message indicating cancellation of at least a portion of the first transmission, the second transmission, or both, for at least a portion of an allocated resource. In some examples, the cancellation message manager 2025 may transmit the conflict indication including the cancellation message prior to the allocated resource. In some examples, the cancellation message manager 2025 may transmit the conflict indication including the cancellation message indicating cancellation of at least the portion of the first transmission that is an uplink transmission or a downlink transmission via the parent link, of the second transmission that is an uplink transmission or a downlink transmission via the child link, or both. In some examples, the cancellation message manager 2025 may receive the conflict indication including a cancellation message indicating cancellation of at least a portion of the first transmission for at least a portion of an allocated resource.

In some examples, the cancellation message manager 2025 may receive the conflict indication including the cancellation message prior to the allocated resource. In some examples, the cancellation message manager 2025 may receive the conflict indication including the cancellation message indicating cancellation of at least the portion of the first transmission that is an uplink transmission or a downlink transmission scheduled via the parent link. In some examples, refraining from monitoring for feedback information from the relay node based on the cancellation message, where the first transmission includes a downlink transmission from the parent node to the relay node.

The interruption message manager 2030 may transmit the conflict indication including an interruption message indicating interruption of at least a portion of the first transmission, the second transmission, or both, for at least a portion of an allocated resource. In some examples, the interruption message manager 2030 may transmit the conflict indication including the interruption message after the allocated resource. In some examples, the interruption message manager 2030 may transmit the conflict indication including the interruption message indicating interruption of at least the portion of the first transmission that is an uplink transmission or a downlink transmission via the parent link, of the second transmission that is an uplink transmission or a downlink transmission via the child link, or both. In some examples, the interruption message manager 2030 may receive the conflict indication including an interruption message indicating interruption of at least a portion of the first transmission for at least a portion of an allocated resource. In some examples, the interruption message manager 2030 may receive the conflict indication including the interruption message after the allocated resource. In some examples, the interruption message manager 2030 may receive the conflict indication including the interruption message indicating interruption of at least the portion of the first transmission that is an uplink transmission or a downlink transmission scheduled via the parent link.

The link priority manager 2040 may transmit the conflict indication indicating cancellation of one of the first transmission or the second transmission based on a priority of the parent link relative to the child link. In some examples, the link priority manager 2040 may receive the conflict indication indicating cancellation of the first transmission based on a priority of the parent link relative to the child link.

Figure 21:
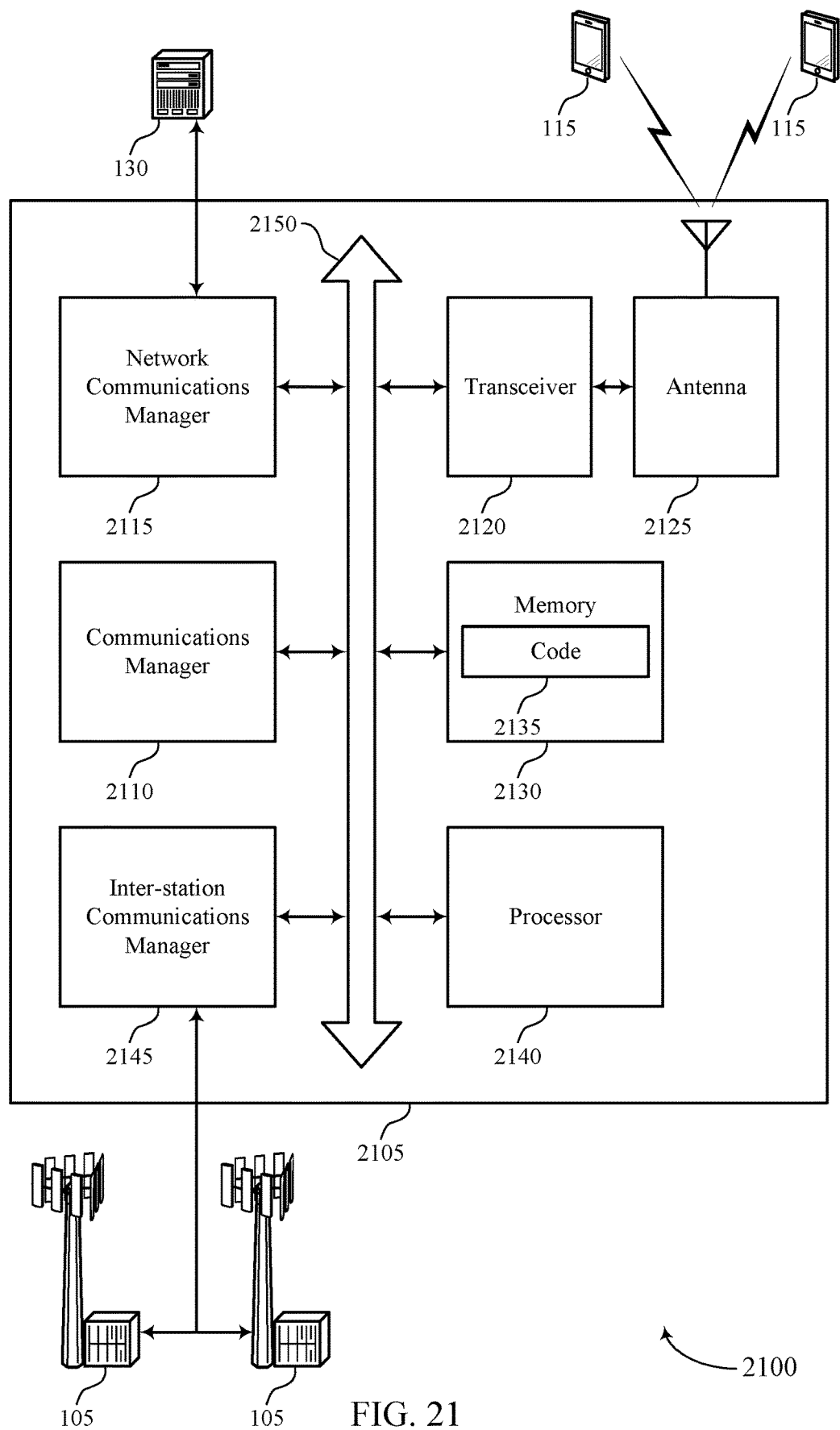
FIG. 21 shows a diagram of a system including a device that supports cancellation and interruption indications in IAB networks in accordance with aspects of the present disclosure.

FIG. 21 shows a diagram of a system 2100 including a device 2105 that supports cancellation and interruption indications in IAB networks in accordance with aspects of the present disclosure. The device 2105 may be an example of or include the components of device 1805, device 1905, or a base station 105 as described herein. The device 2105 may include components for bi-directional voice and data communications including components for transmitting and receiving communications, including a communications manager 2110, a network communications manager 2115, a transceiver 2120, an antenna 2125, memory 2130, a processor 2140, and an inter-station communications manager 2145. These components may be in electronic communication via one or more buses (e.g., bus 2150).

The communications manager 2110 may communicate, by the relay node operating in a time division multiplexing (TDM) mode, with a parent node via a parent link configured between the relay node and the parent node and with a child node via a child link configured between the relay node and the child node, identify, based on the relay node operating in the TDM mode, a TDM alignment conflict between a first transmission scheduled for the parent link and a second transmission scheduled for the child link, and transmit, to at least one of the parent node or the child node, a conflict indication based on the identifying. The communications manager 2110 may also communicate with a relay node operating in a time division multiplexing (TDM) mode via a parent link between the relay node and the parent node, transmit control signaling scheduling a first transmission between the relay node and the parent node via the parent link, and receive, based on the control signaling, a conflict indication indicating a TDM alignment conflict between the first transmission and a second transmission scheduled for a child link between the relay node and a child node.

The network communications manager 2115 may manage communications with the core network (e.g., via one or more wired backhaul links). For example, the network communications manager 2115 may manage the transfer of data communications for client devices, such as one or more UEs 115.

The transceiver 2120 may communicate bi-directionally, via one or more antennas, wired, or wireless links as described above. For example, the transceiver 2120 may represent a wireless transceiver and may communicate bi-directionally with another wireless transceiver. The transceiver 2120 may also include a modem to modulate the packets and provide the modulated packets to the antennas for transmission, and to demodulate packets received from the antennas.

In some cases, the wireless device may include a single antenna 2125. However, in some cases the device may have more than one antenna 2125, which may be capable of concurrently transmitting or receiving multiple wireless transmissions.

The memory 2130 may include RAM, ROM, or a combination thereof. The memory 2130 may store computer-readable code 2135 including instructions that, when executed by a processor (e.g., the processor 2140) cause the device to perform various functions described herein. In some cases, the memory 2130 may contain, among other things, a BIOS which may control basic hardware or software operation such as the interaction with peripheral components or devices.

The processor 2140 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 2140 may be configured to operate a memory array using a memory controller. In some cases, a memory controller may be integrated into processor 2140. The processor 2140 may be configured to execute computer-readable instructions stored in a memory (e.g., the memory 2130) to cause the device 2105 to perform various functions (e.g., functions or tasks supporting cancellation and interruption indications in IAB networks).

The inter-station communications manager 2145 may manage communications with other base station 105, and may include a controller or scheduler for controlling communications with UEs 115 in cooperation with other base stations 105. For example, the inter-station communications manager 2145 may coordinate scheduling for transmissions to UEs 115 for various interference mitigation techniques such as beamforming or joint transmission. In some examples, the inter-station communications manager 2145 may provide an X2 interface within an LTE/LTE-A wireless communication network technology to provide communication between base stations 105.

The code 2135 may include instructions to implement aspects of the present disclosure, including instructions to support wireless communications. The code 2135 may be stored in a non-transitory computer-readable medium such as system memory or other type of memory. In some cases, the code 2135 may not be directly executable by the processor 2140 but may cause a computer (e.g., when compiled and executed) to perform functions described herein.

Figure 22:
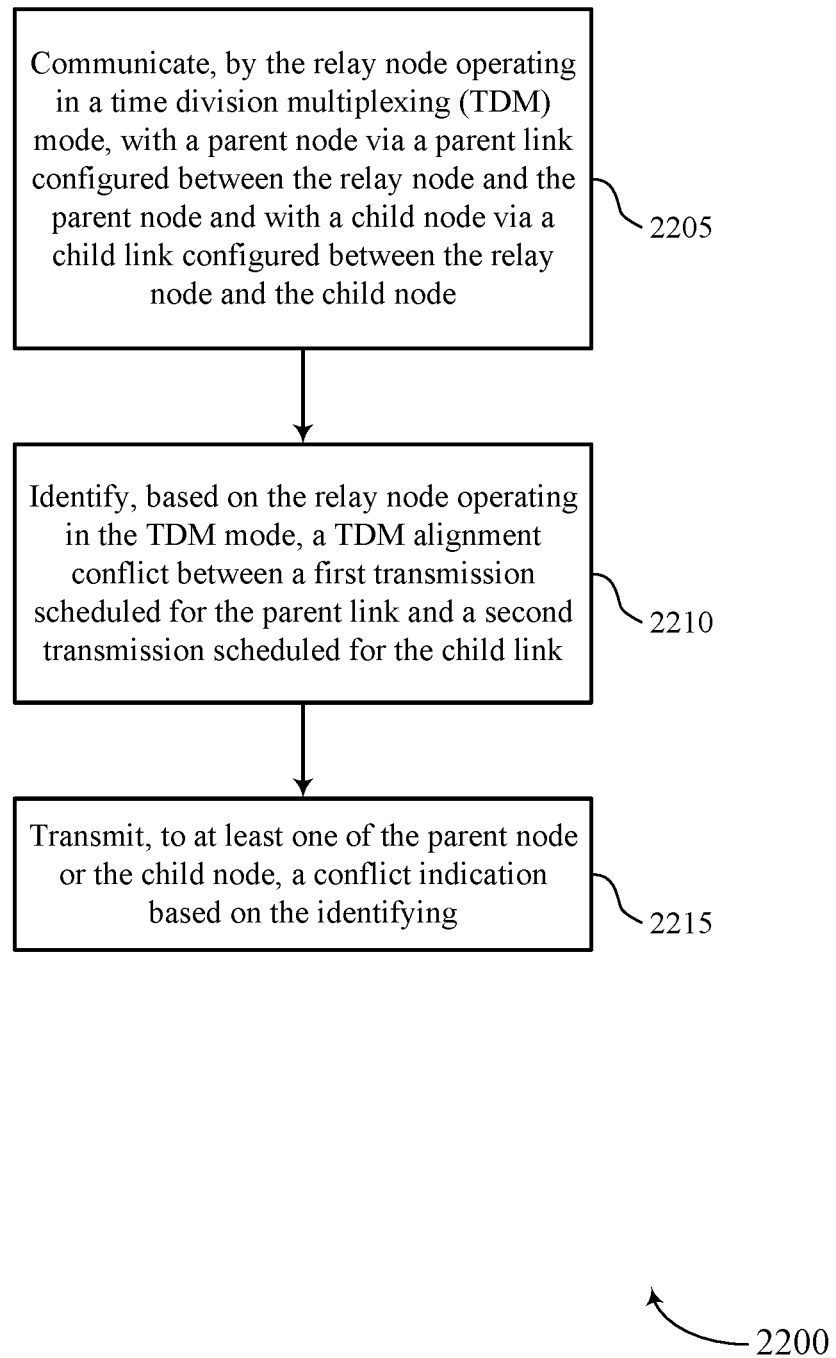
FIGS. 22 through 24 show flowcharts illustrating methods that support cancellation and interruption indications in IAB networks in accordance with aspects of the present disclosure.

FIG. 22 shows a flowchart illustrating a method 2200 that supports cancellation and interruption indications in IAB networks in accordance with aspects of the present disclosure. The operations of method 2200 may be implemented by a base station 105 or its components as described herein. For example, the operations of method 2200 may be performed by a communications manager as described with reference to FIGS. 18 through 21. In some examples, a base station may execute a set of instructions to control the functional elements of the base station to perform the functions described below. Additionally, or alternatively, a base station may perform aspects of the functions described below using special-purpose hardware.

At 2205, the base station may communicate, by the relay node operating in a time division multiplexing (TDM) mode, with a parent node via a parent link configured between the relay node and the parent node and with a child node via a child link configured between the relay node and the child node. The operations of 2205 may be performed according to the methods described herein. In some examples, aspects of the operations of 2205 may be performed by a TDM mode manager as described with reference to FIGS. 18 through 21.

At 2210, the base station may identify, based on the relay node operating in the TDM mode, a TDM alignment conflict between a first transmission scheduled for the parent link and a second transmission scheduled for the child link. The operations of 2210 may be performed according to the methods described herein. In some examples, aspects of the operations of 2210 may be performed by a TDM alignment conflict manager as described with reference to FIGS. 18 through 21.

At 2215, the base station may transmit, to at least one of the parent node or the child node, a conflict indication based on the identifying. The operations of 2215 may be performed according to the methods described herein. In some examples, aspects of the operations of 2215 may be performed by a conflict indication manager as described with reference to FIGS. 18 through 21.

Figure 23:
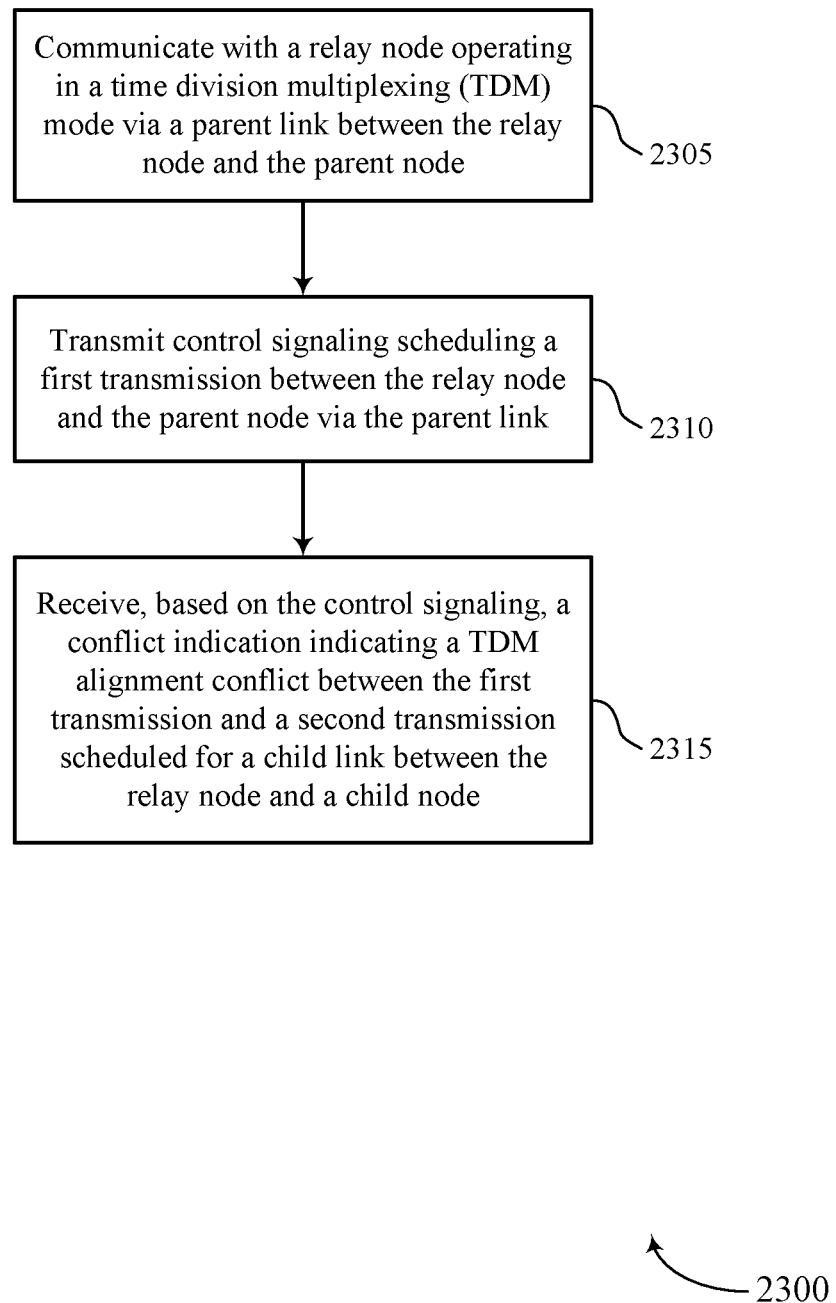

FIG. 23 shows a flowchart illustrating a method 2300 that supports cancellation and interruption indications in IAB networks in accordance with aspects of the present disclosure. The operations of method 2300 may be implemented by a base station 105 or its components as described herein. For example, the operations of method 2300 may be performed by a communications manager as described with reference to FIGS. 18 through 21. In some examples, a base station may execute a set of instructions to control the functional elements of the base station to perform the functions described below. Additionally, or alternatively, a base station may perform aspects of the functions described below using special-purpose hardware.

At 2305, the base station may communicate with a relay node operating in a time division multiplexing (TDM) mode via a parent link between the relay node and the parent node. The operations of 2305 may be performed according to the methods described herein. In some examples, aspects of the operations of 2305 may be performed by a TDM mode manager as described with reference to FIGS. 18 through 21.

At 2310, the base station may transmit control signaling scheduling a first transmission between the relay node and the parent node via the parent link. The operations of 2310 may be performed according to the methods described herein. In some examples, aspects of the operations of 2310 may be performed by a control signaling manager as described with reference to FIGS. 18 through 21.

At 2315, the base station may receive, based on the control signaling, a conflict indication indicating a TDM alignment conflict between the first transmission and a second transmission scheduled for a child link between the relay node and a child node. The operations of 2315 may be performed according to the methods described herein. In some examples, aspects of the operations of 2315 may be performed by a conflict indication manager as described with reference to FIGS. 18 through 21.

Figure 24:
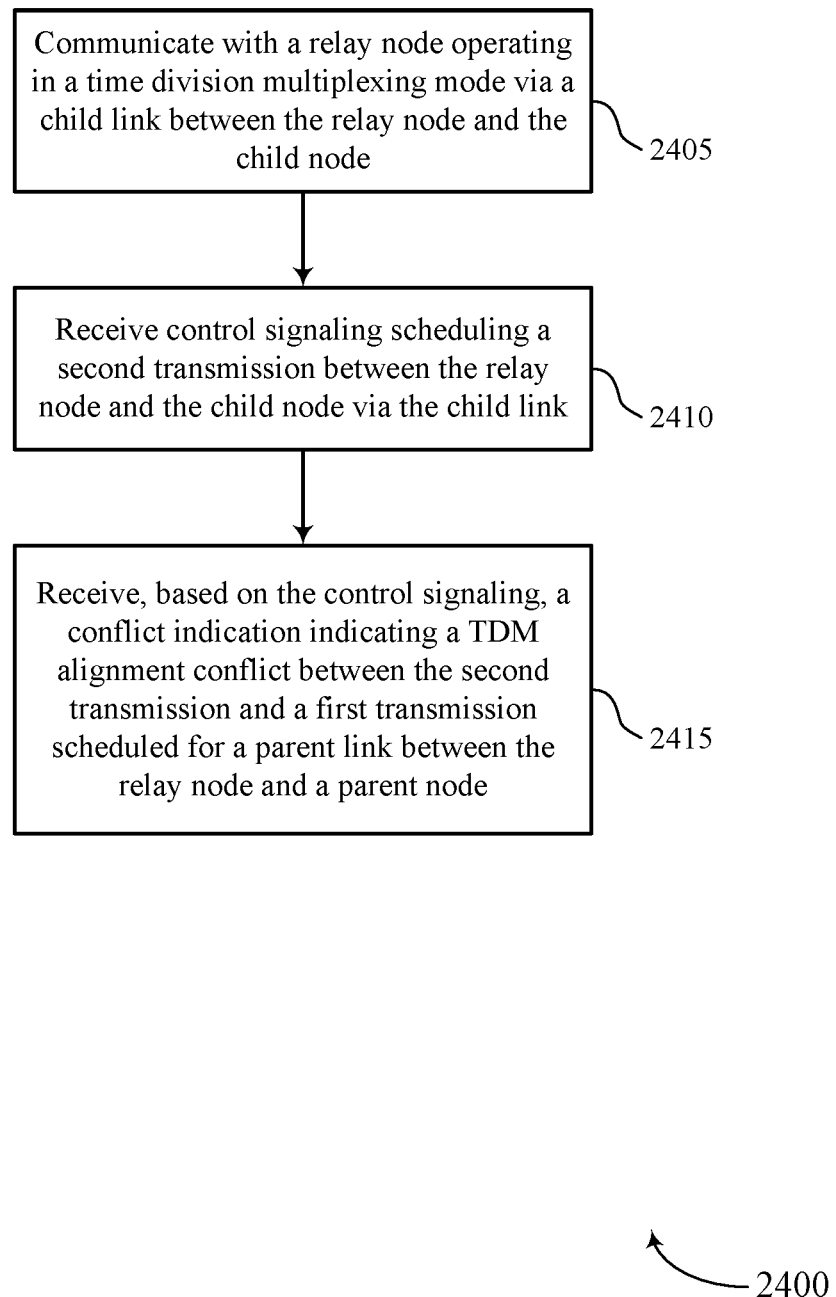

FIG. 24 shows a flowchart illustrating a method 2400 that supports cancellation and interruption indications in IAB networks in accordance with aspects of the present disclosure. The operations of method 2400 may be implemented by a UE 115 or its components as described herein. For example, the operations of method 2400 may be performed by a communications manager as described with reference to FIGS. 14 through 17. In some examples, a UE may execute a set of instructions to control the functional elements of the UE to perform the functions described below. Additionally, or alternatively, a UE may perform aspects of the functions described below using special-purpose hardware.

At 2405, the UE may communicate with a relay node operating in a time division multiplexing mode via a child link between the relay node and the child node. The operations of 2405 may be performed according to the methods described herein. In some examples, aspects of the operations of 2405 may be performed by a TDM mode manager as described with reference to FIGS. 14 through 17.

At 2410, the UE may receive control signaling scheduling a second transmission between the relay node and the child node via the child link. The operations of 2410 may be performed according to the methods described herein. In some examples, aspects of the operations of 2410 may be performed by a control signaling manager as described with reference to FIGS. 14 through 17.

At 2415, the UE may receive, based on the control signaling, a conflict indication indicating a TDM alignment conflict between the second transmission and a first transmission scheduled for a parent link between the relay node and a parent node. The operations of 2415 may be performed according to the methods described herein. In some examples, aspects of the operations of 2415 may be performed by a conflict indication manager as described with reference to FIGS. 14 through 17.

It should be noted that the methods described herein describe possible implementations, and that the operations and the steps may be rearranged or otherwise modified and that other implementations are possible. Further, aspects from two or more of the methods may be combined.

The following provides an overview of aspects of the present disclosure:

Aspect 1: A method for wireless communications by a relay node, comprising: communicating, by the relay node operating in a time division multiplexing (TDM) mode, with a parent node via a parent link configured between the relay node and the parent node and with a child node via a child link configured between the relay node and the child node; identifying, based at least in part on the relay node operating in the TDM mode, a TDM alignment conflict between a first transmission scheduled for the parent link and a second transmission scheduled for the child link; and transmitting, to at least one of the parent node or the child node, a conflict indication based at least in part on the identifying.

Aspect 2: The method of aspect 1, wherein transmitting the conflict indication comprises: transmitting the conflict indication comprising a cancellation message indicating cancellation of at least a portion of the first transmission, the second transmission, or both, for at least a portion of an allocated resource.

Aspect 3: The method of aspect 2, wherein transmitting the conflict indication comprises: transmitting the conflict indication comprising the cancellation message prior to the allocated resource.

Aspect 4: The method of any of aspects 2 through 3, wherein transmitting the conflict indication comprises: transmitting the conflict indication comprising the cancellation message indicating cancellation of at least the portion of the first transmission that is an uplink transmission or a downlink transmission via the parent link, of the second transmission that is an uplink transmission or a downlink transmission via the child link, or both.

Aspect 5: The method of any of aspects 1 through 4, wherein transmitting the conflict indication comprises: transmitting the conflict indication comprising an interruption message indicating interruption of at least a portion of the first transmission, the second transmission, or both, for at least a portion of an allocated resource.

Aspect 6: The method of aspect 5, wherein transmitting the conflict indication comprises: transmitting the conflict indication comprising the interruption message after the allocated resource.

Aspect 7: The method of any of aspects 5 through 6, wherein transmitting the conflict indication comprises: transmitting the conflict indication comprising the interruption message indicating interruption of at least the portion of the first transmission that is an uplink transmission or a downlink transmission via the parent link, of the second transmission that is an uplink transmission or a downlink transmission via the child link, or both.

Aspect 8: The method of any of aspects 1 through 7, further comprising: receiving control signaling scheduling the first transmission between the relay node and the parent node via the parent link.

Aspect 9: The method of any of aspects 1 through 8, further comprising: transmitting control signaling scheduling the second transmission between the relay node and the child node via the child link.

Aspect 10: The method of any of aspects 1 through 9, wherein transmitting the conflict indication comprises: transmitting the conflict indication that comprises a bitmap indicating a cancelled or interrupted resource over one or more transmission time intervals.

Aspect 11: The method of any of aspects 1 through 10, further comprising: receiving a list configuration indicating a list of one or more resources over one or more transmission time intervals; and transmitting the conflict indication that comprises an index indicating a first resource from the list is a cancelled resource or an interrupted resource.

Aspect 12: The method of any of aspects 1 through 11, wherein identifying the TDM alignment conflict comprises: identifying the TDM alignment conflict based at least in part on the first transmission scheduled for the parent link at least partially overlapping in time with the second transmission scheduled for the child link.

Aspect 13: The method of any of aspects 1 through 12, wherein identifying the TDM alignment conflict comprises: identifying the TDM alignment conflict based at least in part on the first transmission scheduled for the parent link being adjacent in time with the second transmission scheduled for the child link.

Aspect 14: The method of any of aspects 1 through 13, wherein identifying the TDM alignment conflict comprises: communicating first scheduling control signaling indicating a first semi-persistent resource or a first dynamic resource in which the first transmission is scheduled and second scheduling control signaling indicating a second semi-persistent resource or a second dynamic resource in which the second transmission is scheduled that are adjacent in time or at least partially overlap in time.

Aspect 15: The method of any of aspects 1 through 14, wherein transmitting the conflict indication comprises: transmitting the conflict indication indicating cancellation of one of the first transmission or the second transmission based at least in part on a priority of the parent link relative to the child link.

Aspect 16: The method of any of aspects 1 through 15, wherein transmitting the conflict indication comprises: transmitting the conflict indication via a control channel, a medium access control (MAC) control element, or both.

Aspect 17: The method of any of aspects 1 through 16, further comprising: communicating control signaling rescheduling at least a portion of the first transmission, the second transmission, or both, based at least in part on the conflict indication; and communicating the at least a portion of the first transmission, the second transmission, or both, based at least in part on the control signaling.

Aspect 18: A method for wireless communications at a parent node, comprising: communicating with a relay node operating in a time division multiplexing (TDM) mode via a parent link between the relay node and the parent node; transmitting control signaling scheduling a first transmission between the relay node and the parent node via the parent link; and receiving, based at least in part on the control signaling, a conflict indication indicating a TDM alignment conflict between the first transmission and a second transmission scheduled for a child link between the relay node and a child node.

Aspect 19: The method of aspect 18, wherein receiving the conflict indication comprises: receiving the conflict indication comprising a cancellation message indicating cancellation of at least a portion of the first transmission for at least a portion of an allocated resource.

Aspect 20: The method of aspect 19, wherein receiving the conflict indication comprises: receiving the conflict indication comprising the cancellation message prior to the allocated resource.

Aspect 21: The method of any of aspects 19 through 20, wherein receiving the conflict indication comprises: receiving the conflict indication comprising the cancellation message indicating cancellation of at least the portion of the first transmission that is an uplink transmission or a downlink transmission scheduled via the parent link.

Aspect 22: The method of any of aspects 19 through 21, further comprising: transmitting second control signaling reallocating the at least the portion of the allocated resource based at least in part on the cancellation message.

Aspect 23: The method of any of aspects 19 through 22, further comprising: refraining from monitoring for feedback information from the relay node based at least in part on the cancellation message, wherein the first transmission comprises a downlink transmission from the parent node to the relay node; and initiating retransmission of the first transmission based at least in part on the refraining.

Aspect 24: The method of any of aspects 18 through 23, wherein receiving the conflict indication comprises: receiving the conflict indication comprising an interruption message indicating interruption of at least a portion of the first transmission for at least a portion of an allocated resource.

Aspect 25: The method of aspect 24, wherein receiving the conflict indication comprises: receiving the conflict indication comprising the interruption message after the allocated resource.

Aspect 26: The method of any of aspects 24 through 25, wherein receiving the conflict indication comprises: receiving the conflict indication comprising the interruption message indicating interruption of at least the portion of the first transmission that is an uplink transmission or a downlink transmission scheduled via the parent link.

Aspect 27: The method of any of aspects 24 through 26, further comprising: discarding one or more measurements performed on the first transmissions, wherein the first transmission comprises a sounding reference signal.

Aspect 28: The method of any of aspects 18 through 27, further comprising: transmitting control signaling scheduling the first transmission between the relay node and the parent node via the parent link.

Aspect 29: The method of any of aspects 18 through 28, wherein receiving the conflict indication comprises: receiving the conflict indication that comprises a bitmap indicating a cancelled or interrupted resource over one or more transmission time intervals.

Aspect 30: The method of any of aspects 18 through 29, further comprising: transmitting a list configuration indicating a list of one or more resources over one or more transmission time intervals; and receiving the conflict indication that comprises an index indicating a first resource from the list is a cancelled resource or an interrupted resource.

Aspect 31: The method of any of aspects 18 through 30, further comprising: transmitting scheduling control signaling indicating a first semi-persistent resource or a first dynamic resource in which the first transmission is scheduled for transmission.

Aspect 32: The method of any of aspects 18 through 31, wherein receiving the conflict indication comprises: receiving the conflict indication indicating cancellation of the first transmission based at least in part on a priority of the parent link relative to the child link.

Aspect 33: The method of any of aspects 18 through 32, wherein receiving the conflict indication comprises: receiving the conflict indication via a control channel, a medium access control (MAC) control element, or both.

Aspect 34: The method of any of aspects 18 through 33, further comprising: transmitting second control signaling rescheduling at least a portion of the first transmission based at least in part on the conflict indication; and communicating the at least a portion of the first transmission based at least in part on control signaling.

Aspect 35: A method for wireless communications at a child node, comprising: communicating with a relay node operating in a time division multiplexing mode via a child link between the relay node and the child node; receiving control signaling scheduling a second transmission between the relay node and the child node via the child link; and receiving, based at least in part on the control signaling, a conflict indication indicating a TDM alignment conflict between the second transmission and a first transmission scheduled for a parent link between the relay node and a parent node.

Aspect 36: The method of aspect 35, wherein receiving the conflict indication comprises: receiving the conflict indication comprising a cancellation message indicating cancellation of at least a portion of the second transmission for at least a portion of an allocated resource.

Aspect 37: The method of aspect 36, wherein receiving the conflict indication comprises: receiving the conflict indication comprising the cancellation message prior to the allocated resource.

Aspect 38: The method of any of aspects 36 through 37, wherein receiving the conflict indication comprises: receiving the conflict indication comprising the cancellation message indicating cancellation of at least the portion of the second transmission that is an uplink transmission or a downlink transmission scheduled via the child link.

Aspect 39: The method of any of aspects 36 through 38, further comprising: transmitting second control signaling reallocating the at least the portion of the allocated resource based at least in part on the cancellation message.

Aspect 40: The method of any of aspects 36 through 39, further comprising: discarding the first transmission from a set of downlink transmissions; and performing a feedback combination procedure based at least in part on the discarding.

Aspect 41: The method of any of aspects 35 through 40, wherein receiving the conflict indication comprises: receiving the conflict indication comprising an interruption message indicating interruption of at least a portion of the first transmission for at least a portion of an allocated resource.

Aspect 42: The method of aspect 41, wherein receiving the conflict indication comprises: receiving the conflict indication comprising the interruption message after the allocated resource.

Aspect 43: The method of any of aspects 41 through 42, wherein receiving the conflict indication comprises: receiving the conflict indication comprising the interruption message indicating interruption of at least the portion of the second transmission that is an uplink transmission or a downlink transmission scheduled via the child link.

Aspect 44: The method of any of aspects 41 through 43, wherein receiving the conflict indication comprises: refraining from incrementing a transmission counter, wherein the second transmission comprises a scheduling request or a random access message.

Aspect 45: The method of any of aspects 35 through 44, wherein receiving the conflict indication comprises: receiving the conflict indication that comprises a bitmap indicating a cancelled or interrupted resource over one or more transmission time intervals.

Aspect 46: The method of any of aspects 35 through 45, further comprising: receiving a list configuration indicating a list of one or more resources over one or more transmission time intervals; and receiving the conflict indication that comprises an index indicating a first resource from the list is a cancelled resource or an interrupted resource.

Aspect 47: The method of any of aspects 35 through 46, further comprising: receiving scheduling control signaling indicating a first semi-persistent resource or a first dynamic resource in which the second transmission is scheduled for transmission.

Aspect 48: The method of any of aspects 35 through 47, wherein receiving the conflict indication comprises: receiving the conflict indication indicating cancellation of the second transmission based at least in part on a priority of the parent link relative to the child link.

Aspect 49: The method of any of aspects 35 through 48, wherein receiving the conflict indication comprises: receiving the conflict indication via a control channel, a medium access control (MAC) control element, or both.

Aspect 50: An apparatus for wireless communications by a relay node, comprising a processor; memory coupled with the processor; and instructions stored in the memory and executable by the processor to cause the apparatus to perform a method of any of aspects 1 through 17.

Aspect 51: An apparatus for wireless communications by a relay node, comprising at least one means for performing a method of any of aspects 1 through 17.

Aspect 52: A non-transitory computer-readable medium storing code for wireless communications by a relay node, the code comprising instructions executable by a processor to perform a method of any of aspects 1 through 17.

Aspect 53: An apparatus for wireless communications at a parent node, comprising a processor; memory coupled with the processor; and instructions stored in the memory and executable by the processor to cause the apparatus to perform a method of any of aspects 18 through 34.

Aspect 54: An apparatus for wireless communications at a parent node, comprising at least one means for performing a method of any of aspects 18 through 34.

Aspect 55: A non-transitory computer-readable medium storing code for wireless communications at a parent node, the code comprising instructions executable by a processor to perform a method of any of aspects 18 through 34.

Aspect 56: An apparatus for wireless communications at a child node, comprising a processor; memory coupled with the processor; and instructions stored in the memory and executable by the processor to cause the apparatus to perform a method of any of aspects 35 through 49.

Aspect 57: An apparatus for wireless communications at a child node, comprising at least one means for performing a method of any of aspects 35 through 49.

Aspect 58: A non-transitory computer-readable medium storing code for wireless communications at a child node, the code comprising instructions executable by a processor to perform a method of any of aspects 35 through 49.

Although aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR networks. For example, the described techniques may be applicable to various other wireless communications systems such as Ultra Mobile Broadband (UMB), Institute of Electrical and Electronics Engineers (IEEE) 802.11 (Wi-Fi), IEEE 802.16 (WiMAX), IEEE 802.20, Flash-OFDM, as well as other systems and radio technologies not explicitly mentioned herein.

Information and signals described herein may be represented using any of a variety of different technologies and techniques. For example, data, instructions, commands, information, signals, bits, symbols, and chips that may be referenced throughout the description may be represented by voltages, currents, electromagnetic waves, magnetic fields or particles, optical fields or particles, or any combination thereof.

The various illustrative blocks and components described in connection with the disclosure herein may be implemented or performed with a general-purpose processor, a DSP, an ASIC, a CPU, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described herein may be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that may be accessed by a general-purpose or special purpose computer. By way of example, and not limitation, non-transitory computer-readable media may include RAM, ROM, electrically erasable programmable ROM (EEPROM), flash memory, compact disk (CD) ROM or other optical disk storage, magnetic disk storage or other magnetic storage devices, or any other non-transitory medium that may be used to carry or store desired program code means in the form of instructions or data structures and that may be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of computer-readable medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope and spirit of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone;

B alone; C alone; A and B in combination; A and C in combination; B and C in combination; or A, B, and C in combination. Also, as used herein, including in the claims, "or" as used in a list of items (for example, a list of items prefaced by a phrase such as "at least one of" or "one or more of") indicates a disjunctive list such that, for example, a list of "at least one of A, B, or C" means A or B or C or AB or AC or BC or ABC (i.e., A and B and C).

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "example" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, known structures and devices are shown in diagram form in order to avoid obscuring the concepts of the described examples.

The description herein is provided to enable a person having ordinary skill in the art to make or use the disclosure. Various modifications to the disclosure will be apparent to a person having ordinary skill in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communications by a relay node, comprising:
   communicating, by the relay node operating in a time division multiplexing (TDM) mode, with a parent node via a parent link configured between the relay node and the parent node and with a child node via a child link configured between the relay node and the child node;
   identifying, based at least in part on the relay node operating in the TDM mode, a TDM alignment conflict between a first transmission scheduled for the parent link and a second transmission scheduled for the child link; and
   transmitting, to one or both of the parent node or the child node, a conflict indication based at least in part on the identifying and a gap in time between a grant associated with the TDM alignment conflict and the TDM alignment conflict.

2. The method of claim 1, wherein transmitting the conflict indication comprises:
   transmitting the conflict indication comprising a cancellation message indicating cancellation of at least a portion of the first transmission, the second transmission, or both, for at least a portion of an allocated resource.

3. The method of claim 2, wherein transmitting the conflict indication comprises:
   transmitting the conflict indication comprising the cancellation message prior to the allocated resource.

4. The method of claim 2, wherein transmitting the conflict indication comprises:
   transmitting the conflict indication comprising the cancellation message indicating cancellation of at least the portion of the first transmission that is an uplink transmission or a downlink transmission via the parent link, of the second transmission that is an uplink transmission or a downlink transmission via the child link, or both.

5. The method of claim 1, wherein transmitting the conflict indication comprises:
   transmitting the conflict indication comprising an interruption message indicating interruption of at least a portion of the first transmission, the second transmission, or both, for at least a portion of an allocated resource.

6. The method of claim 5, wherein transmitting the conflict indication comprises:
   transmitting the conflict indication comprising the interruption message after the allocated resource.

7. The method of claim 5, wherein transmitting the conflict indication comprises:
   transmitting the conflict indication comprising the interruption message indicating interruption of at least the portion of the first transmission that is an uplink transmission or a downlink transmission via the parent link, of the second transmission that is an uplink transmission or a downlink transmission via the child link, or both.

8. The method of claim 1, further comprising:
   receiving control signaling scheduling the first transmission between the relay node and the parent node via the parent link.

9. The method of claim 1, further comprising:
   transmitting control signaling scheduling the second transmission between the relay node and the child node via the child link.

10. The method of claim 1, wherein transmitting the conflict indication comprises:
    transmitting the conflict indication that comprises a bitmap indicating a canceled or interrupted resource over one or more transmission time intervals.

11. The method of claim 1, further comprising:
    receiving a list configuration indicating a list of one or more resources over one or more transmission time intervals; and
    transmitting the conflict indication that comprises an index indicating a first resource from the list is a canceled resource or an interrupted resource.

12. The method of claim 1, wherein identifying the TDM alignment conflict comprises:
    identifying the TDM alignment conflict based at least in part on the first transmission scheduled for the parent link at least partially overlapping in time with the second transmission scheduled for the child link.

13. The method of claim 1, wherein identifying the TDM alignment conflict comprises:
    identifying the TDM alignment conflict based at least in part on the first transmission scheduled for the parent link being adjacent in time with the second transmission scheduled for the child link.

14. The method of claim 1, wherein identifying the TDM alignment conflict comprises:
    communicating first scheduling control signaling indicating a first semi-persistent resource or a first dynamic resource in which the first transmission is scheduled and second scheduling control signaling indicating a second semi-persistent resource or a second dynamic resource in which the second transmission is scheduled that are adjacent in time or at least partially overlap in time.

15. The method of claim 1, wherein transmitting the conflict indication comprises:
   transmitting the conflict indication indicating cancellation of one of the first transmission or the second transmission based at least in part on a priority of the parent link relative to the child link.

16. The method of claim 1, wherein transmitting the conflict indication comprises:
   transmitting the conflict indication via a control channel, a medium access control (MAC) control element, or both.

17. The method of claim 1, further comprising:
   communicating control signaling rescheduling at least a portion of the first transmission, the second transmission, or both, based at least in part on the conflict indication; and
   communicating the at least the portion of the first transmission, the second transmission, or both, based at least in part on the control signaling.

18. A method for wireless communications at a parent node, comprising:
   communicating with a relay node operating in a time division multiplexing (TDM) mode via a parent link between the relay node and the parent node;
   transmitting control signaling scheduling a first transmission between the relay node and the parent node via the parent link; and
   receiving a conflict indication indicating a TDM alignment conflict between the first transmission and a second transmission scheduled for a child link between the relay node and a child node, wherein receiving the conflict indication is based at least in part on the control signaling and a gap in time between a grant associated with the TDM alignment conflict and the TDM alignment conflict.

19. The method of claim 18, wherein receiving the conflict indication comprises:
   receiving the conflict indication comprising a cancellation message indicating cancellation of at least a portion of the first transmission for at least a portion of an allocated resource.

20. The method of claim 19, wherein receiving the conflict indication comprises:
   receiving the conflict indication comprising the cancellation message prior to the allocated resource.

21. The method of claim 19, wherein receiving the conflict indication comprises:
   receiving the conflict indication comprising the cancellation message indicating cancellation of at least the portion of the first transmission that is an uplink transmission or a downlink transmission scheduled via the parent link.

22. The method of claim 19, further comprising:
   transmitting second control signaling reallocating the at least the portion of the allocated resource based at least in part on the cancellation message.

23. A method for wireless communications at a child node, comprising:
   communicating with a relay node operating in a time division multiplexing mode via a child link between the relay node and the child node;
   receiving control signaling scheduling a second transmission between the relay node and the child node via the child link; and
   receiving a conflict indication indicating a TDM alignment conflict between the second transmission and a first transmission scheduled for a parent link between the relay node and a parent node, wherein receiving the conflict indication is based at least in part on the control signaling and a gap in time between a grant associated with the TDM alignment conflict and the TDM alignment conflict.

24. The method of claim 23, wherein receiving the conflict indication comprises:
   receiving the conflict indication comprising a cancellation message indicating cancellation of at least a portion of the second transmission for at least a portion of an allocated resource.

25. The method of claim 24, wherein receiving the conflict indication comprises:
   receiving the conflict indication comprising the cancellation message prior to the allocated resource.

26. The method of claim 24, wherein receiving the conflict indication comprises:
   receiving the conflict indication comprising the cancellation message indicating cancellation of at least the portion of the second transmission that is an uplink transmission or a downlink transmission scheduled via the child link.

27. The method of claim 24, further comprising:
   transmitting second control signaling reallocating the at least the portion of the allocated resource based at least in part on the cancellation message.

28. An apparatus for wireless communications by a relay node, comprising:
   a processor,
   memory coupled with the processor; and
   instructions stored in the memory and executable by the processor to cause the apparatus to:
      communicate, by the relay node operating in a time division multiplexing (TDM) mode, with a parent node via a parent link configured between the relay node and the parent node and with a child node via a child link configured between the relay node and the child node;
      identify, based at least in part on the relay node operating in the TDM mode, a TDM alignment conflict between a first transmission scheduled for the parent link and a second transmission scheduled for the child link; and
      transmit, to one or both of the parent node or the child node, a conflict indication based at least in part on the identifying and a gap in time between a grant associated with the TDM alignment conflict and the TDM alignment conflict.

29. The apparatus of claim 28, wherein the instructions to cause the apparatus to transmit the conflict indication comprises are further executable by the processor to:
   transmit the conflict indication comprising a cancellation message indicating cancellation of at least a portion of the first transmission, the second transmission, or both, for at least a portion of an allocated resource.

30. The apparatus of claim 29, wherein the instructions to cause the apparatus to transmit the conflict indication comprises are further executable by the processor to:

transmit the conflict indication comprising the cancellation message prior to the allocated resource.

\* \* \* \* \*